(12) United States Patent
Nakamura et al.

(10) Patent No.: US 8,524,841 B2
(45) Date of Patent: Sep. 3, 2013

(54) CURABLE RESIN COMPOSITION, OPTICAL MATERIAL, AND METHOD FOR CONTROLLING OPTICAL MATERIAL

(75) Inventors: Junichi Nakamura, Suita (JP); Yasunori Tsujino, Ibaraki (JP); Ai Matsumoto, Takatsuki (JP); Yukihiro Kasano, Suita (JP); Masafumi Yamashita, Takatsuki (JP); Takuo Sugioka, Nishinomiya (JP); Kunio Takahashi, Kawanishi (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 11/863,539

(22) Filed: Sep. 28, 2007

(65) Prior Publication Data

US 2008/0085985 A1  Apr. 10, 2008

(30) Foreign Application Priority Data

Sep. 29, 2006 (JP) ................................. 2006-269341
Oct. 31, 2006 (JP) ................................. 2006-296208
Mar. 22, 2007 (JP) ................................. 2007-075167

(51) Int. Cl.
*C08F 283/12* (2006.01)
*C08G 77/04* (2006.01)

(52) U.S. Cl.
USPC ........................................................ 525/476

(58) Field of Classification Search
USPC ........................................................ 525/476
See application file for complete search history.

(56) References Cited

U.S. PATENT DOCUMENTS

| | | | |
|---|---|---|---|
| 4,082,719 A | | 4/1978 | Liles et al. |
| 5,102,960 A | * | 4/1992 | Imai et al. ...................... 525/476 |
| 5,891,969 A | * | 4/1999 | Mine et al. ...................... 525/476 |
| 5,985,954 A | * | 11/1999 | Tsuchida et al. ............... 523/400 |
| 6,657,001 B1 | * | 12/2003 | Anderson et al. .............. 524/588 |
| 6,730,942 B2 | * | 5/2004 | Mabuchi et al. ............... 257/100 |
| 6,846,520 B2 | * | 1/2005 | Shimomura et al. .......... 427/510 |
| 2002/0068173 A1 | | 6/2002 | Takano et al. |
| 2003/0168652 A1 | * | 9/2003 | Mabuchi et al. ................ 257/13 |

(Continued)

FOREIGN PATENT DOCUMENTS

| | | |
|---|---|---|
| JP | 52-107049 A | 9/1977 |
| JP | 58-69244 | 4/1983 |

(Continued)

OTHER PUBLICATIONS

STN search transcript. Oct. 22, 2009. All pages pertinent.*

(Continued)

*Primary Examiner* — Mike M Dollinger
(74) *Attorney, Agent, or Firm* — Novak Druce Connolly Bove + Quigg LLP

(57) ABSTRACT

To provide: a curable resin composition which can be continuously produced without gelling during production, and has excellent basic performances such as heat resistance and moisture resistance; an optical member which has excellent optical characteristics such as high transparency and exhibits excellent performances in a harsh use environment; and a method for controlling an optical material. A curable resin composition including an organic resin component and a metalloxane component, wherein the organic resin component includes a resin component having an Abbe number of 45 or more and the metalloxane component has a metalloxane bond; an optical material comprising the above-mentioned curable resin composition; an optical member produced by curing the optical material; and a method for controlling an Abbe number and/or a refractive index of an optical material.

15 Claims, 2 Drawing Sheets

(56) References Cited

U.S. PATENT DOCUMENTS

| | | | |
|---|---|---|---|
| 2004/0138325 A1 | 7/2004 | Yamaguchi et al. | |
| 2005/0221094 A1* | 10/2005 | Uchida et al. | 428/418 |
| 2005/0238299 A1* | 10/2005 | Takahashi | 385/100 |
| 2005/0244649 A1 | 11/2005 | Kashiwagi et al. | |
| 2005/0272896 A1* | 12/2005 | Kaji et al. | 528/30 |
| 2006/0194063 A1* | 8/2006 | Murai et al. | 428/413 |
| 2007/0036981 A1* | 2/2007 | Gallo et al. | 428/413 |
| 2007/0148442 A1* | 6/2007 | Shibayama et al. | 428/336 |
| 2007/0265427 A1* | 11/2007 | Takai et al. | 528/405 |

FOREIGN PATENT DOCUMENTS

| | | |
|---|---|---|
| JP | 01-272623 | 10/1989 |
| JP | 2865741 | 6/1991 |
| JP | 4-161435 A | 6/1992 |
| JP | 6-279568 A | 10/1994 |
| JP | 09-080251 A | 3/1997 |
| JP | 2000-281870 A | 10/2000 |
| JP | 2001-059918 | 3/2001 |
| JP | 2001-342325 A | 12/2001 |
| JP | 2002-363506 A | 12/2002 |
| JP | 2003-192762 A | 7/2003 |
| JP | 2003-212959 A | 7/2003 |
| JP | 2004-250521 | 9/2004 |
| JP | 2004-346288 | 12/2004 |
| JP | 2005-036242 A | 2/2005 |
| JP | 2005068241 A | 3/2005 |
| JP | 2005226012 | 8/2005 |
| JP | 2005-272672 | 10/2005 |
| JP | 2005-281619 A | 10/2005 |
| JP | 2005314591 | 11/2005 |
| JP | 2006052325 | 2/2006 |
| JP | 2006-063302 A | 3/2006 |
| JP | 2007-051217 | 3/2007 |
| JP | 2007-168150 | 7/2007 |
| WO | WO 2004074366 A2 * | 9/2004 |
| WO | WO-2006/077140 A1 | 7/2006 |

OTHER PUBLICATIONS

Internet search submitted by Applicants and showing most commonly used stearyl-beta-propinate.*
STN search in Registry for Stearyl-beta-propinate.*
Polyethylene Definition. Lewis, Richard. Hawley's Condensed Chemical Dictionary. Van Nortrad Reinhold Company: New York. 1993. Polyethylene, p. 933.*
Machine Translation of Hashimoto et al JP 2004010849 A.*

* cited by examiner

CURABLE RESIN COMPOSITION, OPTICAL MATERIAL, AND METHOD FOR CONTROLLING OPTICAL MATERIAL

TECHNICAL FIELD

The present invention relates to resin compositions and optical members. More specifically, the present invention relates to a resin composition which is useful in an optical application, an opto device application, a display device application, and the like, or useful as a mechanical component material, an electrical or electronic component material, and the like. The present invention further relates to an optical material, and a method for controlling the optical material.

BACKGROUND ART

Thermosetting resin compositions are useful as a mechanical component material, an electrical or electronic component material, an automobile component material, a civil engineering and construction material, a molding material and the like. Such compositions are also used as a coating material or a material for adhesives. Inorganic substance-containing resin compositions are particularly useful as an electrical or electronic component material or a material in an optical application because such compositions can reduce a coefficient of thermal expansion and additionally control appearance of the compositions and curable products thereof and exhibit transparency if the inorganic material and the resin have equivalent refractive indexes. For example, a digital camera module has been installed on cellular phones and become smaller. Further, reduction in costs has been needed for such a module. Accordingly, plastic lens such as PMMA, PC, and polycycloolefin instead of inorganic glass have been increasingly adopted. Recently, as a new application, needs for in-vehicle applications such as an in-vehicle camera and a bar-code reader for delivery service have been increased. When used in these applications, such resin compositions need long-term heat resistance in view of exposure to summer high temperatures. Thus, thermosetting materials having more excellent heat resistance than that of conventional plastic materials have been investigated.

With respect to production methods of thermosetting resin compositions, for example, Japanese Kokai Publication No. 2004-250521 on page 2 discloses an epoxy resin molded product obtained by curing a composition containing at least an epoxy resin and inorganic oxide particles which has an average particle diameter of 50 nm or less and a redispersed into the molded product. In this application, wet silica and an epoxy resin are disclosed and bisphenol A (Abbe number of 34.1) is used as the epoxy resin. In such a case, there is room for improvement in order to improve optical characteristics such as reduction in light bleeding and increase in Abbe number. Therefore, a resin composition which has basic performances such as heat resistance and improves optical characteristics and can be preferably used as various optical members has been desired.

Further, for example, Japanese Kokai Publication No. Hei-01-272623 on pages 1 and 2 discloses that a curable resin composition include polysiloxane obtained by hydrolyzing and condensing a (tri)alkoxysilane by adding organopolysiloxane instead of the inorganic fine particles such as silica, into an epoxy resin, and thereby an internal stress of a cured product of such a curable resin composition is reduced. In addition, Japanese Kokai Publication No. Sho-58-69244 on pages 1 and 2 discloses a curable resin composition which includes, as a demolding agent, organopolysiloxane containing a specific functional group.

DISCLOSURE OF THE INVENTION

Problem to be Solved by the Invention

The present invention has been made in view of the above-mentioned state of the art. The present inventors found that the above-mentioned conventional technologies have problems if the resin compositions are used as an optical material which needs extremely high optical homogeneity on the surface or inside of molded products of such resin compositions. That is, the problems are as follows: if the above-mentioned silica is used, or if a curing agent such as amine, acid anhydride, and phenol novolac, a curing accelerator such as imidazole and a tertiary amine compound is used, or if polysiloxane having a functional group is used, the viscosity is increased with time even at a normal temperature; and the increase in viscosity is remarkably observed if an epoxy component with a high curing reactivity is added or the curing agent or the curing accelerator is used. Therefore, the obtained cured products have insufficient optical homogeneity, or the curing characteristics, processability and the like are varied depending on elapsed time after addition of the curing agent. Therefore, the present inventors made various investigations on sufficiently suppressing increase in viscosity or gelling with time, improving qualities and so on of resin compositions to have basic performances such as heat resistance, to improve optical characteristics and to be preferably used in various optical members. The present invention has an object to provide a technology capable of providing a curable resin composition which is excellent in reproducibility of curing and processing characteristics in production steps and can be continuously produced, and therefore have stable qualities. The present invention has another object to provide a resin composition, an optical material, and an optical member, which is excellent in basic performances such as heat resistance and moisture resistance, and further excellent in optical characteristics such as transparency, and exhibits excellent performances in a harsh use environment. The present invention has another object to provide a method for controlling such an optical material.

Means for Solving the Problem

The present inventors made various investigations on a curable resin composition including an organic resin component and an inorganic fine particle component. Then, the inventors noted that such a composition can be easily molded and is useful as a material in various applications such as an optical application. The inventors found that a resin composition essentially including a metalloxane component and a resin component having an Abbe number of 45 or more has high transparency and excellent optical characteristics such as a refractive index and that such a resin composition can be preferably used in an optical application and the like. The inventors also found that such a curable resin composition can be inexpensively subjected to complicated processes which can not be performed for glass, and that gelling hardly occurs at the time of production of the resin composition, and therefore such a resin composition which can be preferably used in an optical application and the like can be continuously produced. Further, particularly if a thermosetting resin is used, such a resin composition can obtain heat resistance which a thermoplastic resin can not attain. As a result, the above-mentioned problems can be admirably solved. Further, the inventors found that such a curable resin composition can be preferably used in various applications, for example, an optical application such as a lens, an opto device application, and a display device application, or used as a mechanical component material, an electrical or electronic component material, an automobile component material, a civil engineering and construction material, and a molding material. As a result, the present invention has been completed.

The curable resin composition of the present invention is also useful as a material for optical devices. A material made of inorganic glass has been conventionally used as a material for optical devices. Optical characteristics of such a material for optical devices are absolutely not changed even after prolonged exposure to high temperature and humidity conditions. Therefore, physical properties equal to those of such a conventional material are also needed for plastic materials for optical devices. Commonly used thermosetting materials cannot be used after prolonged exposure to high temperature and humidity conditions because the optical characteristics such as transparency are slightly changed. However, the resin composition of the present invention can exhibit excellent optical characteristics when a device is produced, and also can maintain the optical characteristics in a harsh use environment.

The present inventors have further made various investigations on the curable resin composition, and found the followings (1) to (8).

(1) A resin composition essentially including at least one glycidyl group and/or epoxy group as the organic resin component and an organosiloxane compound as the metalloxane compound can be excellent in workability such as moldability and curability, optical characteristics such as transparency and refractive index, heat resistance, and mechanical characteristics. Such a resin composition is also excellent in storage stability. Further, the kind of the organic resin component and the metalloxane component is selected, and thereby optical characteristics such as an Abbe number and a refractive index can be desirably controlled. Therefore, a resin composition which can be preferably used in various applications can be obtained.

(2) If a resin composition essentially includes inorganic fine particles obtained by a wet process as the metalloxane component and an organic resin component having an Abbe number of 45 or more and an average Abbe number of the entire organic resin component is 45 or more, such a resin composition has high transparency and a large Abbe number, and also has a controlled refractive index. Further, if the resin composition includes an alicyclic curable substance and a dispersion of wet inorganic fine particles, a thermosetting resin in which the above-mentioned optical characteristics are more excellent can be obtained.

(3) If a resin composition including an organic resin component having a molecular weight of 700 or more, which accounts for 30 to 90% by weight (weight %, mass % or % by mass) relative to the total amount of the organic resin component, such a resin composition has high transparency and a controlled refractive index. Further, particularly if the resin composition includes an alicyclic curable substance and a wet inorganic dispersion, a thermosetting resin in which the above-mentioned optical characteristics are more excellent can be obtained.

(4) If a curable resin composition has an unsaturated bond amount of 40% by weight or more relative to 100% by weight of a cured product of such a resin composition, the curable resin composition has high transparency, a high refractive index, and a small Abbe number. If such a resin composition includes an organic component having an unsaturated bond and also a metalloxane component having an unsaturated bond (for example, silica having an unsaturated bond), the metalloxane component is homogeneously dispersed and thereby such a curable resin composition has high transparency and a high refractive index. The above-mentioned silica corresponds to an organosiloxane compound represented by an average compositional formula mentioned below, and further corresponds to an organosiloxane compound which satisfies a=0 in the formula, that is, phenyl siloxane. That is, the above-mentioned silica is preferably an organosiloxane compound represented by an average compositional formula mentioned below, and more preferably, an organosiloxane compound which satisfies a=0 in the formula, that is, phenyl siloxane.

(5) A resin composition including a flexible component can be excellent in strength, transparency, and heat resistance, and further have high transparency and a large Abbe number and excellent optical characteristics such as a refractive index. Therefore, such a resin composition which can be preferably used in an optical application and the like can be continuously produced. Further, if such a resin composition includes an alicyclic curable substance and a wet inorganic dispersion, a thermosetting resin in which the above-mentioned optical characteristics are more excellent can be produced.

(6) If a resin composition includes, as the metalloxane component, inorganic fine particles which have a pH of 3.4 to 11 at 25° C. when being dispersed in a solution, such a resin composition has excellent optical characteristics such as transparency and refractive index, and also has excellent continuous productivity because increase in viscosity or gelling in production processes is suppressed. Further, if such a resin composition includes an alicyclic curable substance as the organic resin component and a wet inorganic dispersion as the fine particles, a thermosetting resin in which the Abbe number is large and the above-mentioned optical characteristics are more excellent can be produced.

(7) If a commercially available demolding agent is used to improve the demoldability, the viscosity of an injecting liquid is increased or curing is inhibited. Further, if the demolding agent has a negligible solubility in an organic (-inorganic composite) material, white turbidity is caused and thereby an obtained cured product may not function as a lens, for example. If the curable resin composition is demolded at an intensity of 40 kgf/cm$^2$, a cured product which can be preferably used in various applications can be obtained without such various problems. Further, a curable resin composition including at least one compound selected from alcohols, carboxylic acids, carboxylic acid esters, and carboxylic acid salts, each containing 8 to 36 carbon atoms, can be excellent in demoldability, and such a composition can be applied to a commonly used simple curing and molding method. That is, if such a composition is cured and used as a lens, a (composite) material such as a curable resin composition is thermally or photochemically cured, generally, and for example, the thermal curing can be performed using a thermal-latent cation generator. In such a case, a thermal-latent cation generator is added to the organic (-inorganic composite) material to prepare one-component liquid, and the liquid is injected into a mold and an obtained lens is demolded, generally. However, in the present invention, such a resin composition containing the above-mentioned compound can be injected as one-component liquid and cured. Further, such a curable resin composition which is produced using a thermal-latent cation generator has dramatically improved heat resistance.

(8) The present inventors made various investigations on a method for producing a curable resin composition including an organic resin component and a metal oxide fine particle component, and found that if a solvent is degassed in the coexistence with a high-boiling component, gelling is hardly caused at the time of production. Further, such a resin composition has high strength and heat resistance, and further high transparency and a large Abbe number. Also, such a composition is excellent in optical characteristics such as a refractive index. Therefore, such a resin composition which can be preferably used in an optical application and the like can be continuously produced. According to such a production method, a thermosetting curable resin having the above-mentioned excellent optical characteristics can be obtained if a specific organic resin component and a specific metal oxide fine particle component, specifically, an alicyclic curable substance and a wet inorganic dispersion are used. The same effects can be obtained even if the metal oxide fine particle component is replaced with the metalloxane component of the present invention.

(9) The present invention discloses the above-mentioned (1) to (8). Specifically, the present invention discloses a curable resin composition comprising an organic resin component and a metalloxane component, wherein the organic resin component includes a resin component having an Abbe number of 45 or more, and the metalloxane component has a metalloxane bond. It is more preferable that such a curable resin composition has one or more of the following characteristics (I) to (X).

(I) the curable resin composition is a cationically curable resin composition;
(II) the resin composition includes an organic resin component having an averaged Abbe number of 45 or more;
(III) the metalloxane component is a specific metal oxide fine particle;
(IV) the metalloxane component is a specific organosiloxane compound;
(V) the organic resin component includes both of an organic resin component having a high molecular weight and an organic resin component having a low molecular weight;
(VI) the curable resin composition includes an alcohol having a high boiling point (high-boiling alcohol);
(VII) the curable resin composition includes a demolding agent;
(VIII) the curable resin composition includes the components at proportions preferable for a low-refractive index lens; and
(IX) the curable resin composition includes the components at proportions preferable for a high-refractive index lens.

In the present description, the "including an organic resin component and a metalloxane component" means that the curable resin composition may or may not include an element other than the organic resin component and the metalloxane component. Hereinafter, the term "including" has such a meaning.

Figure 1:
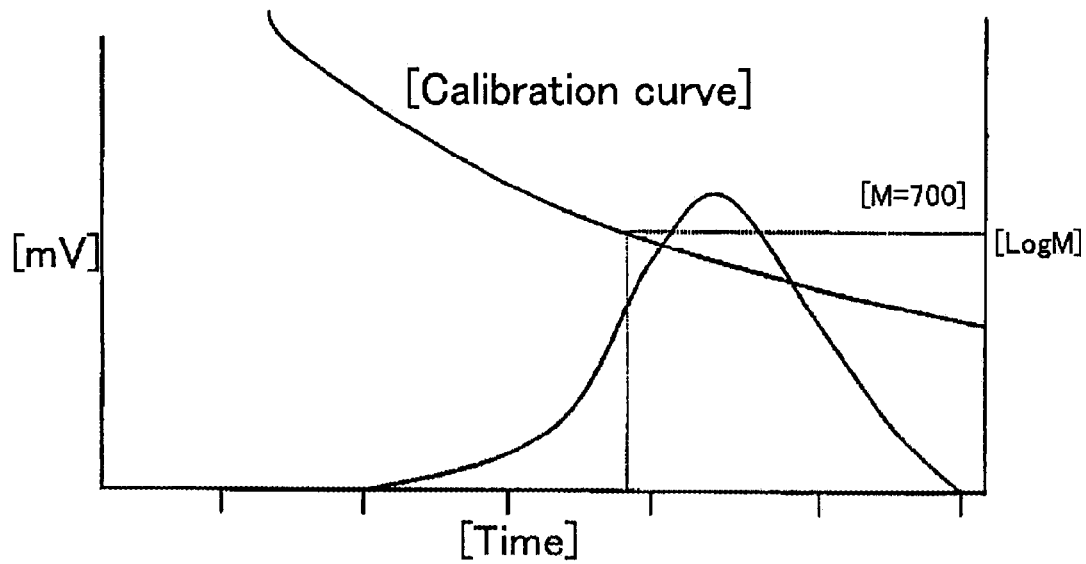
FIG. 1 is a chart diagram showing a GPC analysis result and a calibration curve in accordance with one embodiment of the organic-inorganic composite resin composition of the present invention.

The present invention is mentioned below in more detail.

The curable resin composition of the present invention (also referred to as simply "resin composition", "organic-inorganic composite resin composition", "curable resin composition", "curable transparent organic resin composition") can be easily molded. Further, such a composition is excellent in thermal curing characteristics and workability such as handling ability, and storage stability. The molded product exhibits excellent optical characteristics such as transparency (optical homogeneity) and a refractive index. Further, such a molded product has excellent heat resistance and a small coefficient of linear expansion, and excellent mechanical characteristics such as bending resistance strength.

"Metalloxane Component"

The above-mentioned metalloxane component is in a preferable form of the inorganic component. The component is a compound having a metalloxane bond. It is preferable that the metalloxane component is in the form of a polymer and/or nanoparticles. An organosiloxane compound is preferable as the compound in the form of a polymer, and metal oxide particles are preferable as the compound in the form of nanoparticles. Both of the organosiloxane compound and the metal oxide particles are preferably used. Particularly if the storage stability or the transparency of the curable resin composition is important, the organosiloxane component is preferably used. If the demoldability of a cured product of the curable resin composition is important, the metal oxide fine particles are preferably used. In the present description, the contents referring to "organosiloxane compound" preferably are mainly applied to the case where the organosiloxane compound is used, and it does not mean that the contents are not applied to the case where the metal oxide particles are used. That is, the contents referring to "organosiloxane compound" can be also applied to the metal oxide particles in some cases. The opposite is also true.

The organosiloxane compound as the above-mentioned metalloxane component is first mentioned.

"Organosiloxane Compound"

It is preferable that the metalloxane component includes an organosiloxane compound represented by the following average compositional formula:

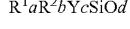

$R^1{}_a R^2{}_b Y_c SiO_d$ (in the formula, $R^1$ represents a saturated aliphatic hydrocarbon group; $R^2$ represents at least one selected from the group consisting of aryl groups and aralkyl groups; Y represents at least one selected from the group consisting of RO groups, hydroxyl groups, halogen atoms, and a hydrogen atom; R represents at least one selected from the group consisting of alkyl groups, cycloalkyl groups, aryl groups, and aralkyl groups; and a, b, c, and d satisfy $0 \leq a < 3$, $0 \leq b < 3$, $0 \leq c < 3$, $0 < a+b+c < 3$, $0 < a+b < 3$, and $a+b+c+2d=4$.)

The above-mentioned organosiloxane compound contains $R^1$ and/or $R^2$ as an inert organic group with a low reactivity, and therefore, characteristically, an increase in viscosity of the resin composition over time is small. Such an inert organic group-containing organosiloxane compound is particularly preferable because it improves the heat resistance or the mechanical characteristics, but has no function of accelerating increase in viscosity.

Accordingly, the curable resin composition can be provided as a one-component resin composition (one-component curable resin composition) excellent in handling ability and can be preferably used in various applications as a resin composition. Thus, the preferable embodiments of the present invention include a method of improving storage stability of a resin composition (curable resin composition) including an organic resin component and the organosiloxane compound represented by the above-mentioned average compositional formula. Further, the organosiloxane compound has no influence on the curing property of the organic resin component. Therefore, if the organosiloxane compound is used, the curing property of the resin composition (optical material) can be controlled by using an organic resin compound having a desired curing rate. For example, the curing property at the time of curing can be increased by using an epoxy component with a high curing reactivity.

If the above-mentioned curable resin composition is cured, a cured product which is excellent in reproducibility of curing and processing characteristics in production steps and has stable qualities. The obtained cured product has sufficient optical homogeneity and can be preferably used in various applications and particularly preferably used as an optical material which needs extremely high optical homogeneity on the surface and inside of a molded product after curing and molding. Further, if an epoxy component with a high curing reactivity is used as the organic resin component, a cured product excellent in thermal curing property can be obtained and preferably used as an optical member and the like. For example, appropriate control of an Abbe number and a refractive index permits production of a resin composition having desired optical characteristics. For example, an optical material having a low refractive index and a large Abbe number can be obtained as a one-composite resin composition (one-component optical material) excellent in handling ability. Further, such an optical material is cured to form a cured product (optical member) having a low refractive index and a large Abbe number. In addition, if a thermal-latent curing catalyst is used as a curing catalyst, the above-mentioned storage stabilization effect can be sufficiently exhibited, and simultaneously the curing can proceed within a preferable range, and therefore such a cured product can be preferably used in the above-mentioned various applications.

The above-mentioned organosiloxane compound is not especially limited as long as it is represented by the above-mentioned average compositional formula. With respect to the above-mentioned organosiloxane compound, the following non-substituted saturated aliphatic hydrocarbon groups (herein after, also referred to as non-substituted hydrocarbon group (I)) are preferable as $R^1$. Saturated aliphatic chain hydrocarbon groups (alkyl groups) (Group (1)) such as a methyl group, an ethyl group, an n-propyl group, an isopropyl group, an n-butyl group, an isobutyl group, a sec-butyl group, a t-butyl group, a pentyl group, a hexyl group, a 2-ethylhexyl group, an n-octyl group, a lauryl group, and a stearyl group; saturated aliphatic cyclic hydrocarbon groups (cycloalkyl groups) (Group (2)) such as a cyclopropyl group, a cyclobutyl group, a cyclohexyl groups, and a bicyclohexyl group; groups (Group (3)) that are some or all of hydrogen atoms of a saturated aliphatic chain hydrocarbon group (an alkyl group) are substituted with a saturated aliphatic cyclic hydrocarbon group (a cycloalkyl group); and groups (Group (4)) that are some or all of hydrogen atoms of a saturated aliphatic cyclic hydrocarbon group (a cycloalkyl group) are substituted with a saturated aliphatic chain hydrocarbon group (an alkyl group). The above-mentioned organosiloxane compound can be preferably used as long as the $R^1$ is the above-mentioned group, but the $R^1$ is particularly preferably an alkyl group.

Further, saturated aliphatic hydrocarbon groups containing 1 to 20 carbon atoms are preferable as the $R^1$.

A methyl group, an ethyl group, an n-propyl group, an isopropyl group, an n-butyl group, an isobutyl group, a sec-butyl group, a t-butyl group, a 2-ethylhexyl group, a lauryl group, a stearyl group, and a cyclohexyl group are more preferable as the above-mentioned $R^1$ because such groups are industrially easily available, and a methyl group and a cyclohexyl group are still more preferable.

If a plurality of the above-mentioned saturated aliphatic hydrocarbon groups exist in one molecule of the organosiloxane compound, the saturated aliphatic hydrocarbon groups may be the same or different.

It is preferable that the above-mentioned $R^2$ is an aryl group such as a phenyl group, a naphthyl group, and an anthranyl group; an aralkyl group such as a benzyl group; a group that is some or all of hydrogen atoms of an aryl group or an aralkyl group are substituted with an aliphatic hydrocarbon group such as a methylphenyl group (a toluoyl group), a dimethylphenyl group (a xylylene group), a diethylphenyl group, and a methylbenzyl group. These groups are also referred to as non-substituted-hydrocarbon group (II).

A phenyl group and a benzyl group are particularly preferable as the above-mentioned $R^2$ because such groups are industrially easily available. A phenyl group is most preferable.

Further, groups that are some or all of hydrogen atoms of hydrocarbon groups are substituted with another substituent are also preferable as the above-mentioned $R^1$ or $R^2$, in addition to the above-mentioned groups including only hydrocarbon. In this case, such groups mean the non-substituted hydrocarbon group (I) in $R^1$ and also mean the non-substituted-hydrocarbon group (II) in $R^2$. Hereinafter, the non-substituted hydrocarbon groups (I) and (II) are referred to as non-substituted hydrocarbon group Such an organosiloxane compound containing $R^1$ and/or $R^2$ is also included in the organosiloxane compound in the present invention. Examples of such a substituent include: groups that are some or all of hydrogen atoms of the non-substituted hydrocarbon group are substituted with a non-reactive substituent such as a halogen atom and an alkoxy group (such a non-reactive substituent-containing hydrocarbon group is also referred to as a non-reactive group-substituting hydrocarbon group); and groups that are some or all of hydrogen atoms of the non-substituted hydrocarbon group are substituted with a reactive substituent, for example, a polymerizable unsaturated bonding group such as a hydroxyl group, an amino group, a thiol group, a carboxylic acid group, a sulfonic acid group, an epoxy group, a glycidyl group, an epoxycyclohexane group, an oxetane group, and a vinyl group (also referred to as a reactive functional group-containing hydrocarbon group is also referred to as a reactive group-substituting hydrocarbon group).

It is preferable in the above-mentioned non-reactive substituent that the above-mentioned halogen atom is a fluorine atom. Preferable examples of the above-mentioned alkoxy group include an alkoxy group constituted by an alkyl chain that is the alkyl group mentioned in the aliphatic hydrocarbon group (Group 1) in $R^1$ and an alkoxy group constituted by an alkyl chain that is the cycloalkyl group mentioned in the aliphatic hydrocarbon group (Group 2) in $R^1$. More preferably, the alkyl chain is a methyl group or a cyclohexyl group.

Any of the above-mentioned non-substituted hydrocarbon groups, the non-reactive group-substituting hydrocarbon groups, and the reactive group-substituting hydrocarbon groups may be used as the above-mentioned $R^1$ and $R^2$. The non-substituted hydrocarbon groups and the non-reactive group-substituting hydrocarbon groups are more preferable and the non-substituted hydrocarbon groups are still more preferable. Preferable examples of each hydrocarbon group are mentioned above.

The above-mentioned reactive substituents and the reactive group-substituting hydrocarbon groups may increase the viscosity of the curable resin composition, possibly which reduces the storage stability of the curable resin composition in the present invention at a normal temperature. Therefore, it is preferable that none or a few of these reactive substituents are contained in the above-mentioned organosiloxane compound.

If the above-mentioned organosiloxane compound contains the reactive substituent, the proportion of the reactive substituent relative to the hydrocarbon groups is preferably less than 50% by weight in 100% by weight of the hydrocarbon groups ($R^1+R^2$). The proportion is preferably less than 10% by weight and more preferably less than 1% by weight. The proportion is more preferably less than 0.1% by weight, and still more preferably less than 0.01% by weight, and particularly preferably less than 0.001% by weight. Most preferably, 0% by weight of the reactive substituent is contained in the organosiloxane compound (the reactive substituent is not detected). As mentioned above, the reactive substituent means the reactive substituent contained in the above-mentioned reactive group-substituting hydrocarbon group. If the $R^1$ and/or $R^2$ are/is bonded to a silicon atom at the terminal of the molecule of the organosiloxane compound, such $R^1$ and/or $R^2$ are/is included in the above-mentioned "hydrocarbon group contained in the organosiloxane compound". The proportion of the reactive substituent contained in the reactive group-substituting hydrocarbon group is preferably less than 30% by weight in 100% by weight of the reactive group-substituting hydrocarbon group. The proportion is preferably less than 5% by weight, and more preferably less than 0.5% by weight. The proportion is more preferably less than 0.05% by weight, and still more preferably less than 0.005% by weight, and particularly preferably less than 0.0005% by weight. Most preferably, 0% by weight of the reactive substituent is contained in the organosiloxane compound (the reactive substituent is not detected).

If the above-mentioned organosiloxane compound contains the non-substituted hydrocarbon group and/or the non-reactive group-substituting hydrocarbon group, the proportion of the non-substituted hydrocarbon group and the non-reactive group-substituting hydrocarbon group is preferably 50% by weight or more in 100% by weight of the total amount of the hydrocarbon groups ($R^1+R^2$). More preferably, the proportion is 90% by weight or more. The proportion is more preferably 95% by weight or more and still more preferably 98% by weight or more, and particularly preferably 100% by weight. If the $R^1$ and/or the $R^2$ are/is bonded to a silicon atom at the terminal of the molecule of the organosiloxane compound, such $R^1$ and/or $R^2$ are/is included in the above-mentioned "hydrocarbon group contained in the organosiloxane compound".

The proportion of the non-substituted hydrocarbon group relative to the non-substituted hydrocarbon group and the non-reactive substituent-hydrocarbon group is preferably 70% by weight or more in 100% by weight of the non-substituted hydrocarbon group and the non-reactive substituent-hydrocarbon group. The proportion is more preferably 90% by weight or more. The proportion is more preferably 90% by weight or more, and still more preferably 98% by weight or more, and particularly preferably 100% by weight.

The above-mentioned Y is at least one selected from the group consisting of OR groups, hydroxyl groups, halogen atoms, and a hydrogen atom. The R is at least one selected from alkyl groups, cycloalkyl groups, aryl groups, and aralkyl groups.

The above-mentioned Y is preferably an OR group in which R is an alkyl group, a chlorine atom, a hydroxyl group, or a hydrogen atom. The above-mentioned Y is more preferably an OR group in which R is an alkyl group containing 1 to 5 carbon atoms, and still more preferably an OR group in which R is an alkyl group containing 1 carbon atom, that is, a methoxy group. It is preferable that the content of the above-mentioned Y is small. If the content of the Y is large, a curing reaction of the curable resin composition may proceed at a normal temperature. Specifically, it is preferable that a value c in the average compositional formula is less than 1. The value c is more preferably less than 0.4, and still preferably less than 0.1, and particularly preferably less than 0.01. The value c is most preferably 0.

It is preferable that the molar number of the contained Y is smaller than the total molar number of the $R^1$ and the $R^2$ because of the same reason. Specifically, it is preferable that the a, b, and c satisfy $c<a+b$. It is more preferable that the a, b, and c satisfy $c<(a+b+c)\times0.4$.

That is, it is preferable in the curable resin composition of the present invention that the organosiloxane compound satisfies $c<(a+b+c)\times0.4$ in the average compositional formula.

That is, it is preferable in the curable resin composition of the present invention that in the average compositional formula representing the organosiloxane compound, the content of Y satisfies $c<(a+b+c)\times0.4$.

The content of Y still more preferably satisfies $c<(a+b+c)\times0.2$, and particularly preferably $c<(a+b+c)\times0.1$, and most preferably $c<(a+b+c)\times0.01$.

The above-mentioned organosiloxane compound is represented by the above-mentioned average compositional formula, and it is preferable that a terminal bonding group bonded to the silicon atom at the terminal of the molecule of each organosiloxane compound is the above-mentioned $R^1$ or $R^2$. More preferably, the $R^1$ or the $R^2$ is the above-mentioned non-substituted hydrocarbon group or the above-mentioned non-reactive group-substituting hydrocarbon atom, and still more preferably, the $R^1$ or the $R^2$ is the above-mentioned non-substituted hydrocarbon group.

In addition, some or all of the groups bonded to the silicon atom at the molecular terminal may be groups except for the $R^1$ and the $R^2$. The above-mentioned Y (an RO group, a halogen atom, a hydroxyl group, and a hydrogen atom) is preferable, for example, and more preferable embodiments are the same as in the above-mentioned Y.

It is preferable that the proportion of the hydrocarbon groups constituted by the $R^1$ or $R^2$ in the above-mentioned bonding group of the organosiloxane compound molecule is 50% by mole or more relative to 100% by mole of the terminal bonding groups. The proportion is more preferably 80% by mole or more, and still more preferably 90% by mole or more, and particularly preferably 100% by mole.

In the above-mentioned organosiloxane compound, the a, b, c, and d satisfy $0\leq a<3$, $0\leq b<3$, $0<a+b<3$, $0<a+b+c<3$, and $a+b+c+2d=4$.

The above-mentioned a and b represent a ratio of the $R^1$ and a ratio of the $R^2$, respectively. Such organic groups are constituted by (1) the $R^1$, (2) the $R^1$ and the $R^2$, or (3) the $R^2$, and can be appropriately adopted depending on application of the resin composition. For example, in the embodiment (1) in which the organic groups are constituted by the $R^1$ (the $R^2$ is not contained), the refractive index of the resin composition can be lower, and a resin composition or a cured product having a low refractive index and a desired Abbe number can be obtained by appropriately selecting the organic resin component. In the embodiment (3) in which the organic groups are constituted by the $R^2$ (the $R^1$ is not contained), the refractive index of the resin composition can be larger, and a resin composition or a cured product having a high refractive index and a desired Abbe number can be obtained by appropriately selecting the organic resin component. In the embodiment (2) in which the organic groups are constituted by the $R^1$ and the $R^2$, the ratio of the R to the $R^2$ is varied to set the refractive index within a desired range. Thus, the refractive index of the polysiloxane itself can be controlled depending on the ratio of the $R^1$ to the $R^2$ in the above-mentioned organosiloxane compound, and therefore the refractive index of the obtained resin composition can be strictly controlled.

The above-mentioned a+b+c is more than 0 and less than 3. The above-mentioned a+b+c is preferably 0.5 or more and 2.7 or less, and more preferably 0.8 or more and 2.4 or less. The a+b is more than 0 and less than 3. The preferable range of the a+b is 0.4 or more and 2.7 or less and more preferably 0.7 or more and 2.4 or less.

If a resin with a high refractive index is produced, the proportion of a in the a+b+c, that is, a/(a+b+c) is preferably less than 0.4. The proportion is more preferably less than 0.2, and still more preferably less than 0.1, and particularly preferably less than 0.01. If a resin with a low refractive index is produced, the proportion of b in the a+b+c, that is, b/(a+b+c) is preferably less than 0.4. The proportion is more preferably less than 0.2, and still more preferably less than 0.1, and most preferably less than 0.01.

The molecular structure of the above-mentioned organosiloxane compound is not especially limited, and examples thereof include a (straight or branched) chain structure, a ladder structure, a chain or ladder cyclic structure, a cage structure, and a particle structure. The chain, ladder, or cage structure is preferable and the ladder structure is more preferable as the molecular structure. That is, the ladder structure, the linear (chain) structure, the cage structure, and the particle structure are preferable in this order. This is because the solubility to a resin component is high in this order. If the solubility is high, a resin composition including homogeneously dispersed organosiloxane compounds can be obtained. If the above-mentioned organosiloxane compound has a ladder or chain molecular structure, such a compound has high solubility to the resin composition. Therefore, a material excellent in optical transparency and mechanical characteristics can be obtained. Particularly if the organosiloxane compound having a ladder molecular structure is used, the following effects can be exhibited by adding a smaller amount of the organosiloxane compound into the resin composition, in comparison to the case where the organosiloxane compound having another structure is added. Examples of the effects attributed to addition of the organosiloxane compound include: (1) a cured product can be easily demolded after curing (excellent demoldability); (2) the transparency, the Abbe number, and the refractive index of the curable resin composition can be strictly controlled (excellent controllability); (3) the transparency, the Abbe number, and the refractive index of the cured product can be strictly controlled (excellent controllability); and (4) the cured product has excellent mechanical characteristics (high coefficient of elasticity and breaking strength).

If the above-mentioned molecular structure is a chain structure, the preferable range of the a+b+c in the above-mentioned average compositional formula is 1.5 or more and 2.7 or less. The range is more preferably 1.8 or more and 2.4 or less, and still more preferably 1.9 or more and 2.3 or less, and particularly preferably 2 or more and 2.2 or less. The preferable range of a+b is 1 or more and 2.7 or less, and more preferably 1.6 or more and 2.4 or less, and still more preferably 1.8 or more and 2.2 or less, and particularly preferably 2±0.05.

If the above-mentioned organosiloxane compound has a ladder or cage molecular structure, the preferable range of the a+b+c in the above-mentioned average compositional formula is 0.5 or more and 2 or less. The range is more preferably 0.8 or more and 1.6 or less, and still more preferably 0.9 or more and 1.4 or less, and particularly preferably 1 or more and 1.2 or less. The preferable range of the a+b is 0.4 or more and 2 or less, and more preferably 0.7 or more and 1.7 or less, and still more preferably 0.8 or more and 1.2 or less, and particularly preferably 1.+−.0.05.

The molecular structure of the above-mentioned organosiloxane compound is preferably a chain structure, a ladder structure, or a cage structure, as mentioned above. In this case, the above-mentioned a+b is preferably 1 or 2. If the a+b is 1, the molecular structure is generally a two- or higher-dimensional structure such as a ladder structure, a cage structure and a particle structure. If the a+b is 2, the molecular structure is a one-dimensional structure of a straight chain structure. Thus, the preferable embodiments of the present invention include the resin composition having an embodiment in which in the organosiloxane compound, the a+b in the formula is 1 or 2.

The above-mentioned molecular structure of the organosiloxane compound is more preferably a ladder structure as mentioned above. In this case, the above-mentioned a+b is preferably 1. That is, the preferable embodiments of the present invention include the resin composition having an embodiment in which the organosiloxane compound has a ladder molecular structure and the a+b in the formula is 1.

In the above-mentioned average compositional formula: $R^1aR^2bYcSiOd$, it is preferable that the ratio of the $R^1$ to $R^2$ (ratio of the a to the b) is varied within a range satisfying the above-mentioned a and b conditions. That is, the preferable embodiments of the present invention include the resin composition having an embodiment in which in the above-mentioned organosiloxane compound, the ratio of the $R^1$ to the $R^2$ is varied. Thus, if the ratio of the a to the b is varied, the refractive index of the resin composition (and the cured product) can be varied, and therefore a resin composition having a desired refractive index can be obtained. If the ratio of $R^1$ is increased, the refractive index of the obtained resin composition can be decreased, and if it is decreased (the content of the $R^2$ is increased), the refractive index of the obtained resin composition can be increased.

The above-mentioned ratio of the a to the b can be appropriately adopted depending on how much the refractive index is varied and the kind of the $R^1$ and the $R^2$.

If the resin composition and the cured product are prepared to have a low refractive index, it is preferable that the content of the aliphatic hydrocarbon group is large. Specifically, the a/(a+b)×100 is preferably 50% or more, and more preferably 80 to 100% by weight, and still more preferably 100%. If the resin composition and the cured product are prepared to have a high refractive index, it is preferable that the content of the aryl group or the aralkyl group is large. Specifically, the a/(a+b)×100 is preferably less than 50%, and more preferably 0 to 20%, and still more preferably 0%.

In the above-mentioned embodiment in which the ratio of the $R^1$ to the $R^2$ is varied, the following embodiments (a) and (b) are preferable: an embodiment (a) in which siloxane including the $R^1$ in the molecule (b=0, siloxane A) and siloxane including the $R^2$ in the molecule (a=0, siloxane B) are used as the organosiloxane compound and the content of the siloxane A in the organosiloxane compound is varied; and an embodiment (b) in which siloxane including the $R^1$ and the $R^2$ in the molecule (a≠0, b≠0) (siloxane AB) is used as the organosiloxane compound, and the content of the $R^1$ in this organosiloxane is varied. An embodiment in which two or more different organosiloxanes AB in which a, b, and c are different are used, and an embodiment in which the siloxane A and/or the siloxane B and the siloxane AB are used, are also preferably adopted.

The above-mentioned average compositional formula shows an average composition of the used organosiloxane molecule. The a, b, c, and d represent average bonding ratios of $R^1$, $R^2$, Y, and O to Si, respectively, and do not specify the bonding patterns. Specifically, the organosiloxane AB include an organosiloxane AB in which a siloxane skeleton in the molecule is constituted by an arbitrary silicon atom to which the $R^1$ and the $R^2$ are bonded, an organosiloxane AB in which a silicon skeleton in the molecule is constituted by a silicon atom to which only the $R^1$ is bonded as the organic group and a silicon atom to which only the $R^2$ is bonded, and an organosiloxane AB in which such siloxane skeletons are mixed. With respect to the silicon atom forming the siloxane skeleton in the organosiloxane compound represented by this average compositional formula, (1) the silicon atom to which the $R^1$ and the $R^2$ are bonded or (2) the silicon atom to which the $R^1$ is bonded and the silicon atom to which the $R^2$ is bonded are essentially included, and a silicon atom to which neither $R^1$ nor $R^2$ is bonded may be included. The combination, the ratio, and the position in the siloxane skeleton, of these silicon atoms, are not limited.

In the above-mentioned embodiment in which the ratio of the $R^1$ to the $R^1$ is varied, with respect to the total use amount of the organosiloxane compound, the embodiment (a) in which the siloxane A and the siloxane B are used together and the content of the siloxane A in the organosiloxane compound is varied is more preferable. Comparing the embodiment (a) with the embodiment (b), in the embodiment (b), the ratio of the $R^1$ to the $R^1$ is controlled using the organosiloxane AB in which the molecular weight, the molecular structure, and the ratio of the $R^1$ to the $R^2$ is arbitrarily controlled. In contrast, in the embodiment (a), the ratio of the $R^1$ to the $R^2$ is controlled by varying the mixing ratio of the siloxane A in which the molecular weight, the molecular structure, and the $R^1$ content are controlled to the siloxane B in which the $R^2$ content is controlled. Each of the siloxane A and the siloxane B having desired characteristics is easily available industrially, and deflection of the mixing ratio, which may occur at the time of production, can be prevented if the siloxane A or the siloxane B can be independently produced. Therefore, according to the embodiment (a), the physical properties of the composition can be more easily controlled in comparison to the embodiment (b). As mentioned above, the resin composition including the above-mentioned organosiloxane compound in which the ratio of the $R^1$ to the $R^2$ is controlled in accordance with the embodiment (a), that is, the resin composition including both of the siloxane A and the siloxane B is preferable.

Any siloxane including the $R^1$ and not including the $R^2$ may be preferably used as the above-mentioned siloxane A, and alkylsiloxane including an alkyl group as the $R^1$ is preferable. Any siloxane including the $R^2$ and not including the $R^1$ may be preferably used as the above-mentioned siloxane B, and phenyl siloxane including a phenyl group as the $R^2$ is preferable.

Thus, the preferable embodiments of the present invention also include the resin composition which includes, as the above-mentioned organosiloxane compound, alkyl siloxane and phenyl siloxane.

That is, in the curable resin composition of the present invention, it is preferable that an organosiloxane compound satisfying a=0 in the average compositional formula and an organosiloxane compound satisfying b=0 in the average compositional formula are used together as the metalloxane component.

If the above-mentioned siloxane A is used as the organosiloxane compound, each of the resin composition and the cured product shows a low refractive index. Appropriate selection of the epoxy component permits reduction in refractive index and increase in Abbe number of the obtained resin composition. In addition, if the siloxane B is used as the organosiloxane compound, the cured product of the resin composition shows a high refractive index. Therefore, appropriate selection of the epoxy component enables the obtained resin composition to have a high refractive index and a small Abbe number. Thus, the siloxane A and the siloxane B show different properties. Therefore, if the siloxane A and the siloxane B are used together, the ratio of the siloxane A to the siloxane B is varied to change the optical characteristics of the resin composition. Further, the characteristics of the resin composition can be changed by appropriately selecting the $R^1$ or the $R^2$ in the siloxane A or the siloxane B, as well as by varying the ratio as mentioned above.

It is preferable that the above-mentioned organosiloxane compound has a weight average molecular weight of 100 to 10000. If the weight average molecular weight is less than 100, the additional effect is small, and therefore effects such as a storage stabilization effect and an optical characteristic controllability may be insufficiently exhibited. Further, the compound may be volatilized by heat at the time of curing. In addition, a proportion of the silicon atom at the terminal in one molecule is increased. Accordingly, if the Y group in the above-mentioned average compositional formula, for example, a reactive group such as an alkoxy group (an alokoxysily group) and a hydroxyl group (a silanol group) is bonded to the terminal silicon atom, the proportion of the reactive group in the total addition amount of the siloxane is increased. As a result, the content of the reactive group in the resin composition is increased, possibly leading to reduction in storage stability. If the weight average molecular weight is more than 10000, the compound has a negligible compatibility with the organic resin component, and may be hardly dissolved thereinto. The above-mentioned weight average molecular weight is more preferably 500 to 5000, and still more preferably 800 to 2000.

In the above-mentioned organosiloxane compound, it is preferable that a is 1, b is 0, c is 0 to 0.4, and d is 1.5 to 1.3.

A desired organosiloxane compound can be obtained as the above-mentioned organosiloxane compound by appropriately selecting the organic groups or the ratio of the organic groups, as mentioned above. The siloxane A is preferably polymethylsilsesquioxane. It is preferable that such polymethylsilsesquioxane is represented by the above-mentioned average compositional formula in which $R_1$ is a methyl group, (c is preferably less than 0.7 and d is 1.5 or 1.3 to 1.5, which depends on the molecular weight or the condensation degree of the siloxane) and has a ladder molecular structure.

If the polymethylsilsesquioxane is used, a resin composition having a particularly large Abbe number and a particularly low refractive index can be obtained, and therefore such a resin composition can be preferably used in various applications which need such characteristics, such as an optical application. Thus, the preferable embodiments of the present invention also include the resin composition including polymethylsilsesquioxane as the above-mentioned organosiloxane compound.

In the curable resin composition of the resent invention, it is preferable that the metalloxane component is a ladder-shaped silsesquioxane compound. Further, it is preferable that the above-mentioned metalloxane component is an organosiloxane compound represented by the above-mentioned average compositional formula and is a ladder-shaped silsesquioxane compound. The term "ladder-shaped" means a form of a molecule of the silsesquioxane compound and the term has a meaning which is recognized as a technical term showing the molecular form.

The content (addition amount) of the above-mentioned organosiloxane compound in the resin composition is preferably 0.1 to 50% by weight relative to the total weight of the organic resin composition and the organosiloxane compound. If the content is less than 0.1% by weight, the additional effect is small, and the effects such as a storage stabilization effect and an optical characteristic controllability, may be insufficiently exhibited. If it is more than 50% by weight, the mechanical strength of the cured product may be insufficient. The content is more preferably 1 to 30% by weight, and still more preferably 3 to 20% by weight.

"Production Method of Organosiloxane Compound"

The production method of the above-mentioned organosiloxane compound is not especially limited as long as the operation and effects of the present invention are exhibited. However, it is preferable that the organosiloxane compound is produced by hydrolyzing and condensing a hydrolyzable silane compound represented by the following formula (I), the following formula (II), and the following formula (III) singly or together in an organic solvent:

(in the above formula, $R^1$ is the same as the above-mentioned $R^1$; $X^1$ represents a hydrolyzable group; and s is 1, 2, or 3);

(in the above formula, $R^2$ is the same as the above-mentioned $R^2$; $X^2$ represents a hydrolyzable group; and t is 1, 2, or 3); and

(in the above formula, $R^1$ and $R^2$ are the same as the above-mentioned $R^1$ and $R^2$, respectively; $X^1$ represents a hydrolyzable group; s' and t' are the same or different and represent 1 or 2; and s'+t' is 2 or 3).

In the above-mentioned formulae (I) to (III), $X^1$ and $X^2$ may be the same or different and preferably an RO group, a hydroxyl group, a hydrogen atom, or a halogen atom. R represents an alkyl group. R preferably contains 1 to 5 carbon atoms, and more preferably 1 or 2 carbon atoms. Specifically, $X^1$ and $X^2$ are preferably a methoxy group, an ethoxy group, or a chlorine atom.

The above-mentioned siloxane A can be obtained by hydrolyzing and condensing the silane compound represented by the above-mentioned formula (I). The above-mentioned siloxane B can be obtained by hydrolyzing and condensing the silane compound represented by the above formula (II).

The above-mentioned organosiloxane compound AB can be obtained by hydrolyzing and condensing the compounds represented by the above formulae (I) and (II), by hydrolyzing and condensing the compound represented by the above formula (I) and/or the compound represented by the above formula (II) and the compound represented by the above formula (III), or by hydrolyzing and condensing the compound represented by the above formula (III) singly. If the compounds represented by the above formulae (I) and (II) are cohydrolyzed and condensed, the $R^1$, the $R^2$, and the like can be appropriately adopted in the above formula (I) or (II), and therefore the same or different siloxane compounds (AB) can be obtained.

In the above formulae (I) and (II), it is preferable that s and t are the same or different and are 1 or 2. Particularly, a trialkoxysilane compound represented by the above formula in which s is 1 and t is 1 is preferable. The organosiloxane compound obtained by hydrolyzing and condensing the trialkoxysilane compound is preferable because it has excellent compatibility with the organic resin component.

In the above formula (III), it is preferable that each of s' and t' is 1.

If the organosiloxane compound of the present invention is hydrolyzed and condensed, a silane compound other than the silane compound represented by the above formulae (I) to (III) may be used as a starting material. Thus, a silane compound represented by the following formula (IV):

(in the formula, $X^3$ represents a hydrolyzable group) is preferable, for example, as the silane compound subjected to hydrolysis condensation, together with the silane compounds represented by the above formulae (I) to (III).

The above-mentioned $X^3$ may be the same or different and preferable embodiments of $X^3$ are the same as in $X^1$ and $X^2$. The silane compound represented by the above formula (IV) can be preferably hydrolyzed and condensed together with the silane compounds represented by the above formulae (I) to (III) and preferably used as long as a finally produced organosiloxane compound is represented by the above-mentioned average compositional formula. Specifically, it is preferable that the silane compound represented by the above formula (IV) is used as long as the ratio of the $R^1$ to the $R^2$ in the above-mentioned average compositional formula is within the above-mentioned range.

Further, it is preferable that the organosiloxane compound obtained by hydrolyzing and condensing the silane compounds represented by the formulae (I) to (IV) in an organic solvent are used after being purified by reprecipitation purification, extraction, or the like.

"Metal Oxide Fine Particles"

Metal oxide fine particles are also preferable as the metalloxane component included in the curable resin composition of the present invention. That is, it is preferable in the curable resin composition of the present invention that the metalloxane component is metal oxide fine particles. The metal oxide fine particles are mentioned below in more detail.

It is preferable that the above-mentioned curable resin composition includes metal oxide fine particles as the metalloxane component. If the curable resin composition includes metal oxide fine particles, the coefficient of thermal expansion can be reduced. If the metal oxide fine particles and the resin have equivalent refractive indexes, the appearance of the resin composition and that of the cured product can be controlled and the transparency can be exhibited. Therefore, such a resin composition can be particularly useful as an electrical or electronic component material or a material in an optical application. Further, if such a resin composition includes such a metal oxide fine particle component, a demolding effect can be exhibited. Specifically, if the resin composition includes a thermosetting resin (particularly epoxy material) as the organic resin component, for example, the organic resin component has an adhesive effect. Therefore, such a curable resin composition may adhere to a mold when being cured. If an appropriate amount of the metal oxide fine particle component is added to the resin composition, the demolding effect is exhibited and thereby the cured product is easily demolded.

Preferable examples of the above-mentioned metal oxide fine particles include metal oxide nanoparticles having a refractive index of 2 or more such as $TiO_2$, $ZrO_2$, ZnO, $In_2O_3$, $La_2O_3$, and $Y_2O_3$, and silica. Specifically, organosilica sols MEK-ST, IPA-ST, EG-ST, DMAC-ST, produced by NISSAN CHEMICAL INDUSTRIES, LTD., are preferable as the silica. Thus, the preferable embodiments of the present invention include a resin composition including a curable substance having a molecular weight of 700 or more and silica particles. Among these metal oxide fine particles, silicon components (silicon metal oxide fine particles) are preferable if a curable resin composition having a low refractive index is produced. Titanium oxide, zirconia, zinc oxide, lanthanum trioxide, indium oxide, and tin oxide are preferable if a curable resin composition having a high refractive index is produced.

If the curable resin composition of the present invention is used in a low refractive index lens application, a metal oxide mainly containing silicon as a metal component is preferable and silica is particularly preferable. Amorphous silica is preferable as the silica because of the low refractive index. Preferable examples thereof include colloidal silica obtained by neutralizing alkali silicate, and colloidal silica obtained from an alkoxysilane.

If the above-mentioned silicon metal oxide fine particles are included in the curable resin composition, such particles function as a low refractive index adjustor in the curable resin composition and the cured product of the composition.

The above-mentioned metal oxides such as a titanium oxide are preferable if the curable resin composition of the present invention is used in a high refractive index lens application. Those mentioned above may be used as the above-mentioned metal oxide, and any oxide mainly containing either of Ti, Zr, La, Y, Zn, In, or Sn as a metal component are preferably used. Such a metal oxide may be in any form of a single oxide, a composite oxide, and a solid solution. A crystalline oxide is preferable as such a metal oxide. If such a metal oxide is contained in the curable resin composition or the cured product each having a low refractive index, the metal oxide functions as a high refractive index adjustor and therefore the refractive index of the curable resin composition or the cured product can be effectively increased.

The shape of the above-mentioned metal oxide fine particles is not limited to a spherical shape, may be preferably an ellipse shape, a cubic shape, a rectangular shape, a pyramid shape, a needle shape, a columnar shape, a rod shape, a cylindrical shape, a scale shape, a flaky shape such as a (hexagonal) plate shape, or a cord shape.

It is preferable that the above-mentioned metal oxide fine particle component essentially includes inorganic fine particles obtained by a wet process (herein after, simply referred to as "wet metal oxide fine particles"). If the metal oxide fine particles include silica, such particles can be obtained by depositing silica through neutralization or decomposition reaction of a sodium silicate aqueous solution using acid or an alkali metal salt.

The above-mentioned metal oxide fine particle component is not especially limited as long as it essentially contains wet metal oxide fine particles, and may contain metal oxide fine particles produced by a dry process, for example. The content of the wet metal oxide fine particles in 100% by weight of the metal oxide fine particle component is preferably 10 to 100% by weight. That is, it is preferable that the metal oxide fine particle component essentially contains inorganic fine particles obtained by a wet process. The content is more preferably 50 to 100% by weight and still more preferably 80 to 100% by weight. It is particularly preferable that the metal oxide fine particle component includes substantially only wet metal oxide fine particles. Thus, the preferable embodiments of the present invention include an embodiment in which the metal oxide fine particles are wet materials. Further, it is preferable in the curable resin composition of the present invention that (1) the organic resin component has an Abbe number of 45 or more, and/or (2) the organic resin component is an alicyclic epoxy compound or a hydrogenated epoxy compound. That is, the preferable embodiments include a curable resin composition including an organic resin component and a metal oxide fine particle component, in which the metal oxide fine particle component essentially contains inorganic fine particles obtained by a wet process, and the organic resin component has an Abbe number of 45 or more. The preferable embodiments also include a curable resin composition including an organic resin component and a metal oxide fine particle component, in which the metal oxide fine particle component essentially contains inorganic fine particles obtained by a wet process, and the organic resin component essentially contains an alicyclic epoxy compound or a hydrogenated epoxy compound. It is more preferable in the above-mentioned curable resin composition that the resin component having an Abbe number of 45 or more as the organic resin component is an alicyclic epoxy compound or a hydrogenated epoxy compound (essentially contains an alicyclic epoxy compound or a hydrogenated epoxy compound).

Metal oxide fine particles produced by any of an external addition method and an internal deposition method can be used as the above-mentioned metal oxide fine particle component to be preferably mixed with the resin component. Particularly, particles obtained by an external addition method are more preferable because the particles have no possibility of reacting with the resin. It is preferable that the metal oxide fine particle component which is mixed with the resin in such a manner is dispersed into the curable resin composition to have a primary particle diameter. The metal oxide fine particles are preferably in the form of a dispersion (metal oxide fine particle dispersion). The preferable embodiments of the present invention also include a curable resin composition (resin composition) including an alicyclic curable substance containing a flexible material (preferably epoxy) and an inorganic dispersion.

The above-mentioned metal oxide fine particles are more preferably in the form of a wet silica dispersion. If the metal oxide fine particle component is dispersed as primary particles, the curable resin composition does not become turbid, and therefore such a composition can be preferably used in various applications. However, if the primary particles aggregate to become secondary particles having a size equivalent to optical light, the curable resin composition becomes turbid and the transmittance may be possibly reduced.

The curable resin composition of the present invention can provide a cured product excellent in transparency. If the curable resin composition exhibits more improved transparency, the performances as an optical member are improved and such a composition can be preferably used in various applications such as an optical application, an opto device application, and a display device application. In order to improve the transparency, it is preferable that the metal oxide fine particles (the metal oxide fine particles in the curable resin composition) have an average particle diameter of 400 nm or less. The average particle diameter is more preferably 100 nm or less and still more preferably 50 nm or less.

The primary particle diameter of the above-mentioned metal oxide fine particles is preferably 10 nm or more if the metal oxide fine particles consist of amorphous silica. The primary particle diameter is more preferably 15 nm or more.

It is preferable that the primary particle diameter is 15 nm or more because the resin composition including such particles is excellent in demoldability when being cured and therefore a cured product of the resin composition is easily demolded. If the primary particle diameter is 10 nm or more, the resin composition is excellent in storage stability. The reason why the resin composition has excellent storage stability if the primary particle diameter is 10 nm or more is not clear, but it might be because the larger particle diameter the metal oxide has, the smaller the amount of a surface silanol group per unit weight becomes.

The above-mentioned particle diameter is preferably 30 nm or less, and more preferably 25 nm or less. It is preferable that the above-mentioned primary particle diameter is smaller in view of transparency of the resin composition and the cured product.

If the above-mentioned metal oxide fine particles consist of crystalline metal oxide, the primary particle diameter is preferably 5 nm or more. Further, the primary particle diameter is preferably 20 nm or less, and more preferably 15 nm or less. The reason why such a range is preferable is as mentioned above in the above-mentioned amorphous silica.

The above-mentioned curable resin composition (resin composition) including the metal oxide fine particles preferably has an embodiment (1) in which a flexible material (flexible component) and a curable material and metal oxide fine particles with a particle diameter of 100 nm or less are included; an embodiment (2) in which silica with a particle diameter of 100 nm or less and an epoxy material are included; or (3) in which at least a curable material with a molecular weight of 700 or more and metal oxide fine particles with a particle diameter of 100 nm or less are included.

The size (average particle diameter and particle size distribution) of the above-mentioned primary particle diameter of the metal oxide fine particles can be determined based on a radius of inertia and a scattering intensity, measured by a small angle X-ray scattering method. In the small-angle X-ray scattering method, fluctuation of an electron density in a density uneven range changes a scattering movement at the time of X-ray irradiation, and therefore a particle size of 100 nm or less can be measured and in particular, a distribution state of primary particles in a dispersion medium can be comprehended as it is.

The small angle X-ray scattering method has an advantage that a dispersion state before curing can be known even if the dispersion medium is a resin.

A transmission electron microscope (TEM) may be preferably used as another method of measuring the particle diameter of the above-mentioned metal oxide fine particles. According to the TEM, a dispersion state and a diameter of each particle of the metal oxide fine particles in the curable resin composition can be evaluated. The primary particle diameter, the dispersion state and the aggregation state of the metal oxide fine particles can be determined by observing a TEM image of a sample. If the composition is a liquid resin, the liquid resin is used as the sample, and if the composition is a solid substance or a molded product after curing, such a composition is sliced into thin films using a microtome and then used as the sample.

The measurement of the radium of inertia by the small angle X-ray method or the observation by the TEM are useful as a method of directly evaluating the primary particle diameter, the particle size distribution, or the dispersion state of the metal oxide fine particles in the resin composition. A dynamic light scattering particle size distribution measurement method and the like may be employed as another method of evaluating the dispersion state or the dispersion particle diameter of the metal oxide fine particle in the composition if the resin composition is a liquid substance or a resin which is soluble in a solvent. A sample which is diluted by a solvent to have a proper fine particle concentration is generally used according to the dynamic light scattering particle size distribution measurement method, and therefore, the dispersion state of the fine particles is changed by the dilution. However, such a measurement method is useful in that the dispersion state and the particle distribution can be relatively compared and evaluated easily. Such methods for evaluating the particle diameter (primary particle diameter and dispersed particle diameter) of the metal oxide fine particles in the composition can be appropriately selected depending on the intended use.

It is preferable that the above-mentioned metal oxide fine particle component is inorganic fine particles having a pH of 3.4 to 11 at 25° C. when being dispersed into a solution in such a way that the particles accounts for 15% by weight relative to the solution. A solvent is degassed when such a resin as the curable resin composition of the present invention is prepared, and the degassing generally increases the viscosity, which causes gelling. As a result, the productivity may be reduced. If the metal oxide fine particles having the above-mentioned pH are used, the increase in viscosity is smaller when the solvent is degassed because of the high pH. Therefore, the gelling is not caused. Particularly if an alicyclic epoxy compound or a hydrogenated epoxy compound is used as the organic resin component, the epoxy group is not opened and therefore the gelling is suppressed as long as the above-mentioned pH is within the above-mentioned range. Further, stability of the resin over time is also improved. In addition, the solvent does not volatilize when the resin composition is cured, and therefore such a resin composition can be continuously produced. Accordingly, the composition can be preferably used in various applications.

The above-mentioned pH range is more preferably 3.4 to 9, and still more preferably 3.4 to 7. If the pH is 3.4 to 7, the curable resin composition can be more sufficiently suppressed from coloring. If the pH is 3.4 or more, the resin composition can be excellent in storage stability and hardly increases the viscosity. It is preferable that the pH is higher in view of the storage stability. If the pH is 7 or less, the cation curing reaction is not inhibited, and therefore such a resin composition is excellent in cation curing property. It is preferable that the pH is lower in view of the cation curing property. The metal oxide fine particles with a pH of 3.4 to 7 also may be preferably used.

The dispersion stability of the above-mentioned metal oxide fine particles depends on the pH of the metal oxide fine particles. The metal oxide fine particles can exhibit excellent dispersion stability if the particles have a pH of 6 or less or 8 or more. If the pH is within this range, it is difficult for the metal oxide fine particles to secondarily aggregate and precipitate during storage of the resin composition. Therefore, such particles are excellent in dispersion stability. Thus, the pH of the metal oxide fine particles is most preferably 3.4 to 6.

The above-mentioned pH of the metal oxide fine particles is obtained by measuring a sample consisting of 15% by weight of the metal oxide fine particles, 35% by weight of the organic solvent, and 50% by weight of water at 25° C. using a pH meter produced by HORIBA, Ltd. The pH value varies depending on the metal oxide fine particle concentration, the organic solvent amount, the water amount, and the measurement temperature, and therefore it is preferable that the sample including the composition at the above-mentioned proportions is prepared and measured for a pH value.

Preferable examples of the above-mentioned organic solvent include methanol, ethanol, isopropanol (IPA), butanol, methyl ethyl ketone (MEK), N,N-dimethylacetamide (DMAC), acetone, acetonitrile, ethylene glycol, and methyl isobutyl ketone (MIBK). MEK, methanol, ethanol, isopropanol (IPA), and butanol are more preferable, and MEK is still more preferable.

If such an organic solvent is used within the above-mentioned range, the metal oxide fine particles can have excellent dispersibility and can be measured for pH.

A neutral ion exchange water with a pH of 7 is preferably used as the above-mentioned water. The metal oxide fine particles including water at the above-mentioned proportion can be accurately measured for pH.

It is preferable that each of the above-mentioned metal oxide fine particles has a surface treated with an organic group.

If the particle includes an organic group on the surface, such a resin composition is more excellent in storage stability. This is possibly because the organic group covers the surface and therefore a function for a cationic polymerizable group (glycidyl group, epoxy group) of a metal hydroxyl group, which causes reduction in storage stability of the resin composition, can be sterically and chemically inhibited.

The organic groups mentioned in the $R^1$ and $R^2$ of the above-mentioned organosiloxane compound are preferable as the above-mentioned organic group. Inert groups which do not chemically react with the cationic polymerizable group of the organic resin compound, such as the non-substituted hydrocarbon groups (I) and the non-substituted hydrocarbon groups (II) are preferable. Specifically, hydrocarbon groups such as an aryl group, an aralkyl group, a (cyclo)alkyl group, a methyl group, an ethyl group, a butyl group, a hexyl group, a 2-ethyl hexyl group, a lauryl group, and a stearyl group, and saturated aliphatic cyclic hydrocarbon groups such as a cyclohexyl group are preferable. Aliphatic chain hydrocarbon groups and saturated aliphatic cyclic hydrocarbon groups are more preferable and alkyl groups and cycloalkyl groups are still more preferable. It is preferable that such groups have no active substituent which can chemically react with the cationic polymerizable group of the organic resin component. The organic group is more preferably an alkyl group or a cycloalkyl group because of excellent compatibility with the alicyclic epoxy, and particularly preferably a cycloalkyl group.

"Organic Resin Component"

The curable resin composition includes the above-mentioned organic resin component and the above-mentioned metal oxide fine particle component. It is preferable that the curable resin composition of the present invention includes 40 to 99% by weight of the organic resin component and 1 to 60% by weight of the metal oxide fine particle component relative to 100% by weight of the total of the organic resin component and the metal oxide fine particle component. If the contents of the organic resin component and the metal oxide fine particle component are within such ranges, the curable resin composition can have high transparency and a large Abbe number. Particularly if such a curable resin composition including a thermosetting resin as the organic resin component, the composition can overcome the heat resistance unlike a composition including a thermoplastic resin, and can be subjected to complicated and inexpensive processes unlike glass. With respect to the above-mentioned contents, more preferably, the organic resin component is 60 to 90% by weight and the metal oxide fine particle component is 10 to 40% by weight. More preferably, the organic resin component is 70 to 90% by weight and the metal oxide fine particle component is 10 to 30% by weight. Particularly preferably, the metal oxide fine particle component is 15 to 30% by weight.

The curable resin composition of the present invention preferably has an embodiment in which the resin composition includes metal oxide fine particles, an alicyclic epoxy compound and/or a hydrogenated epoxy compound, in which the metal oxide fine particles have a pH of 3.4 to 11 at 25° C. when being dispersed in a solvent in such a way that the particles account for 15% by weight relative to the solution and have an average particle diameter of less than 100 nm. The pH of the curable resin composition is the same as in the above-mentioned metal oxide fine particles. Particularly preferably, the curable resin composition has a pH of 3.4 to 6. According to such an embodiment, the Abbe number can be improved because of the use of the alicyclic epoxy compound and/or the hydrogenated epoxy compound; the composition can be continuously produced because the solvent does not volatilize when the composition is cured; and the metal oxide fine particles can be dispersed and therefore an optical resin with high transparency and heat resistance can be produced. Due to the high pH, the viscosity of the resin composition is hardly increased in the process of degassing the solvent during the resin production. Accordingly, the gelling hardly occurs and therefore the stability of the resin over time also can be improved.

The curable resin composition of the present invention includes a resin component having an Abbe number of 45 or more. The above-mentioned organic resin component is not especially limited as long as the component contains a resin component having an Abbe number of 45 or more and the function and effects of the present invention are exhibited. It is preferable that the organic resin component has excellent compatibility with the metalloxane component and the metalloxane component is homogeneously dispersed into the organic resin.

The content of the above-mentioned resin component having an Abbe number of 45 or more is preferably 1% by weight or more in the entire organic resin component. The content of the organic resin having an Abbe number of 45 or more is more preferably 5% by weight or more and still more preferably 10% by weight or more. Particularly if such a resin composition is used in an optical application which needs a large Abbe number, the content of the resin component having an Abbe number of 45 or more is more preferably 60% by weight or more, and still more preferably 70% by weight or more. If it is used in an optical application which needs a small Abbe number, the content thereof is preferably 1 to 70% by weight. The content is more preferably 10 to 60% by weight and still more preferably 20 to 50% by weight.

The above-mentioned organic resin component having an Abbe number of 45 or more is preferably a curable resin component. More preferably, the curable resin component is a cationic curable compound (a resin component including a cationic polymerizable group). If the organic resin component having an Abbe number of 45 or more is a cationic curable compound, it is preferable that the curable resin composition including the cationic curable compound contains a cationic curing catalyst. The cationic curing catalyst is mentioned below.

The above-mentioned cationic curable compound is a compound containing at least one cationic polymerizable group in the molecule. The cationic curable compound is preferably a compound containing two or more cationic polymerizable groups. More preferable is a polyfunctional cationic curable compound containing two or more cationic polymerizable groups.

Preferable examples of the above-mentioned cationic polymerizable group include: glycidyl groups such as a glycidyl ether group, and a glycidyl ester group; glycidyl ether groups bonded to an entirely or partially saturated aliphatic cyclic hydrocarbon such as a hydrogenated product of an aromatic glycidyl ether compound; an oxetane group; a dioxolane group; a trioxane group; epoxy groups containing an alicyclic group, such as an epoxycyclohexane group; and a vinyl ether group.

Among the above-mentioned cationic polymerizable groups, alicyclic epoxy groups and glycidyl ether groups directly or indirectly bonded to the saturated aliphatic cyclic hydrocarbon are preferable if the resin composition is used as an optical resin composition such as a lens. The curable resin composition including such a cationic polymerizable group can be excellent in curing rate. Particularly, alicyclic epoxy groups are preferable. Among the alicyclic epoxy groups, an epoxycyclohexane group is preferable. The curing characteristics of the cationic polymerizable groups are affected by not only the kind of the group but also an organic skeleton to which the group is bonded.

The above-mentioned resin component having an Abbe number of 45 or more is preferably a compound containing at least one cationic polymerizable group in the molecule, and more preferably a compound containing an epoxy group. In the present description, the "epoxy group" includes an epoxy group and a glycidyl group.

The above-mentioned epoxy group-containing compound preferably contains at least one selected from the group consisting of aliphatic epoxy compounds, hydrogenated epoxy compounds, alicyclic epoxy compounds, and aromatic epoxy compounds. Specifically, preferable examples of the aliphatic epoxy compounds include an aliphatic glycidyl ether epoxy resin and a glycidyl ether epoxy resin having a propylene glycol skeleton as the center skeleton. Preferable examples of the hydrogenated epoxy compound include a hydrogenated bisphenol A epoxy resin and a hydrogenated bisphenol F epoxy resin. Preferable examples of the alicyclic epoxy compounds include an epoxy resin having an epoxycyclohexane skeleton, and an epoxy resin in which an epoxy group is added to cyclic aliphatic hydrocarbon directly or with a hydrocarbon group there between. Preferable examples of the aromatic epoxy compounds include a bisphenol A epoxy resin, a bisphenol F epoxy resin, an epoxy resin having a fluorene skeleton, and an aromatic epoxy resin having a bromo substituent.

A resin containing an epoxycyclohexane group is preferable as the above-mentioned alicyclic epoxy compounds. Hydrogenated products of aromatic polyfunctional glycidyl ether compounds such as a bisphenol epoxy resin are preferable as the above-mentioned hydrogenated epoxy compounds.

Entirely or partially hydrogenated products of the aromatic epoxy compounds are preferable as the above-mentioned hydrogenated epoxy compounds. The aromatic epoxy compounds include an aromatic glycidyl ether compound.

Among the above-mentioned epoxy group-containing compounds, the alicyclic epoxy compounds, the hydrogenated epoxy compounds, the aliphatic epoxy compounds, and the aromatic epoxy compounds are preferable in this order. Specifically, a polyfunctional alicyclic epoxy compound containing an alicyclic epoxy group (herein after, also referred to as simply "polyfunctional alicyclic epoxy compound") is preferable as the alicyclic epoxy compounds. A polyfunctional glycidyl ether compound containing a glycidyl ether group directly or indirectly bonded to a saturated aliphatic cyclic hydrocarbon skeleton (herein after, also referred to as simply "polyfunctional glycidyl ether compound") is preferable as the hydrogenated epoxy compounds. An aliphatic glycidyl ether compound is preferable as the aliphatic epoxy compound. An aromatic glycidyl ether compound is preferable as the aromatic epoxy compound. Among them, the polyfunctional alicyclic epoxy compound and the polyfunctional glycidyl ether compound are more preferable because the curable resin composition can exhibit a high curing rate. Thus, such a curable resin composition can be more quickly cured because of the high curing rate, in comparison to other curable resin composition including the same amount of the catalyst.

Specifically, the alicyclic epoxy compounds and the hydrogenated epoxy compounds are preferable as the above-mentioned resin component having an Abbe number of 45 or more. Among them, in view of the stability of the curable resin composition and the curable property at the time of curing, hydrogenated epoxy compounds are particularly preferable if the metal oxide fine particles are used as the metalloxane component and alicyclic epoxy compounds are particularly preferable if the organosiloxane component is used as the metalloxane component.

Preferred examples of the above-mentioned alicyclic compounds include: alicyclic epoxy compounds such as 3,4-epoxycyclohexylmethyl-3,4-epoxycyclohexane carboxylate, and bis-(3,4-epoxycyclohexyl)adipate; alicyclic epoxides such as a hetero ring-containing epoxy resin, e.g. triglycidyl isocyanurate; alicyclic modified neopentylglycol(meth)acrylate ("R-629" or "R-644" produced by NIPPON KAYAKU Co., Ltd.); alicyclic acrylates containing an oxygen atom and/or a nitrogen atom in the structure such as tetrahydrofurfuryl(meth)acrylate and morpholinoethyl(meth)acrylate; alicyclic monofunctional maleimides such as N-cyclohexyl maleimide; and alicyclic bismaleimides such as N,N'-methylenebismaleimide, N,N'-ethylenebismaleimide, N,N'-trimethylenebismaleimide, N,N'-hexamethylenebismaleimide, N,N'-dodecamethylenebismaleimide, and 1,4-dimaleimide cyclohexane.

Preferable examples of the above-mentioned hydrogenated epoxy compounds include: alicyclic glycols containing a hydrogenated aromatic skeleton such as below-mentioned bisphenols, tetramethylbisphenol, tetramethylbisphenol F, hydroquinone, and naphthalenediol; hydrogenated bisphenol A epoxy resin; hydrogenated bisphenol S epoxy resin; and hydrogenated bisphenol F epoxy resin.

Among them, alicyclic epoxy compounds, hydrogenated bisphenol A epoxy resin, hydrogenated bisphenol S epoxy resin, and hydrogenated bisphenol F epoxy resin are more preferable, and alicyclic epoxy compounds are still more preferable. If the alicyclic epoxy compound is used, the high curing rate can be exhibited even at a smaller addition amount of a cationic curing catalyst such as a thermal acid generator and a photoacid generator, in comparison to the case where other organic resin components are used. Accordingly, it takes less time for the curable resin composition to be cured, and in addition, a cured product in which the heat resistance is excellent, coloring by heating and deterioration in the mechanical strength are suppressed can be obtained if the catalyst amount is reduced.

"Resin Component"

A resin component which can be preferably used as the above-mentioned organic resin component is mentioned below. The below-mentioned resin component includes both a resin component having an Abbe number of 45 or more and a resin component having an Abbe number of less than 45. Among them, a resin component having an Abbe number of 45 or more may be used as the resin component which is essentially contained in the above-mentioned organic resin component, that is, as the "resin component having an Abbe number of 45 or more". A curable resin and a thermoplastic resin are preferable as the above-mentioned resin component, for example. A thermosetting resin is desired in view of heat resistance, and a curable resin is desired in an application such as a lens which needs heat resistance.

The above-mentioned curable resin (also referred to as a curable epoxy resin) may contain a resin which has a curing property and has a high molecular weight or a molecular weight equivalent to that of an oligomer. Among them, the curable resin preferably contains a cationic curable component. The cationic curable component is preferably the above-mentioned resin component containing a cationic polymerizable group. Thus, the preferable embodiments of the present invention include the curable resin composition, wherein the organic resin component includes a cationic curable component.

A thermosetting resin or a photosetting resin is preferable as the above-mentioned curable resin. Embodiments of the curable resin include: an embodiment (1) in which the curable resin consist of a liquid or solid curing resin; an embodiment (2) in which the curable resin contains a liquid or solid curable resin and a curable compound or a (noncurable) solvent, having a molecular weight smaller than that of the curable resin; and an embodiment (3) in which the curable resin contains a liquid or solid noncurable resin and a curable compound having a molecular weight smaller than that of the resin component. An embodiment in which the curable resin contains an oligomer component of an acrylic resin such as PMMA and a (meth)acrylate monomer may be mentioned as the above-mentioned embodiment (3) in which the curable resin contains a liquid or solid noncurable resin and a curable compound with a molecular weight smaller than that of the resin component.

A compound containing at least one epoxy group (including a glycidyl group), a polyphenol compound, a compound containing a polymerizable unsaturated bond, an alicyclic compound, and a hydrogenated epoxy compound may be preferably used as the above-mentioned curable resin. Such compounds may be used singly or in combination of two or more of them. Among them, an alicyclic compound (alicyclic curable material) is preferable in order to improve the Abbe number. The use of the alicyclic compound can not only improve the Abbe number but also permits excellent optical characteristics. Therefore, such a curable resin composition can be preferably used in various applications. The above-mentioned alicyclic epoxy compounds, hydrogenated epoxy compounds, each having an Abbe number of 45 or more, and alicyclic compounds, alicyclic materials, and hydrogenated epoxy compounds, each having an Abbe number of less than 45, may be preferably used as the above-mentioned alicyclic compound.

The resin component of the present invention may contain a noncurable component such as a thermoplastic resin. Examples of the thermoplastic resin include polyethylene, polypropylene, polystyrene, acrylonitrile-styrene copolymer (AS resin), ABS resin consisting of acrylonitrile, butadiene, and styrenes vinyl chloride resin, (meth)acrylic resin, polyamide resin, acetal resin, polycarbonate resin, polyphenylene oxide, polyester, and polyimide. As the above-mentioned curable compound, a polyphenol compound, a compound having a polymerizable unsaturated bond, and the below-mentioned compound containing at least one glycidyl group and/or epoxy group are appropriately selected to be used.

Those mentioned above may be preferably used as the above-mentioned curable resin, but an alicyclic epoxy compound is particularly preferable. That is, it is preferable in the organic resin component of the present invention that at least one of the organic resin component having an Abbe number of 45 or more as an essential component and an organic resin component having an Abbe number of less than 45 (another organic resin component) is an alicyclic epoxy compound. More preferably, both of them are alicyclic epoxy compounds. That is, a resin composition including an alicyclic curable resin containing epoxy is preferable, and a resin composition including an alicyclic curable material (curable material) essentially containing an alicyclic epoxy is more preferable. Further, it is preferable that the metalloxane component included in the curable resin composition of the present invention essentially contains inorganic fine particles obtained by a wet process as the metal oxide fine particle component. Thus, the present invention include a curable resin composition including an organic resin component and a metal oxide fine particle component, in which the metal oxide fine particle component essentially contains inorganic fine particles obtained by a wet process and the organic resin component essentially contains an alicyclic epoxy compound or a hydrogenated epoxy compound.

The content of the above-mentioned alicyclic epoxy compound and/or the hydrogenated epoxy compound is not especially limited, as long as it is contained in the organic resin component. The content is preferably 5% by weight or more in the entire organic component, and more preferably 10% by weight or more. Particularly if the resin composition is used in an application which needs a large Abbe number, the content is preferably 60% by weight or more, and more preferably 70% by weight or more. Particularly preferably, the organic resin component contains substantially only the alicyclic epoxy compound or the hydrogenated epoxy compound. If the resin composition is used in an application which needs a small Abbe number, the content is preferably 1 to 70% by weight, and more preferably 10 to 60% by weight, and still more preferably 20 to 50% by weight.

It is preferable that the above-mentioned compound containing a polymerizable unsaturated bond contains a polymerizable unsaturated bond. Compounds containing one or more groups selected from the group consisting of (meth)acryloyl groups, vinyl groups, fumarate groups, and maleimide groups are preferable. In the present invention, the (meth)acryloyl groups mean an acryloyl group or an methacryloyl group. If the compound contains an acryloyl group, the acryloyl group contains a vinyl group. However, in this case, the compound is not regarded as a compound containing both of an acyloyl group and a vinyl group but as a compound containing an acryloyl group. The fumarate group means a group having a fumarate structure, that is, a fumaric acid ester structure.

Examples of the above-mentioned compound containing a (meth)acryloyl group include (poly)ester(meth)acrylate, urethane(meth)acrylate, the above-mentioned epoxy(meth)acrylate, (poly)ether(meth)acrylate, alkyl(meth)acrylate, alkylene(meth)acrylate, (meth)acrylate having an aromatic ring, and (meth)acrylate having an alicyclic structure. One or more species of them may be used. The above-mentioned various components may be preferably included in the curable resin composition of the present invention. It is particularly preferable that the curable resin composition includes a glycidyl group and/or epoxy group-containing compound as the organic resin component. The content of the glycidyl group and/or epoxy group-containing compound is preferably 30% by weight or more in the entire organic resin component. The content is more preferably 50% by weight or more and still more preferably 80% by weight or more, and most preferably 100% by weight. As mentioned above, it is preferable that the organic resin component of the present invention contains a glycidyl group and/or epoxy group-containing compound. It is sufficient that the glycidyl group and/or epoxy group-containing compound is contained in at least one of the resin component having an Abbe number of 45 or more and the resin component having an Abbe number of less than 45. However, it is preferable that the compound is included in both of them. The metalloxane compound included in the curable resin composition of the present invention is preferably an organosiloxane compound, as mentioned above. That is, the preferable embodiments of the present invention include an embodiment in which the above-mentioned curable resin composition is a resin composition including a glycidyl group and/or epoxy group-containing compound and an organosiloxane compound, wherein the organosiloxane compound is represented by the following average compositional formula:

$$R^1{}_a R^2{}_b Y_c SiO_d$$

(in the formula, $R^1$ represents a saturated aliphatic hydrocarbon group; $R^2$ represents at least one selected from the group consisting of aryl groups and aralkyl groups; Y represents at least one selected from the group consisting of RO groups, hydroxyl groups, halogen atoms, and a hydrogen atom; R represents at least one selected from the group consisting of alkyl groups, cycloalkyl groups, aryl groups, and aralkyl groups; and a, b, c, and d satisfy $0 \leq a < 3$, $0 \leq b < 3$, $0 \leq c < 3$, $0 < a+b+c < 3$, $0 < a+b < 3$, and $a+b+c+2d=4$.)

It is preferable that the above-mentioned resin component contains at least one epoxy group. If the resin component contains at least one epoxy group, such a resin composition has workability equivalent to that of a conventional thermosetting plastic material, and in addition, exhibits not only heat resistance equivalent to that of inorganic glass but also excellent characteristics such as moldability and processability. The compound containing at least one epoxy group which can be preferably used as the resin component of the present invention is mentioned below.

The following compounds and the like are preferable as the above-mentioned compound containing at least one epoxy group. Epibis glycidyl ether epoxy resins obtained by condensation reaction of a bisphenol such as bisphenol A, bisphenol F, bisphenol S, and fluorene bisphenol, an epoxy resin having a bisphenol A skeleton, a bisphenol S skeleton, or a fluorene skeleton, with epihalohydrin, and high molecular weight epibis glycidyl ether epoxy resins obtained by further adding the above-mentioned bisphenol such as bisphenol A, bisphenol F, bisphenol S, and fluorene bisphenol into such epibis glycidyl ether epoxy resins; novolac aralkyl glycidyl ether epoxy resins obtained by a condensation reaction of epihalohydrin with a polyphenol obtained by a condensation reaction of a phenol such as phenol, cresol, xylenol, naphthol, resorcin, catechol, bisphenol A, bisphenol F, bisphenol S, and fluorene bisphenol with formaldehyde, acetoaldehyde, propionaldehyde, benzaldehyde, hydroxy benzaldehyde, salichlaldehyde, dicyclopentadiene, terpene, coumarin, paraxylylene glycol dimethyl ether, dichroloparaxylylene, or bishydroxymethyl biphenyl; aromatic crystalline epoxy resins obtained by a condensation reaction of epihalohydrin with tetramethylbiphenol, teteramethylbisphenol F, hydroquinone, naphthalenediol, and the like, and high molecular weight aromatic crystalline epoxy resins obtained by further adding the above-mentioned bisphenol, tetramethylbiphenol, tetramethylbisphenol F, hydroquinone, or naphthalenediol into such aromatic crystalline epoxy resins; aliphatic glycidyl ether epoxy resins (aliphatic glycidyl ether epoxy compounds) obtained by a condensation reaction of epihalohydrin with the above-mentioned bisphenol, the alicyclic glycol having a hydrogenated aromatic skeleton such as tetramethylbisphenol, tetramethylbisphenol F, hydroquinone, and naphthalenediol, ethylene glycol, diethylene glycol, triethylene glycol, tetraethylene glycol, PEG600, propylene glycol, dipropylene glycol, tripropyrene glycol, tetrapropylene glycol, PPG, glycerol, diglycerol, tetraglycerol, polyglycerol, trimethylolpropane and its polymer, pentaerythritol and its polymer, mono/polysaccharides, such as glucose, fructose, lactose, and maltose; epoxy resins having an epoxycyclohexane skeleton (epoxy compounds having an epoxycyclohexane skeleton) such as (3,4-epoxycyclohexane)methyl 3',4'-epoxycyclohexylcarboxylate; glycidyl ester epoxy resins obtained by a condensation reaction of epihalohydrin with tetrahydrophthalic acid, hexahydrophthalic acid, or benzoic acid; and tertiary amine-containing glycidyl ether epoxy resins in the form of a solid at a room temperature, which is obtained by a condensation reaction of epihalohydrin with hydantoin, cyanuric acid, melamine, or benzoguanamine. Among them, the above-mentioned aliphatic glycidyl ether epoxy resins and the epoxy resins having an epoxycyclohexane skeleton are preferably used in order to suppress deterioration in appearance, caused by light irradiation.

Epoxy(meth)acrylate is also preferably used as the above-mentioned compound containing at least one epoxy group.

The above-mentioned epoxy(meth)acrylate is (meth)acrylate obtained by reacting mono or higher-functional epoxide with (meth)acrylic acid. Examples of the epoxide include epichlorohydrin modified hydrogenated bisphenol epoxy resins produced by (methyl)epichlorohydrin and hydrogenated bisphenol A, hydrogenated bisphenol S, hydrogenated bisphenol F, modified ethylene oxides thereof, or modified propylene oxides thereof; alicyclic epoxy resins such as 3,4-epoxycyclohexyl methyl, and bis-(3,4-epoxycyclohexyl)adipate; alicyclic epoxides such as hetero ring-containing epoxy resin such as triglycidylisocyanurate; epichlorohydrin modified bisphenol epoxy resins produced by (methyl)epichlorohydrin and bisphenol A, bisphenol S, bisphenol F, modified ethylene oxides thereof, or modified propylene oxides thereof; phenol novolac epoxy resins; cresol novolac epoxy resins; epoxidized products of various dicyclopentadiene modified phenol resins, obtained by reacting dicyclopentadiene with various phenols; aromatic epoxides such as an epoxidized product of 2,2',6,6'-tetramethyl bisphenol and phenyl glycidyl ether; (poly)glycidyl ether of glycols such as (poly)ethylene glycol, (poly)propylene glycol, (poly)butylene glycol, (poly)tetramethylene glycol, neopentyl glycol; (poly)glycidyl ethers of alkylene oxide modified products of glycols; (poly)glycidyl ethers of aliphatic polyalcohols such as trimethylolpropane, trimethylolethane, glycerin, diglycerol, erythritol, pentaerythritol, sorbitol, 1,4-butanediol, and 1,6-hexanediol; alkylene epoxides such as (poly)glycidyl ethers of alkylene oxide modified products of aliphatic polyalcohols; glycidyl esters of carboxylic acids such as adipic acid, sebacic acid, maleic acid, and itaconic acid, glycidyl ethers of polyester polyols of polyalcohols with polycarboxylic acids; copolymers of glycidyl(meth)acrylate or methyl glycidyl(meth)acrylate; and aliphatic epoxy resins such as glycidyl ester of higher fatty acids, epoxidized linseed oil, epoxidized soybean oil, epoxidized castor oil, and epoxidized polybutadiene.

It is preferable that the above-mentioned epoxy group-containing compound contains at least one selected from the group consisting of aliphatic epoxy compounds, hydrogenated epoxy compounds, alicyclic epoxy compounds, and aromatic epoxy compounds. Specifically, preferable examples of the aliphatic epoxy compounds include aliphatic glycidyl ether epoxy resins, and glycidyl ether epoxy resins having a propylene glycol skeleton as the central skeleton. Preferable examples of the hydrogenated epoxy compounds include hydrogenated bisphenol A epoxy resin and hydrogenated bisphenol F epoxy resin. Preferable examples of the alicyclic epoxy compounds include epoxy resin having an epoxycyclohexane skeleton. Preferable examples of the aromatic epoxy compounds include bisphenol A epoxy resin, bisphenol F epoxy resin, epoxy resin having a fluorene skeleton, and aromatic epoxy resin containing a bromo substituent.

Any of the above-mentioned compounds may be preferably used as the above-mentioned epoxy group-containing compound, but it is preferable that the compound is appropriately selected to be used depending on the intended use of the obtained resin composition (curable epoxy resin). In order to produce a resin composition and a cured product of the composition, which has a large Abbe number and a low refractive index is used in an optical application, it is preferable that at least one epoxy compound (also referred to as epoxy A) selected from the group consisting of aliphatic epoxy compounds, hydrogenated epoxy compounds, and alicyclic epoxy compounds. In contrast, in order to produce a resin composition and a cured product of the composition, which has a small Abbe number and a high refractive index, it is preferable that an aromatic epoxy compound (also referred to as epoxy B) is used. These epoxy A and epoxy B may be used together. A resin composition having a desired Abbe number and refractive index can be produced by changing a combination or a ratio of the epoxy A to the epoxy B. The above-mentioned compound containing at least one glycidyl group and/or epoxy group may be used singly or as a mixture of two or more species of them.

"Large Abbe Number and Low Refractive Index"

The curable resin composition of the present invention and the cured product thereof have a desired Abbe number and/or refractive index by appropriately selecting the organic resin component and/or the metalloxane component. Hereinafter, the case where a resin composition and a cured product each having a large Abbe number and a low refractive index is produced is further mentioned.

The above-mentioned metalloxane component included in the curable resin composition having a large Abbe number and a low refractive index is preferably an inert metalloxane compound having a low refractive index. Specifically, an organosiloxane compound that is at least one of the above-mentioned siloxane A and the siloxane AB, and metal oxide fine particles having a low refractive index is preferable.

Silica particles treated with an organic group consisting of a saturated aliphatic hydrocarbon group are preferable as the above-mentioned silica particles. Chain or cyclic saturated aliphatic hydrocarbon groups may be used as the saturated aliphatic hydrocarbon group. The average particle diameter of the above-mentioned silica particles is preferably within the above-mentioned range, and particularly preferably 15 to 25 nm. Amorphous silica particles are preferable as the silica particles. That is, an embodiment in which amorphous silica particles have an average particle diameter of 15 to 25 nm is more preferable as the silica particles. The above-mentioned silica particles preferably consist of wet silica, and more preferably wet silica dispersion.

The content of the above-mentioned metalloxane component preferably included in the above-mentioned curable resin composition having a large Abbe number and a low refractive index is preferably 0.1 to 50% by weight relative to 100% by weight of the metalloxane component. The content is more preferably 1 to 40% by weight and still more preferably 5 to 30% by weight.

The curable resin composition of the present invention includes a resin component having an Abbe number of 45 or more. The content of the resin component having an Abbe number of 45 or more is preferably within the above-mentioned range, and the Abbe number in the entire organic resin component is not especially limited. However, if a resin composition having a large Abbe number is produced, the Abbe number in the entire organic resin component is preferably 45 or more. The "Abbe number in the entire organic resin component is 45 or more" means that an average Abbe number in the entire resin component is 45 or more, and an organic resin component having an Abbe number of less than 45 may be contained. If such a resin composition having an Abbe number of 45 or more (an average Abbe number in the entire resin component of 45 or more), the degree of light scattering is reduced, and the resolution is improved, and therefore a curable resin composition can be excellent in optical characteristics in the case where the resin composition is used in an optical application. If the Abbe number is less than 45, light bleeding may occur when the composition is used in lens for eyeglasses, and such a composition exhibits insufficient optical characteristics and may not be preferably used as a material in various optical applications. The above-mentioned organic resin component has an Abbe number of 45 or more by appropriately combining the below-mentioned preferable embodiments.

The above-mentioned Abbe number is more preferably 47 or more and still more preferably 50 or more.

The above-mentioned organic resin component is not especially limited as long as the Abbe number (an average Abbe number in the entire organic resin component) is 45 or more. It is preferable that an organic resin having an Abbe number of 45 or more accounts for 40% by weight or more in the entire organic component. The proportion of the organic resin having an Abbe number of 45 or more is more preferably 60% by weight or more, and still more preferably 80% by weight or more, and particularly preferably 100% by weight (substantially all of the organic resins have an Abbe number of 45 or more).

The above-mentioned organic resin component is not especially limited as long as the entire organic resin component has an Abbe number of 45 or more and the operation and effects of the present invention are exhibited. It is preferable that the organic resin component has excellent compatibility with the metalloxane component and the metalloxane component is homogeneously dispersed into the organic resin. Specifically, the following epoxy A is preferable.

It is preferable in the curable resin composition of the present invention that the organic resin component has an average Abbe number of 45 or more, and the metalloxane component is silica particles having an average particle diameter of 10 to 30 nm, the silica particles being derived from an organic solvent dispersion of wet silica particles having a pH of 3.4 to 11 at 25° C. when being dispersed in a solution.

That is, it is preferable in the curable resin composition of the present invention that the entire organic resin component has an average Abbe number of 45 or more and the metalloxane component is silica particles having an average particle diameter of 10 to 30 nm, derived from an organic solvent dispersion of wet silica particles having a pH of 3.4 to 11.

The above-mentioned pH is preferably a value obtained when the silica particles are dispersed in a solution to account for 15% by weight in the solution. For example, the pH can be measured using the pH meter, as mentioned above.

It is preferable in the curable resin composition of the present invention that the organic resin component has an average Abbe number of 45 or more, and the organosiloxane compound satisfies a>b in the average compositional formula.

That is, it is preferable in the curable resin composition of the present invention that the entire organic resin component has an average Abbe number of 45 or more and the metalloxane component is an organosiloxane compound represented by the above formula, and the organosiloxane component satisfies a>b in the formula.

It is preferable that the organic resin component mainly contains the epoxy A in order to produce the above-mentioned resin composition and the cured product each having a large Abbe number and a low refractive index.

It is preferable that the resin composition having the above-mentioned characteristics includes an organic resin component which mainly contains at least one epoxy group-containing compound (epoxy A) selected from the group consisting of aliphatic epoxy compounds, hydrogenated epoxy compounds, and alicyclic epoxy compounds. Specific examples of these compounds are as mentioned above. In order to more increase the refractive index, it is preferable that a compound in which an epoxy group and the like is substituted with a sulfide group and a compound containing a brominated aromatic ring of an aromatic epoxy compound are preferably used. If the epoxy group is substituted with a sulfide group, the curable resin composition may have insufficient heat resistance depending on the application. Therefore, if a curable resin composition having reflow resistance is produced, a glycidyl group and/or an epoxy group-containing compound are/is preferably used. The composition having reflow resistance has a performance (function) of showing resistance to soldering, and such a composition also can be referred to "reflowable" composition. For example, a camera module having heat resistance is referred to as "reflowable camera module".

The content of the above-mentioned epoxy A is preferably 60% by weight or more in the entire organic resin component. If the content is 60% by weight or more, the epoxy A is a main component of the organic resin component. As a result, effects attributed to the epoxy A are sufficiently exhibited and therefore a resin composition and a cured product each having a large Abbe number and a low refractive index can be obtained. The content of the epoxy A is more preferably 80% by weight or more, and still more preferably 95% by weight or more.

In the above-mentioned resin composition having a large Abbe number, it is preferable that the proportion of an unsaturated bond-containing compound is 10% by weight or less. An aromatic ring in the organic resin component (for example, a phenyl group) and a double bond-containing alkenyl group, and the like may be mentioned as the unsaturated bond-containing compound. The unsaturated bond-containing compound is included in any of the organic resin component, the metalloxane component, and other components which are added if necessary. Such an unsaturated bond-containing compound generally reduces the Abbe number. Therefore, if the content of the unsaturated bond is more than 10% by weight, the Abbe number of the resin composition is insufficiently increased. Accordingly, if such a resin composition is used for a lens, a degree of light bleeding is increased and therefore such a resin composition may not be preferably used in various applications. The proportion of the unsaturated bond-containing compound is more preferably 10% by weight or less, and still more preferably 5% by weight or less in 100% by weight of the resin composition (including the organic resin component, the metal oxide fine particles, and if necessary other components). Particularly preferably, substantially no unsaturated bond-containing compound is contained. That is, an embodiment in which the unsaturated bond-containing compound is not included in any of the organic resin component, the metalloxane component, and other components which are added if necessary.

Also in a cured product of the resin composition, it is preferable that the content of such an unsaturated bond-containing compound is within the above-mentioned range. Thus, the preferable embodiments of the present invention include a resin composition and a cured product, in which the content of a double bonding group (aromatic ring and the like) is 20% or less in the resin.

In the resin composition having the above-mentioned characteristics, a hydrogenated epoxy compound and an alicyclic epoxy compound are more preferable as the epoxy A. An alicyclic epoxy compound is particularly preferable. If these compounds are used, an effect attributed to the use of the compound of the present invention among the organosiloxane compounds (an effect of suppressing curing reaction of an epoxy group at a normal temperature) is remarkably exhibited. It is preferable that the organic resin component has a smaller amount of the unsaturated bond in order to have the above-mentioned characteristics. Therefore, it is preferable that a compound containing an unsaturated bond such as an aromatic ring is included in the resin composition in such a way that the unsaturated bond accounts for 20% by weight or less in the resin. Examples of the compound containing an unsaturated bond such as an aromatic ring include epoxy B and the below-mentioned polyphenol compound, as the organic resin component, and include an organosiloxane compound having the $R^2$ (an aryl group or an aralkyl group) such as siloxane B, as the organosiloxane compound.

Preferable examples of the above-mentioned aliphatic epoxy compound include glycidyl ether of polytetramethylene ether, 1,6-hexanediol glycidyl ether, 1,4-butanediol glycidyl ether, trimethylpropane glycidyl ether, diethylene glycol glycidyl ether, and diglycidyl ether of polytetramethylene ether Among them, glycidyl ether of polytetramethylene ether is more preferable.

The use of the above-mentioned alicyclic epoxy compound improves the Abbe number and improves optical characteristics. Therefore, such a curable resin composition can be preferably used in various applications.

Examples of the above-mentioned alicyclic epoxy compound include:

3,4-epoxycyclohexylmethyl-3,4-epoxycyclohexanecarboxylate represented by the following formula:

[Formula 1]

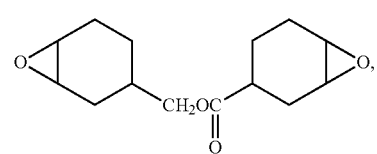

bis-(3,4-epoxycyclohexyl)adipate, 1,2,8,9-diepoxylimonene represented by the following formula:

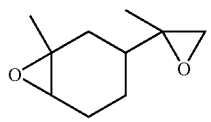

[Formula 2]

and 1,2-epoxy-4-(2-oxyranyl)cyclohexane adduct of 2,2-bis (hydroxymethyl)-1-butanol represented by the following formula:

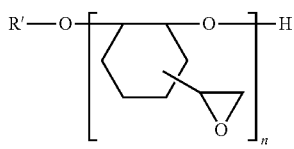

[Formula 3]

(in the formula, R' represents a 2,2-bis(hydroxymethyl) group), and alicyclic epoxy resin such as an epoxy resin in which an epoxy group is added to a cyclic aliphatic hydrocarbon directly or with a hydrocarbon group there between. Hydrogenated bisphenol A epoxy resin, hydrogenated bisphenol S epoxy resin, and hydrogenated bisphenol F epoxy resin, and the like are preferable as the hydrogenated epoxy compound. Among them, more preferred are alicyclic epoxy compounds; hydrogenated epoxy resins such as hydrogenated bisphenol A epoxy resin, hydrogenated bisphenol S epoxy resin, and hydrogenated bisphenol F epoxy resin; alicyclic epoxides such as a hetero ring-containing epoxy resin such as triglycidylisocyanurate. Among them, aliphatic epoxy compounds; hydrogenated bisphenol A epoxy resin, hydrogenated bisphenol S epoxy resin, and hydrogenated bisphenol F epoxy resin, and the like are more preferable. Alicyclic epoxy compounds (alicyclic epoxy resins) are still more preferable and epoxycyclohexane compounds are particularly preferable and epoxycyclohexane compounds having a high curing rate at the time of heating are most preferable. The epoxycyclohexane compounds are preferable in that an effect attributed to the use of the organosiloxane compound of the present invention (an effect of suppressing a curing reaction at a normal temperature) is remarkable.

The content of the alicyclic epoxy compound and/or the hydrogenated epoxy compound is as mentioned above. If the epoxycyclohexane compound is used, the content thereof is preferably 20% by weight or more in the entire organic resin component. The content is more preferably 40% by weight or more and still more preferably 50% by weight or more based on the above-mentioned optical limitations. It is preferable that the content of the epoxy cyclohexane compound in the resin having an Abbe number of 45 or more is 40% by weight or more. The content is more preferably 60% by weight or more, and still more preferably 80% by weight, and particularly preferably 100% by weight.

If the above-mentioned curable resin composition having a large Abbe number and a low refractive index is produced, it is preferable that the above-mentioned organic resin component and metalloxane component are used within the above-mentioned range. The combination of the above-mentioned organic resin component with the above-mentioned metalloxane component is not especially limited and appropriately adopted depending on applications. Among them, a combination of the alicyclic material with the wet metal oxide fine particles (wet inorganic fine particles) is preferable. A combination of the epoxy group-containing compound and the wet silica is more preferable.

It is preferable that the above-mentioned wet silica particles have a pH within the above-mentioned range. Thus, the preferable embodiments of the present invention include a curable resin composition (transparent resin composition) including an alicyclic curable substance and a mild acid wet silica dispersion and a method for producing a curable resin composition using metal oxide fine particles having a pH within the above-mentioned range.

The Abbe number and the refractive index of the above-mentioned resin composition can be controlled depending on the combination of the epoxy component (A and/or B), as mentioned above. The refractive index and the Abbe number can be also controlled finely by adjusting the organic group of the organosiloxane compound and the addition amount of the compound, as mentioned above. Further, also by using the above-mentioned specific silica particles as the metalloxane component, the refractive index and the Abbe number can be finely adjusted. Accordingly, a resin composition produced by appropriately selecting these specific metalloxane component and specific epoxy compound can be used as an optical material having strictly controlled optical characteristics particularly in an optical application. Further, such a composition can meet needs of various markets. Further, a cured product of the above-mentioned resin composition, for example, an optical material-molded product such as a lens or an optical material film, each having strictly controlled optical characteristics, can be obtained.

A resin composition having a large Abbe number as the above-mentioned optical characteristics, or an optical material including such a resin composition can be produced particularly preferably by using an organic resin component mainly containing the above-mentioned epoxy A and the siloxane A (or an organosiloxane compound having a high ratio of the $R^1$) in combination. This combination also permits production of a resin composition having a low refractive index and an optical material including such a resin composition. That is, the use of the epoxy A permits the large Abbe number and the combination use of the epoxy A and the siloxane A (or an organosiloxane compound (AB) having a high ratio of the $R^1$) permits production of a resin composition having a large Abbe number.

If the siloxane B (or an organosiloxane compound (AB) having a high ratio of the $R^2$) is used as the organosiloxane compound in the above-mentioned combination, the refractive index is increased and therefore, a resin composition having a large Abbe number attributed to the epoxy A and a high refractive index attributed to the organosiloxane compound can be obtained.

A resin composition having a small Abbe number as the above-mentioned optical characteristics or an optical material including such a resin compound can be produced particularly preferably by using an organic resin component mainly containing the above-mentioned epoxy B and the siloxane B (or an organosiloxane compound having a high ratio of the $R^2$) in combination. This combination also permits production of a resin composition having a high refractive index and an optical material including such a resin composition. That is, the use of the epoxy B permits the small Abbe number and the combination use of the epoxy B and the siloxane B (or an organosiloxane compound having a high ratio of the $R^2$) enables the resin composition or the optical material to have a high refractive index. The refractive index of the resin composition or the optical material is increased by using a metal oxide such as Ti, Zr, Zn, In, La, and Y as the metalloxane component instead of the above-mentioned siloxane B.

If the siloxane A (or an organosiloxane compound having a high ratio of the $R^1$) is used as the organosiloxane compound in the above-mentioned combination, the refractive index is reduced and therefore, a resin composition having a small Abbe number attributed to the epoxy B and a low refractive index attributed to the organosiloxane compound can be obtained.

A resin composition or an optical material, having an intermediate number of the above-mentioned Abbe number and an intermediate value of the above-mentioned refractive index can be produced by adjusting the combination of the epoxy components and the ratio of the $R^1$ to the $R^2$ in the organosiloxane compound (siloxane). Thus, the preferable embodiments of the present invention include an embodiment (1) two or more different organosiloxane compounds (siloxane compounds) are used in combination; an embodiment (2) in which two or more different epoxy compounds are used in combination; an embodiment (3) in which two or more different epoxy compounds and two or more different organosiloxane compounds are used in combination, in order to control the Abbe number and the refractive index.

The resin composition of the present invention can satisfy a desired Abbe number or a desired refractive index depending on the combination of the epoxy A with the epoxy B (and if necessary, with the organosiloxane compound). Further, depending on the combination of the epoxy components, the thermal temperature and the thermal time needed in the curing and molding step can be varied and therefore a response to various conditions and the like can be permitted. For example, if a cured product having excellent curable characteristics such as mechanical characteristics is obtained by heating for a short time or heating at a relatively low temperature, it is preferable that the resin composition includes an alicyclic epoxy compound (also referred to as epoxy C) or a hydrogenated epoxy compound (also referred to as epoxy D) as the epoxy A. The resin composition more preferably includes the epoxy C, and particularly preferably includes an epoxy compound having an epoxycyclohexane skeleton, an epoxy resin in which an epoxy group is added to a cyclic aliphatic hydrocarbon directly or with a hydrocarbon group there between, and the like. That is, the epoxy C and the epoxy D are one kind of the epoxy A. In the present description, the "epoxy A" means the epoxy A including the epoxy C and the epoxy D. The epoxy A not including the epoxy C and the epoxy D is referred to as "epoxy A'." The above-mentioned or following one or more compounds may be used as the above-mentioned epoxy A, A', B, C, D, and organosiloxane compound, respectively.

In the present invention, the above-mentioned resin composition or the conditions can be controlled by using the above-mentioned specific organosiloxane compound as an additive and the epoxy component in combination. The resin composition sufficiently exhibits the operation and effects of the present invention and has excellent storage stability. The above-mentioned cationic curable resin composition which is produced without a curing agent is preferable as the resin composition in order to prevent coloring.

If a resin composition excellent in mechanical characteristics is obtained as the resin composition of the present invention by heating at a low temperature for a short time, the most excellent operation and effects, which are attributed to the use of the organosiloxane that is specified to a specific organic group-containing compound, are exhibited in the case where the resin composition includes the epoxy C, followed by the case where it includes the hydrogenated epoxy compound D, and finally the case where it includes the epoxy A'. The lowest operation and effects are exhibited in the case where the resin composition includes the epoxy B. This may be because the reactivity at a normal temperature is reduced in order of the epoxy C, the epoxy D, the epoxy A', and the epoxy B. That is, the curing reactivity (easiness of the curing reactivity due to the ring-opening of the epoxy group) is reduced in order of the epoxy C, the epoxy D, the epoxy A', and the epoxy B. Therefore, the epoxy C has the highest curing reaction rate at the time of heating. Therefore, the epoxy C is a preferable component if the resin composition needs to be cured for a short time. According to the resin composition of the present invention, the organosiloxane compound containing an organic group with a low reactivity (the $R^1$ and/or the $R^2$) is used as the metalloxane component. However, if a silica particle whose surface is not unactivated or polysiloxane containing a functional group with a high reactivity or an acid/basic functional group is used, gelling at a normal temperature occurs and a reaction which deteriorates the storage stability is generated in the same order as the curing reaction.

If the above-mentioned resin composition requires suppression of deterioration in appearance at the time of light irradiation, an embodiment in which the resin composition includes the hydrogenated epoxy compound (epoxy D) or the alicyclic epoxy compound (epoxy C) as the organic resin component is preferable. An embodiment in which the resin composition includes at least one compound of hydrogenated epoxy compounds and alicyclic epoxy compounds is more preferable and an embodiment in which the resin composition essentially includes an alicyclic epoxy compound is still more preferable, and an embodiment in which the resin composition includes both of a hydrogenated epoxy compound and an alicyclic epoxy compound is particularly preferable. An epoxy resin having an epoxycyclohexane skeleton is preferable as the above-mentioned alicyclic epoxy compound.

The following compounds may be preferably used as an epoxy resin having an epoxycyclohexane skeleton or an epoxy resin in which an epoxy group is added to a cyclic aliphatic hydrocarbon directly or with a hydrocarbon group there between in accordance with a preferable embodiment of the above-mentioned alicyclic epoxy compound (epoxy C).

Name:

3,4-epoxycyclohexenylmethyl-3',4'-epoxycyclohexenecarboxylate, Product name: CELLOXIDE 2021P Name: 1,2-epoxy-4-(2-oxiranyl)cyclohexane adduct of 2,2-bis(hydroxymethyl)-1-butanol, Product name: EHPE3150

Name: 1,2-epoxy-4-(2-oxiranyl)cyclohexane adduct of 2,2-bis(hydroxymethyl)-1-butanol and 3,4-epoxycyclohexenylmethyl-3,4'-epoxycyclohexanecarboxylate, Product name: EHPE3150CE Name: 1,2:8,9-diepoxylimonene, Product name: CELLOXIDE 3000

Name: vinylcyclohexene monooxide 1,2-epoxy-4-vinylcyclohexane, Product name: CELLOXIDE 2000, CELLOXIDE 2081 (every product is produced by DICEL CHEMICAL INDUSTRIES, LTD.)

Among them, 2021P and EHPE3150 are more preferable.

The above-mentioned alicyclic epoxy compound is mentioned below.

The above-mentioned CELLOXIDE 3000 is represented by the following formula:

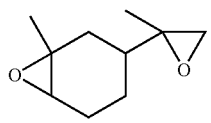

[Formula 4]

With respect to typical common characteristics of the CELLOXIDE 3000, the viscosity (mPa·s/25° C.) is 5 to 20; the epoxy equivalent is less then 93.5; and the boiling point (° C./760 mmHg) is 228.

The above-mentioned CELLOXIDE 2000 is represented by the following formula:

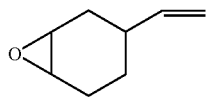

[Formula 5]

The above-mentioned CELLOXIDE 2000 is a monoepoxide containing a vinyl group. With respect to typical common characteristics of the CELLOXIDE 2000, the hue (APHA) is less than 50, the purity (%) is more than 95, the boiling point (° C./8 to 9 mmHg) is 49 to 53, and the viscosity (mPa·s/25° C.) is 1.5.

The above-mentioned EHPE 3150 is represented by the following formula:

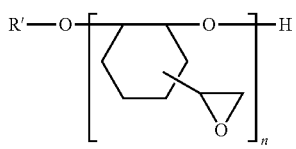

[Formula 6]

(in the formula, R' is as mentioned above). With respect to typical common characteristics of the EHPE 3150, the appearance is a transparent flake; the epoxy equivalent is 170 to 190; the softening point (° C.) is 70 to 85 (the softening point is measured in accordance with JIS K6911). Characteristics of the above-mentioned EHPE 3150 are that no chlorine impurities are included (chlorine starting materials are not used); the epoxy group has a high reactivity; the cured product has a high Tg, weather resistance, and transparency.

The above-mentioned CELLOXIDE 2021 is represented by the following formula:

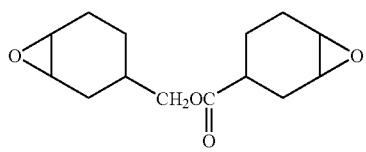

[Formula 7]

With respect to typical common characteristics of the CELLOXIDE 2021, the hue (APHA) is less than 50; the epoxy equivalent is 128 to 145; and the viscosity (mPa·s/25° C.) is 100 to 400.

The above-mentioned CELLOXIDE 2021P is a purified product of the CELLOXIDE 2021. With typical common characteristics of the CELLOXIDE 2021P, the hue (APHA) is less than 50; the epoxy equivalent is 128 to 145; and the viscosity (mPa·s/25° C.) is 150 to 400.

The above-mentioned CELLOXIDE 2081 is epsilon-caprolactone-modified 3,4-epoxycyclohexylmethyl 3',4'-epoxycyclohexanecarboxylate.

The CELLOXIDE 2081 has flexibility, and as typical common characteristics, has a liquid shape (at a normal temperature), a hue (APHA) of less than 100, an epoxy equivalent of 190 to 210, and a viscosity (mPa·s/25° C.) of 80 to 130.

"Small Abbe Number and High Refractive Index"

It is preferable that an organic resin component having a large unsaturated bond amount is used if a resin composition or an optical material, each having a small Abbe number and a high refractive index, is produced as the above-mentioned resin composition or optical material. That is, a curable resin composition including an organic resin component and a metalloxane compound, in which the curable resin composition has an unsaturated bond amount of 40% by weight or more relative to 100 by weight of a cured body of the composition, is preferable. The "unsaturated bond amount" used herein means a total amount of unsaturated bonds contained in the cured body. If a component other than the organic resin component and the metalloxane compound (another component) contains an unsaturated bond, the amount of the unsaturated bond contained in another component is also included in the above-mentioned total amount.

It is preferable that the resin composition has an unsaturated bond of 40% by weight or more relative to 100% by weight of a cured body of the composition (also referred to as "cured product"). The unsaturated bond amount used herein means a total weight of a carbon atom, a sulfur atom, a nitrogen atom, a boron atom, a silicon atom, a phosphorus atom, a germanium atom, an oxygen atom, each forming an unsaturated bond, and an adding hydrogen atom and halogen atom. That is, it is a total weight of atoms forming the unsaturated bond contained in 100% by weight of the cured body, and hydrogen atoms and halogen atoms which are bonded to the atoms. Specifically, the unsaturated bond amount means a total weight at CH=CCl part if the resin composition has a structure of —CH$_2$CH$_2$CHCl—CH=CCl—CH$_2$CH$_2$—.

If the carbon atom forms an aromatic ring, the unsaturated bond amount represents an amount % by weight of an aromatic ring contained in 100% by weight of the cured body. In this case, even if the aromatic ring has a substituent, the weight of the substituent not containing an unsaturated bond is not included, but the weight of the aromatic ring constituted by a carbon atom and a hydrogen atom is included in the total weight of the unsaturated bond. If the halogen atom is bonded to the aromatic ring as a substituent, the halogen atom is included in the total weight of the unsaturated bond based on the above-mentioned definition. In the present invention, the preferable embodiments include an embodiment in which the unsaturated bond is constituted by the aromatic ring.

If the above-mentioned unsaturated bond amount is less than 40% by weight, the Abbe number is insufficiently decreased, and a curable resin composition excellent in optical characteristics such as transparency and refractive index may not be produced. The unsaturated bond amount is more preferably 43% by weight or more, and still more preferably 45% by weight or more. The upper limit of the unsaturated bond amount is preferably 70% by weight or less.

It is preferable in the above-mentioned curable resin composition that a ratio of the unsaturated bond of the organic resin component to the unsaturated bond of the metalloxane component is (100 to 0) to (10 to 90). The ratio is more preferably (90 to 10) to (10 to 90), and still more preferably (80 to 20) to (20 to 80), and particularly preferably (60 to 40) to (40 to 60).

If the above-mentioned unsaturated bond is derived from an aromatic ring, examples of such an aromatic ring-containing compound include aromatic rings in the organic resin component (for example, a phenyl group, a fluorene skeleton, and a carbazole skeleton), and alkenyl groups containing a double bond. The compound containing an unsaturated bond is included in any of the organic resin component, the metalloxane component, and other components which are added if necessary.

With respect to a method of quantitating the unsaturated bond amount of the cured product of the above-mentioned curable resin composition, the curable resin composition is analyzed by element analysis, NMR, IR, and the like to reveal the structure and the like, and further subjected to quantitative analysis by $^1$H-NMR and the like, thereby quantitating a carbon atom, a sulfur atom, a nitrogen atom, a boron atom, a silicon atom, a phosphorus atom, a germanium atom, an oxygen atom, each forming the unsaturated bond, and an adding hydrogen atom or halogen atom. The curable resin composition is not especially limited as long as the operation and effects of the present invention are exhibited. The curable composition may include a component containing no unsaturated bonds.

The above-mentioned unsaturated bond amount can be determined by the following procedures.

(1) The curable resin composition is cured to produce a cured product.
(2) The above-mentioned cured product and/or the resin composition are/is subjected to element analysis to determine the compositional formula. Existence of an unsaturated bond of the cured product and a functional group forming the unsaturated bond are specified by IR, or NMR measurement.
(3) The NMR measurement is performed using the cured product and/or the resin composition whose weight is quantitated, and an external standard whose weight is quantitated.
(4) Based on a peak area of the external standard, a peak area derived from the unsaturated bond, and a weight of the external standard in the above-mentioned NMR measurement (3), the unsaturated bond amount contained in the cured body used for the NMR measurement is calculated.
(5) From the results of the above-mentioned (4), the unsaturated bond amount contained in 100% by weight of the cured body is determined. In the above-mentioned NMR measurements (2) and (3), one or more proper nuclear species are selected for the measurements. For example, if the unsaturated bond is derived from an aromatic ring, it is preferable that $^1$H-NMR is singly used or $^1$H-NMR and $^{13}$C-NMR are used in combination. If a fluorine atom is bonded to an atom forming the unsaturated bond, $^{19}$F-NMR is preferably used. The used external standard is appropriately adopted depending on the nuclear species. TMS is preferable if $^1$H-NMR is used, generally.

It is preferable in the above-mentioned curable resin composition that the organic resin component essentially includes an aromatic ring, and an amount of the aromatic ring is 40% by weight or more relative to 100% by weight of a cured body of the resin composition. It is preferable that the above-mentioned curable resin composition essentially includes an organic resin component containing an aromatic ring. It is preferable that an organic component having an aromatic ring is included as an organic component other than the organic resin component contained in the curable resin composition. The organic component is not especially limited as long as it is a component consisting of an organic compound and the operation and effects of the present invention are exhibited. A component not containing an aromatic ring may be included as the organic component. It is preferable that the above-mentioned organic component is excellent in compatibility with the metalloxane component and the metalloxane component is homogeneously dispersed into the organic resin.

The above-mentioned aromatic ring amount is 40% by weight or more relative to 100% by weight of a cured body of the resin composition. If the aromatic ring amount is within such a range, a curable resin composition having a sufficiently reduced Abbe number and excellent optical characteristics such as transparency and refractive index can be obtained. The aromatic ring amount is more preferably 43% by weight or more and still more preferably 45% by weight or more. The upper limit is preferably 70% by weight or less. Such an aromatic ring amount means an amount of aromatic rings contained in the organic component and the metalloxane component. That is, if only the organic component contains an aromatic ring, the aromatic ring amount means an amount % by weight of the aromatic rings contained in the organic component relative to 100% by weight of a cured body of the resin component. If the metalloxane component also contains an aromatic ring, the aromatic ring amount means a total amount % by weight of the aromatic rings in the organic component and those in the metalloxane component relative to 100% by weight of the cured body. If the metalloxane component also contains an aromatic ring, a ratio (molar ratio) of the aromatic ring in the organic component to the aromatic ring in the metalloxane component is (99 to 1) to (10 to 90), and more preferably (80 to 20) to (20 to 80), and still more preferably (60 to 40) to (40 to 60).

A coefficient of thermal expansion of the above-mentioned curable resin composition can be reduced if the composition includes the metalloxane component. If the metalloxane component (inorganic substance) and the organic component (for example, resin) have equivalent refractive indexes, appearance of the resin composition and its cured product can be controlled and transparency can be exhibited. Therefore, such a resin composition and a cured product can be especially useful as a material in an electrical or electronic component material or in an optical application. Further, the resin composition exhibits a demolding effect if it contains the metalloxane component. Specifically, if a thermosetting resin (especially, epoxy material) is included as the organic component, the organic component has an adhesive effect. Therefore, such a curable resin composition may adhere to a mold when being cured. Addition of a proper amount of the metalloxane component enables the cured product to be easily demolded because of its demolding effect.

It is preferable that the above-mentioned metalloxane component contains an aromatic ring. If the metalloxane component contains an aromatic ring, an amount of the aromatic rings contained in the curable resin composition increases, and therefore, the Abbe number can be sufficiently reduced. As a result, the operation and effects of the present invention can be sufficiently exhibited. The preferable embodiments of the present invention include an organic-inorganic composite resin composition including an organic component containing an aromatic ring (for example, an organic resin) and a metalloxane component containing an aromatic ring (for example, an organosiloxane compound, an inorganic dispersion, or metal oxide fine particles). The amount of the aromatic rings contained in the metalloxane component can be determined from the above-mentioned aromatic ring amount (the amount of the aromatic rings contained in the organic component and the metalloxane component) and the ratio of the aromatic ring in the organic component to the aromatic ring in the metalloxane component.

The above-mentioned metalloxane component is also preferably a metal oxide, and more preferably silica (a silica polymer compound). If the metalloxane component is a silica polymer compound, the curable resin composition can be excellent in heat resistance and transparency. Details of the metalloxane component are as mentioned above.

One or more species of metal oxide nanoparticles having a refractive index of 2 or more such as $TiO_2$, $ZrO_2$, ZnO, $In_2O_3$, $La_2O_3$, and $Y_2O_3$, the above-mentioned siloxane B (also referred to as "aromatic ring-containing silica polymer compound"), the siloxane AB containing the $R^2$ more than $R^1$ (the siloxane AB satisfying a<b in the above-mentioned average compositional formula, herein after, also referred to as "siloxane AB satisfying $R^1<R^2$"), and aromatic ring-containing silica particles.

Those mentioned above are preferably used as the above-mentioned metal oxide, and any oxide mainly containing Ti, Zr, La, Y, Zn, In, or Sn as a metal component are preferably used. Such a metal oxide may be in any form of a single oxide, a composite oxide, and a solid solution. These oxides are preferably crystalline metal oxides. The metal oxide preferably has a primary particle diameter of 5 to 15 nm. It is preferable that the silica particles have a surface into which an aromatic ring-containing organic group such as an aryl group and an aralkyl group is introduced.

The siloxane B is particularly preferable in the above-mentioned metalloxane component. The siloxane B is preferably used if a resin composition having a small Abbe number is produced.

The above-mentioned siloxane B essentially contains a polysiloxane bond and an aromatic ring. It is preferable that the siloxane B is polysilsesquioxane having a straight, branched, ladder, cage, or cubic structure. Specifically, silicone oligomer PPSQ-E (product of KONISI II CHEMICAL IND. CO., LTD., PPSQ-E, the number average molecular weight: 850), silicone oligomer PPSQ-H (product of KONISHI CHEMICAL IND. CO., LTD., PPSQ-H, the number average molecular weight: 2200), and the like are preferable. Among them, silicon oligomer PPSQ-E is more preferable.

The silicon oligomer PPSQ-E is produced by liquid phase synthesis and by pulverizing particles in a post-process. Such a silicon oligomer PPSQ-E corresponds to wet metal oxide fine particles mentioned below. The silicon oligomer PPSQ-E is easily dispersed into a solution without aggregation because it has a cord structure.

The aromatic ring amount in the above-mentioned siloxane B is preferably 40% by weight or more relative to 100% by weight of the silicon atom amount. Thus, the preferable embodiments of the present invention include a curable resin composition in which the above-mentioned inorganic component is a silica polymer compound containing an aromatic ring (siloxane B), and the aromatic ring amount in the silica polymer compound is 40% by weight or more relative to 100% by weight of the silicon atom amount. If the above-mentioned aromatic ring amount is less than 40% by weight, the Abbe number of the curable resin composition is insufficiently reduced, and therefore such a composition may not be preferably used in an optical application.

The above-mentioned "silicon atom amount" means an amount of silicon atoms in the resin composition.

The above-mentioned aromatic ring amount is more preferably 50% by weight or more, and still more preferably 100% by weight or more, and particularly preferably 200% by weight or more.

If a metalloxane component containing an aromatic ring, in addition to the siloxane B, is contained as the above-mentioned metalloxane component, the aromatic ring amount in the metalloxane component is preferably within the above-mentioned range relative to 100% by weight of the silicon atom amount in the metalloxane component. Specifically, if the metalloxane component consists of the siloxane B and the metalloxane AB, the aromatic ring amount in the metalloxane component means an amount (% by weight) of the aromatic rings in the siloxane B and the metalloxane AB relative to 100% by weight of an amount of the silicon atoms in the siloxane B and the metalloxane AB. It is preferable that the metalloxane AB is the siloxane AB satisfying a<b in the above-mentioned average compositional formula (the siloxane AB containing $R^2$ more than $R^1$) in order to produce a curable resin composition having a low refractive index.

Those mentioned above may be preferably used as the above-mentioned metalloxane component. It is particularly preferable that the metalloxane component is obtained by a wet process. Thus-obtained metalloxane component may be in the form of a fine particle, and metal oxide fine particles (herein after, also referred to as simply "metal oxide fine particles") are preferable as the metalloxane component. The embodiment in which the metalloxane compound is metal oxide fine particles is mentioned below, but the embodiment of the metalloxane component is not especially limited as long as the operation and effects of the present invention are exhibited.

Preferable examples of the above-mentioned curable resin composition having a smaller Abbe number and a high refractive index include an embodiment (1) the curable resin composition essentially includes inorganic fine particles (metal oxide fine particles) obtained by a wet process as the metalloxane component and an aromatic ring-containing epoxy compound (also referred to as aromatic epoxy compound (B)) as the organic resin component; and an embodiment (2) in which the curable resin composition essentially includes inorganic fine particles obtained by a wet process (metal oxide fine particles) as the metalloxane component and an unsaturated bond-containing epoxy compound as the organic resin component. The metal oxide fine particles are preferably in the form of dispersion (inorganic dispersion).

With respect to the above-mentioned organic component, it is preferable that the organic component essentially contains the aromatic ring; the aromatic ring amount is preferably 40% by weight or more relative to 100% by weight of a cured product of the composition; and the organic component has an Abbe number of 35 or less. The "Abbe number of 35 or less" means that "an average Abbe number in the entire organic component is 35 or less," and the organic component may contain an organic component having an Abbe number of more than 35. If the curable resin composition is used in an application which needs a small Abbe number, it is preferable that the organic component essentially contains a resin component having an Abbe number of 45 or more and that the average Abbe number in the entire organic component is 35 or less. If the organic component contains no resin component having an Abbe number of 45 or more, which is an essential component, the cationic curing rate is not improved, which results in insufficient productivity. The proportion of the resin component having an Abbe number of 45 or more is preferably 1% by weight or more relative to 100% by weight of the organic resin component. The proportion is more preferably 5% by weight or more, and still more preferably 10% by weight or more, and particularly preferably 20% by weight or more. If the organic component has an Abbe number of 35 or less (the average Abbe number in the entire organic component is 35 or less), a curable resin composition containing such an organic component can exhibit excellent optical characteristics in an optical application. If the Abbe number is more than 35, a degree of light scattering may not be large, and therefore a curable resin composition containing such an organic component exhibits insufficiently optical characteristics. Therefore, such a resin composition may not be used as a material preferable for various optical applications. If the curable resin composition of the present invention is cured to be used as an optical member (for example, lens), the effects attributed to the Abbe number of 35 or less is remarkably exhibited. Specifically, if the optical member (lens) of the present invention and a lens having a large Abbe number are used in combination, effects such as reduction in degree of light scattering, increase in resolution, and no light bleeding, can be exhibited. Such excellent optical characteristics are remarkably exhibited as a difference in Abbe number between lenses used in combination is large. The difference in Abbe number between the lenses is preferably 20 or more, and commonly within a range of 20 to 70. Lenses having an Abbe number of 20 to 40 are mainly used as a lens having a large Abbe number. Therefore, it is difficult to use lenses having different Abbe numbers by 20 or more in combination. It is advantageous for one lens to have a smaller Abbe number in order to increase the difference in Abbe number as much as possible Specifically, even if the lenses have Abbe numbers of 33.5 and 36.3 and the difference is about 2.8, the effects are remarkably different in the above-mentioned application.

The above-mentioned organic component can be adjusted to have an Abbe number of 35 or less by appropriately employing preferable embodiments mentioned below in combination. The above-mentioned Abbe number is preferably 35 or less, and more preferably 34 or less, and still more preferably 33.5 or less, and particularly preferably 30 or less. The above-mentioned organic component is not especially limited as long as it has an Abbe number of 35 or less (the average Abbe number in the entire organic component is 35 or less). It is preferable that an organic resin having an Abbe number of 35 or less accounts for 40% by weight or more in the entire organic component. The proportion of the organic resin having an Abbe number of 35 or less is more preferably 60% by weight or more, and still more preferably 80% by weight or more. The upper limit thereof is 99% by weight (substantially all of the organic resins have an Abbe number of 35 or less).

It is preferable in the curable resin component of the present invention that the organic resin component has an average Abbe number of less than 45, and the organosiloxane compound satisfies b>a in the average compositional formula.

That is, it is preferable in the curable resin composition of the present invention that the average Abbe number in the entire organic resin component is less than 45; the metalloxane component is an organosiloxane compound represented by the above formula; and the organosiloxane compound satisfies b>a in the formula.

As the above-mentioned organic resin component having an Abbe number of 35 or less, a polyphenol compound, a polymerizable unsaturated bond-containing compound, an aromatic epoxy (also referred to as "epoxy (B)" or "aromatic epoxy compound (B)") are singly or in combination of two or more species of them may be used. Among them, it is preferable that the aromatic epoxy compound (B) is essentially included as the organic resin component because a curable resin composition having excellent optical characteristics can be produced and preferably used in various applications. Thus, the preferable embodiments of the present invention include the above-mentioned curable resin composition in which the above-mentioned organic component essentially includes the aromatic epoxy compound (B).

The content of the above-mentioned epoxy (B) is preferably 60% by weight or more relative to 100% by weight of the organic resin component. The content is more preferably 80% by weight or more. The upper limit of the content is 99% by weight.

Glycidyl compounds containing aromatic ring conjugated system, such as a bisphenol skeleton, a fluorene skeleton, a bisphenol skeleton, a naphthalene ring, and an anthracene ring, are more preferable as the above-mentioned aromatic epoxy compound (B). Epoxy and/or glycidyl compounds having a fluorene skeleton (fluorene compounds) are still more preferable. The refractive index can be increased by using a brominated compound of an aromatic epoxy compound, but the Abbe number is slightly increased. Therefore, it is preferable that such a brominated compound is used depending on the application.

Preferable examples of the above-mentioned aromatic epoxy compound (B) include bisphenol A epoxy resin, bisphenol F epoxy resin, fluorene epoxy (product of Osaka G as Chemical Co., Ltd.) ONCOAT EX-1020 or OGSOL EG210, fluorene epoxy (product of Osaka G as Chemical Co., Ltd.) ONCOAT EX-1010 or OGSOL PG. They may be used singly or in combination of two or more species of them. Bisphenol A epoxy resin and fluorene epoxy (product of Osaka G as Chemical Co., Ltd.) OGSOL EG-210 is more preferable.

The preferable embodiment of the above-mentioned curable resin composition having a small Abbe number and a high refractive index is an embodiment in which the curable resin composition essentially includes an aromatic ring-containing epoxy compound and an aromatic ring-containing organosiloxane compound, and a total aromatic ring amount in the organic component and the metalloxane component is 40% by weight or more, and the aromatic ring amount in the organosiloxane compound is 45% by weight or more. That is, the preferable embodiments of the present invention include a curable resin composition including an organic component and a metalloxane component, in which the curable resin composition includes the organic component essentially containing an aromatic ring-containing epoxy compound; the metalloxane compound is an aromatic ring-containing organosiloxane compound; an aromatic ring amount of the organosiloxane compound is 50% by weight or more relative to 100% by weight of a silicon atom amount; and the aromatic ring amount is 40% by weight or more relative to 100% by weight of a cured product of the composition. The above-mentioned aromatic ring-containing organosiloxane compound is the above-mentioned siloxane B or siloxane AB.

The preferable embodiment of the above-mentioned curable resin composition having a low Abbe number is an embodiment in which the curable resin composition essentially includes a resin component having an Abbe number of 45 or more and the aromatic epoxy compound (B); the metalloxane component is an aromatic ring-containing siloxane (B); an aromatic ring amount in the siloxane (B) is 40% by weight or more relative to 100% by weight of a silicon atom amount; the aromatic ring amount is 40% by weight or more relative to 100% by weight of a cured product of the composition. The above-mentioned preferable ranges of the aromatic ring amount in the siloxane (B) and the aromatic ring amount relative to 100% by weight of a cured product of the composition (the aromatic ring amount in both of the organic component and the metal oxide fine particles) are as mentioned above, respectively. The case where the siloxane AB is contained as the metalloxane component is as mentioned above. Preferable compounds as the aromatic epoxy compound (B) and the aromatic ring-containing siloxane (B) are as mentioned above, and the above-mentioned compounds can be appropriately selected and used as a combination of the metalloxane component with the organic component. With respect to the combinations, particularly preferable embodiments are an embodiment in which the curable resin composition includes bisphenol A and silicon oligomer PPSQ-E or PPSQ-H, and an embodiment in which the curable resin composition includes fluorene epoxy and silicon oligomer PPSQ-E or PPSQ-H.

The above-mentioned organic component may contain a solvent, and an amount of the solvent contained in the organic component is preferably 20% by weight or less relative to 100% by weight of the organic component. If the solvent amount is more than 20% by weight, a molded product may include bubbles as mentioned in the case where the organic resin component is included. The solvent amount is more preferably 10% by weight or less, and still more preferably 5% by weight or less, and particularly preferably 30% by weight or less, and most preferably 1% by weight or less.

"Preferable Embodiment of Organic Resin Component"

It is preferable in the curable resin composition of the present invention that the organic resin component essentially includes an organic resin having a molecular weight (weight average molecular weight) of 700 or more. If the organic resin component includes an organic resin having such a molecular weight, a resin composition can be cured to be unified, and the cured product shows an improved strength when being peeled without break and has a proper material hardness. The molecular weight of the organic resin essentially contained in the above-mentioned organic resin component is preferably 700 to 10000. If the molecular weight is more than 10000, the transparency of the resin composition may be insufficient.

In the above-mentioned resin composition, it is preferable that 10% by weight or more of the component (organic resin) having a molecular weight of 700 or more is contained relative to 100% by weight of the total amount of the resin composition. It is preferable that the component having a molecular weight of 700 or more (specifically, 700 to 10000) is 90% by weight or less in view of easiness of molding. The content of the organic resin having a molecular weight of 700 or more is more preferably 10 to 80% by weight, and also preferably 20 to 80% by weight and 20 to 70% by weight. The content is still more preferably 30 to 70% by weight. Further, the content is preferably 30% by weight or more. For example, the content is preferably 30 to 90% by weight. Thus, the preferable embodiments of the present invention also include a resin composition including 10 to 90% by weight of the organic resin composition having a molecular weight of 700 or more. The method of measuring the molecular weight of the organic resin is mentioned below.

"Measurement Method of Molecular Weight"

The above-mentioned molecular weight of the organic resin component can be measured under the following conditions using gel permeation chromatography (product of TOSOH CORP., trade name "HLC-8220GPC"), for example.

"Molecular Weight Measurement Condition"
Column: four columns, "TSK-GEL SUPER HZM-N 6.0*150", product of TOSOH CORP.
Eluent: tetra hydrofuran
Flow rate: 0.6 mL/min
Temperature: 40° C.
Calibration curve: drawn using a polystyrene standard sample (product of TOSOH CORP.)

It is preferable that the organic resin component includes an organic resin component having a molecular weight of 700 or more and an organic resin component having a molecular weight of less than 700. If the curable resin composition essentially includes an organic resin component having a molecular weight of 700 or more (also referred to as "high molecular weight organic resin, polymer material, high molecular weight component, or polymer component") and an organic resin component having a molecular weight of less than 700 (also referred to as "low molecular weight organic resin, low molecular material, low molecular weight component or low molecular component"), the effects such as reduction in viscosity at the time of production and improvement in mechanical strength of a product can be obtained. That is, two opposite characteristics such as excellent processing characteristics (viscosity and flow property) of the curable resin composition and excellent mechanical strength of a cured product of the curable resin composition are satisfied. With respect to the viscosity of the curable resin composition, the viscosity is increased if only the high molecular weight component is used as the organic resin component. Therefore, it is preferable that the low molecular weight component is used in combination. The high molecular weight component has a curing shrinkage rate smaller than that of the low molecular weight component, and therefore the high molecular weight is preferably used. Because of such a reason, it is preferable that the low molecular weight component and the high molecular weight component are used in combination. Such high molecular weight and low molecular weight components have the same or different proportions.

The molecular weight of the above-mentioned high polymer weight component is preferably the same as that of the above-mentioned organic resin having a molecular weight (weight average molecular weight) of 700 or more. Specifically, the molecular weight is preferably 700 to 10000. With the molecular weight of the above-mentioned low molecular weight component, the weight average molecular weight is preferably less than 700. Specifically, the low molecular weight component has a molecular weight is preferably 150 to 700.

The above-mentioned organic resin component having two or more different molecular weights is preferably two or more epoxy compounds. Examples of such a combination of the epoxy compounds as the organic resin component include: an embodiment (1) in which the high molecular weight component is the epoxy A' and the low molecular weight component is the epoxy C; an embodiment (2) in which the high molecular weight component is the epoxy A' and the low molecular weight component is the epoxy A' and the epoxy C; an embodiment (3) in which the high molecular weight component is the epoxy B, and the low molecular weight component is the epoxy B and the epoxy C; an embodiment (4) in which the high molecular weight component is the epoxy A' and the low molecular weight component is the epoxy B and the epoxy C; an embodiment (5) in which the low molecular weight component is the epoxy A' and the high molecular weight is the epoxy C; an embodiment (6) in which the low molecular weight is the epoxy B and the high molecular weight component is the epoxy C; an embodiment (7) in which the low molecular weight component is the epoxy A' and the epoxy C and the high molecular weight component is the epoxy C; an embodiment (8) in which the low molecular weight component is the epoxy B and the epoxy C and the high molecular weight component is the epoxy C. Among them, the embodiments in which the low molecular weight is the epoxy C (the embodiments (1) to (4)) are preferable. If the curable resin composition includes the alicyclic epoxy (epoxy C) (epoxycyclohexane compound) as the low molecular weight component, the composition has a low viscosity before curing, but shows a high curing density at the time of heating, and forms a cured product excellent in mechanical characteristics. Among the above-mentioned combinations, an embodiment in which the high molecular weight is the epoxy A' and the low molecular weight is the epoxy C (embodiment (1)) is more preferable if a curable resin composition having a large Abbe number is produced. In the embodiment (1), it is more preferable that the composition includes an alicyclic epoxy other than the epoxy C as the high molecular weight component (epoxy A').

The organic resin component of the present invention includes a resin component having an Abbe number of 45 or more. If the organic resin component includes the above-mentioned high molecular weight component and low molecular weight component, at least one of the components includes the resin component having an Abbe number of 45 or more. It is preferable that both of the high molecular weight component and the low molecular weight component include the resin component having an Abbe number of 45 or more in order to perform cationic polymerization with high productivity.

It is preferable that each of the above-mentioned high molecular weight and low molecular weight components includes at least one compound of (1) hydrogenated epoxy compounds ((entirely or partially) hydrogenated aromatic epoxy compounds) and (2) alicyclic epoxy compounds. Specifically, it is preferable that the low molecular weight component includes one or more different hydrogenated epoxy compounds (1), one or more different alicyclic epoxy compounds (2), or one or more different hydrogenated epoxy compounds (1) and one or more different alicyclic epoxy compounds (2). Similarly, it is preferable that the high molecular weight component includes one or more different hydrogenated epoxy compounds (1), one or more different alicyclic epoxy compounds (2), or one or more different hydrogenated epoxy compounds (1) and one or more different alicyclic epoxy compounds (2).

The above-mentioned resin composition preferably has an embodiment in which the resin composition includes the organic resin component and the organosiloxane compound and the resin composition is prepared to have a solvent of 5% by weight or less. If the resin composition is prepared in such an embodiment, a thermosetting resin which can be continuously produced and can be unified when being cured, and has a high strength and high transparency and heat resistance can be obtained. As a result, a thermosetting material (optical material) that is useful as a lens material having a transmittance at a wavelength of 500 nm of 80% or more can be produced. It is preferable that two or more different resin organic components are used as the organic resin component. If the above-mentioned two or more different organic resins included in the resin composition contains an organic resin component having a molecular weight of 700 or more (high-molecular-weight) and an organic resin component having a molecular weight of less than 700 (low-molecular-weight), a method of mixing the low molecular weight component with the metalloxane component (and other components if necessary); removing a solvent; and adding a high molecular weight component is preferable as a method of preparing the composition. Further, an embodiment in which the resin composition is prepared in such a way that the solvent accounts for 5% by weight or less relative to 100% by weight of the mixture (the mixture of the low molecular weight component, the metalloxane component, the high molecular weight component, and the solvent (and other components if necessary)) is preferable. The above-mentioned mixing permits production of a preferable resin composition without increase in viscosity of the resin composition. Further, it can be possible for the high molecular weight material to be more compatible with the resin composition. Thus, the preferable embodiments of the present invention include a method for producing a resin composition including an organic resin component and a metalloxane component, comprising a step of mixing two or more different organic resins with the metalloxane component to produce the composition with 5% by weight or less of the solvent relative to the mixture in the end. Such a production method more preferably has an embodiment in which the above-mentioned two or more different organic resin components essentially include an organic resin component having a molecular weight of 700 or more (a high molecular weight component) and an organic resin component with a molecular weight of less than 700 (a low molecular weight component). Still more preferably, the production method has an embodiment in which in the above-mentioned mixing step, at least part of the solvent is removed from the mixture including the low molecular weight component, the metalloxane component, and the solvent, and then the high molecular weight component is added thereinto.

With respect to the above-mentioned solvent amount, the solvent accounts for 5% by weight or less relative to 100% by weight of the mixture (the mixture of two or more different organic resins, the metalloxane component, and the solvent (and other components if necessary)). If the solvent amount is more than 5% by weight, foam formation or reduction in strength of a molded product may occur. The solvent amount is more preferably 3% by weight or less, and still more preferably 1% by weight or less. In addition, one of the preferable embodiments of the present invention is an embodiment in which 0.05 to 5% by weight of the solvent remains in 100% by weight of the mixture (resin composition) in order to suppress increase in viscosity when the resin composition is produced using the solvent (when the solvent is removed). The residual amount of the solvent is more preferably 0.1 to 3% by weight, and still more preferably 0.5 to 2% by weight. In the present invention, the solvent can be adjusted to the above-mentioned range for a short time by simultaneously evaporating a high-boiling solvent and the like. Therefore, the resin composition can be preferably produced. High-boiling alcohols such as 2-ethyl-1-hexanol and dodecanol are preferable as the above-mentioned solvent. Specific examples of the high-boiling alcohols are mentioned below. The residual amount of such high-boiling alcohols is preferably 0.01 to 2% by weight.

The above-mentioned organic resin having a molecular weight of 700 or more, measurement method of the molecular weight, and metalloxane component contained in the resin composition are preferably the same as those mentioned above.

With each proportion of the above-mentioned organic resin component having a molecular weight of 700 or more and the above-mentioned organic resin component having a molecular weight of less than 700, the proportion of the organic resin component having a molecular weight of 700 or more is preferably 10 to 90 relative to the entire resin composition. The proportion is more preferably 20 to 80, and still more preferably 30 to 70. Specific examples of the organic resin are as mentioned above.

With each proportion of the low molecular weight component and the high molecular weight component, the proportion of the high molecular weight component is 30 to 90% by weight relative to the total amount of the organic resin component. The proportion is more preferably 35 to 80% by weight, and still more preferably 40 to 75% by weight.

The above-mentioned organic resin component having two or more different molecular weights is preferably two or more different epoxy compounds, as mentioned above. Particularly, the organic resin component preferably includes alicyclic epoxy. Thus, the preferable embodiments of the present invention include a resin composition produced by mixing two or more different epoxy compounds having different molecular weights with the metalloxane component in 5% or less of the solvent.

The resin composition of the present invention preferably includes the above-mentioned organic resin component and metalloxane component. It is preferable that the resin composition includes 40 to 99% by weight of the organic resin component and 1 to 60% by weight of the metalloxane component relative to 100% by weight of the total amount of the organic resin component and the metalloxane component. Within such contents, the resin composition can have high transparency. Particularly if such a curable resin composition including a thermosetting resin as the organic resin component, the composition can overcome the heat resistance unlike a thermoplastic resin and can be subjected to complicated and inexpensive process unlike a glass. With respect to the above-mentioned contents, more preferably, the organic resin component is 40 to 99% by weight and the metalloxane component is 1 to 60% by weight. More preferably, the organic resin component is 70 to 98% by weight and the metalloxane component is 2 to 30% by weight. Particularly preferably, the metalloxane component is 5 to 30% by weight.

"Flexible Component"

The above-mentioned resin composition preferably includes a component with flexibility (flexible component). If the resin composition includes the flexible component, the resin is an unified composition. Any of an embodiment in which (1) the flexible component is a flexible component consisting of a compound different form the organic resin component and an embodiment in which (2) the flexible component is one kind of the organic resin component can be preferably applied to the above-mentioned flexible component. Specifically, preferable examples of the above-mentioned flexible component include: compounds having an oxyalkylene skeleton represented by -[—$(CH_2)_n$—O—]$_m$— (n is an integer of 2 or more and m is an integer of 1 or more, and preferably n is an integer of 2 to 12 and m is an integer of 1 to 1000, and more preferably n is an integer of 3 to 6 and m is an integer of 1 to 20.) such as butylene oxide-containing epoxy resin (product of Japan Epoxy Resins Co., Ltd., YL-7212, an epoxy equivalent of 437 and a liquid epoxy resin (10° C. or more); high-molecular epoxy resins such as hydrogenated bisphenol (product of Japan Epoxy Resins Co., Ltd., YL-7170, the epoxy equivalent: 1000, a solid hydrogenated epoxy resin); alicyclic solid epoxy resins (product of Dicel Chemical Industries, Ltd., EHPE-3150); alicyclic liquid epoxy resins (product of Dicel Chemical Industries, Ltd. CELLOXIDE 2081); liquid rubbers such as a liquid nitrile rubber, polymer rubbers such as polybutadiene, and fine particle rubbers having a particle diameter of 100 nm or less. Among them, compounds containing a curable functional group at an end or in a side chain or a skeleton in the main chain are more preferable. Thus, the preferable embodiments of the preset invention also include a resin composition including the above-mentioned flexible component containing a curable functional group. The above-mentioned "curable functional group" means "a thermosetting or photosetting functional group such as an epoxy group and a glycidyl group (a group causing curing reaction of the resin composition)."

Compounds containing a curable functional group are preferably used as the above-mentioned flexible component, but a compound containing an epoxy group is particularly preferable among the compounds containing a curable functional group. Specifically, butylene oxide is preferable as the above-mentioned flexible component.

With respect to the content of the above-mentioned flexible component, it is preferable that the resin composition includes 40 to 99% by weight of the organic resin component, 1 to 60% by weight of the metalloxane component, and 0.01 to 40% by weight of the flexible component in 100% by weight of the total amount of the organic resin component, the metalloxane component, and the flexible component. That is, the resin composition having 10% by weight of the flexible component is particularly preferable. The content of the flexible component is more preferably 0.1 to 35% by weight and still more preferably 0.5 to 30% by weight. With respect to the content of the above-mentioned flexible component, it is preferable that the resin composition includes 40 to 99% by weight of the organic resin component, 1 to 60% by weight of the metalloxane component, and 0.01 to 40% by weight of the flexible component in 100% by weight of the total amount of the organic component, the metalloxane component, and the flexible component. Particularly preferably, the resin composition includes 10% or less of the flexible component. The content of the flexible component is more preferably 0.1 to 5% by weight, and still more preferably 0.5 to 1% by weight.

The preferable embodiments of the present invention include an embodiment (1) in which the curable resin composition of the present invention includes the flexible material (preferably epoxy)-containing alicyclic curable substance and the inorganic dispersion and an embodiment (2) in which the curable resin composition includes the material with flexibility (flexible component), the curable material, and the metalloxane component.

It is preferable that a cured product obtained by curing the curable resin composition of the present invention at 150° C. for 10 minutes has a bending resistance strength of 40 MPa or more. Thus, the preferable embodiments of the present invention include a curable resin composition including a metalloxane component and an organic resin component, in which the curable resin composition includes a flexible component and a cured product obtained by curing the curable resin composition at 150° C. for 10 minutes has a bending resistance strength of 40 MPa or more.

It is preferable that a cured product obtained by curing the resin composition of the present invention at 120° C. for 2 minutes has a bending resistance strength of 60 MPa or more. It is preferable that the above-mentioned resin composition is cured within a mold and demolded, and then subjected to post-curing (baking), as mentioned below. In this case, the above-mentioned bending resistance strength of the cured product means a strength of a cured product obtained by curing the resin composition within a mold at 120° C. for 2 minutes before the post-curing (baking). Thus, the preferable embodiments of the present invention include a resin composition including a metalloxane component and an organic resin component, in which the resin composition includes a flexible component and a cured product obtained by curing the resin composition at 120° C. for 2 minutes has a bending resistance strength of 60 MPa or more. The above-mentioned viscosity of the resin composition is particularly preferably 10000 Pa·s or less, and still more preferably 1000 Pa·s or less, and most preferably 200 Pa·s or less.

The resin composition of the present invention may contain, in addition to the above-mentioned resin and organosiloxane compound, a curing catalyst, a demolding agent, a curing agent, a curing accelerator, a reactive diluent, a saturated compound not having an unsaturated bond, a pigment, a dye, an antioxidant, an ultraviolet absorber, a light stabilizer, a plasticizer, a non-reactive compound, a chain transfer agent, a thermal polymerization initiator, an anaerobic polymerization initiator, a polymerization initiator, an inorganic or organic filler, an agent for improving adhesion such as a coupling agent, a thermo stabilizer, a antibacterial and antifungal agent, a flame retarder, a delustering agent, a defoaming agent, a leveling agent, a wetting dispersant, an antisettling agent, a thickener and an antisagging agent, a color separation inhibitor, an emulsifier, a slip and scrape proofing agent, an antiskinning agent, a drying agent, a stain proofing agent, an antistatic agent, and a conductive agent (electrostatic assistant).

"Demolding Agent"

Commonly used demolding agents are preferably used as the above-mentioned demolding agent (or additive), and at least one compound selected from the group consisting of alcohols, carboxylic acids, carboxylic acid esters, and carboxylic acid salts, each containing 8 to 36 carbon atoms, is preferable as the above-mentioned demolding agent. A cured product of the curable resin composition including such a demolding agent can be easily demoded if curing is performed using a mold. Therefore, the appearance is controlled without scratching the cured product surface and transparency can be exhibited. Therefore, such a cured product can be particularly useful as an electrical or electronic component material or a material in an optical application. Alcohols, carboxylic acids and carboxylic acid esters are preferable and carboxylic acids (particularly higher fatty acids) and carboxylic acid esters are more preferable. Carboxylic acid and carboxylic acid esters are preferable because a sufficient demolding effect can be exhibited without inhibition of the cationic curing reaction. It is preferable that amine is not used as the demolding agent because it may inhibit the cationic curing reaction. The above-mentioned compound may have a straight-chain, branched, or circular structure, and preferably has a branched structure.

If the above-mentioned carbon number is an integer of 8 to 36, the cured product can show an excellent demoldability without deteriorating transparency and functions such as workability of the resin composition. The carbon number is preferably 8 to 20, and more preferably 10 to 18.

The above-mentioned alcohols having a carbon number of 8 to 36 are monovalent or polyvalent alcohols and may have a straight-chain or branched structure. Specifically, preferable examples of such alcohols include octyl alcohol, nonyl alcohol, decyl alcohol, undecyl alcohol, lauryl alcohol, tridecyl alcohol, tetradecyl alcohol, pentadecyl alcohol, palmityl alcohol, margaryl alcohol, stearyl alcohol, nonadecyl alcohol, eicocyl alcohol, ceryl alcohol, myricyl alcohol, methylpentyl alcohol, 2-ethylbutyl alcohol, 2-ethylhexyl alcohol, 3,5-dimethyl-1-hexanol, 2,2,4-trimethyl-1-pentanol, dipentaerythritol, and 2-phenylethanol. Aliphatic alcohols are preferable as the above-mentioned alcohols. Particularly, octyl alcohol (octanol), lauryl alcohol, 2-ethylhexyl alcohol (2-ethylhexanol), and stearyl alcohol are preferable.

The above-mentioned carboxylic acids containing 8 to 36 carbon atoms are monovalent or polyvalent carboxylic acids. Preferable examples of such carboxylic acids include 2-ethyl hexanoic acid, octanoic acid, nonanoic acid, decanoic acid, undecanoic acid, lauric acid, tridecanoic acid, tetradecanoic acid, pentadecanoic acid, palmitic acid, 1-heptadecanoic acid, stearic acid, nonadecanoic acid, eicosanoic acid, 1-hexacosanoic acid, and behenic acid. Octanoic acid, lauric acid, 2-ethyl hexanoic acid, and stearic acid are preferable.

Preferable examples of the above-mentioned carboxylic acid esters containing 8 to 36 carbon atoms include (1) carboxylic acid esters obtained from the above-mentioned alcohols and carboxylic acids; (2) carboxylic acid esters obtained from combinations of alcohols containing 1 to 7 carbon atoms such as methanol, ethanol, propanol, heptanol, hexanol, glycerin, benzyl alcohol with the above-mentioned carboxylic esters; (3) carboxylic acid esters obtained from combinations of carboxylic acids containing 1 to 7 carbon atoms such as acetic acid, propionic acid, hexanoic acid, and butanoic acid with the above-mentioned alcohols. Among them, stearic acid methyl ester, stearic acid ethyl ester, octyl acetate, and the like are preferable.

Carboxylic acid salts obtained from combinations of the above-mentioned carboxylic acids with amine, Na, K, Mg, Ca, Mn, Fe, Co, Ni, Cu, Zn, or Sn are preferable as the carboxylic acid salts containing 8 to 36 carbon atoms. Among them, zinc stearate, magnesium stearate, zinc 2-ethylhexanate, and the like are preferable.

Among the above-mentioned compounds, the stearic acid compounds such as stearic acid and stearic acid ester and the alcohol compounds are more preferable, and the stearic acid compounds are still more preferable. Thus, the preferable embodiments of the present invention include the above-mentioned resin composition containing a stearic acid compound.

The content of the above-mentioned demolding agent is preferably 10% by weight or less relative to 100% by weight of the resin composition. It may become difficult for the resin to be cured if the content of the demolding agent is more than 10% by weight. The content of the demolding agent is more preferably 0.01 to 5% by weight and still more preferably 0.1 to 2% by weight.

"Curing Catalyst"

Commonly known curing catalysts are preferably used as the above-mentioned curing catalyst, and a cationic curing catalyst is preferable, for example. Thus, it is preferable that the above-mentioned resin composition contains a cationic curing catalyst (the above-mentioned resin composition is a cationic curable resin composition). Such a cationic curing catalyst-containing curable resin composition has storage stability more excellent than that of a curable resin composition including a curing agent. Further, the curing rate of the curable resin composition can be increased, and therefore a curing product can be obtained with productivity. The obtained cured product is excellent in heat resistance, transparency, and mechanical characteristics. It is preferable that the above-mentioned cationic curable resin composition essentially includes an organic resin component containing a cationic polymerizable group.

The above-mentioned cationic curing catalyst is preferably a thermal acid generator (thermal-latent curing catalyst) or a photoacid generator. Such a cationic curing catalyst is not especially limited as long as it generates a cationic species which initiates polymerization by heat or light. Due to the use of the thermal acid generator, a compound including a cationic species is excited by heating, and thereby a thermal decomposition reaction is generated. As a result, thermal curing proceeds. Due to the use of the photoacid generator, a compound including a cationic species is excited by light, and thereby a photodecomposition reaction is generated. As a result, light curing proceeds.

A thermal-latent curing catalyst is preferable as the above-mentioned cationic curing catalyst. Thus, the preferable embodiments of the present invention include the above-mentioned resin composition containing a thermal-latent curing catalyst (cationic curable resin composition).

The above-mentioned thermal-latent curing catalyst is also called thermal-latent curing agent, thermal-latent cation generator, or cationic polymerization initiator. Such a thermal-latent curing catalyst exhibits substantial functions as a curing agent at a curing temperature of the resin composition. Unlike curing agents mentioned below, the thermal-latent curing catalyst contained in the resin composition causes neither increase in viscosity nor gelling over time at a normal temperature. Due to the functions of the thermal-latent curing catalyst, the curing reaction can be sufficiently accelerated, and excellent effects are exhibited. As a result, a one-composite resin composition (one-composite optical material) excellent in handling ability can be provided. Particularly, if the curable resin composition is used as an optical material, it is preferable that the curable resin composition is a cationic curable resin composition containing such a thermal-latent curing agent. Such a cationic curable resin composition is preferable because it is excellent in storage stability. Thus, the present embodiments of the present invention include a method for improving storage stability of a resin composition (curable resin composition) including an organic component having a cationic polymerizable group such as an epoxy group and a thermal-latent curing catalyst, in which the resin composition further includes an organosiloxane compound represented by the above average compositional formula. Alicyclic epoxy compounds (epoxycyclohexane skeleton) and hydrogenated epoxy compounds (hydrogenated bisphenol A) are preferable as the organic resin component in the cationic curable resin composition in order to improve the curing rate. Alicyclic epoxy compounds (epoxycyclohexene) are preferable as the organic resin component in the cationic curable resin composition in order to decrease the catalyst amount.

The catalyst amount (use amount) of the above-mentioned thermal-latent curing catalyst is preferably 0.01 to 10% by weight on the solid content equivalent basis (on the effective component basis, not including the solvent and the like) relative to 100% by weight of the resin composition including the organic resin component and the metalloxane component, and more preferably 0.1 to 2.0% by weight, and still more preferably 0.2 to 1.0% by weight. If the catalyst amount is decreased too much and the content thereof is less than 0.01% by weight, it takes a long time for the resin composition to be cured. If it is increased and the content thereof is more than 10% by weight, coloring may occur in the resin composition during curing or the molded product during heating. If the resin composition is molded and the molded product is mounted by reflow, the resin composition needs resistance to heat at 200° C. It is preferable in view of transparency that the catalyst amount is preferably 1% by weight or less relative to 100% by weight of the resin composition including the organic resin component and the metalloxane component. The catalyst amount is more preferably 0.5 by weight or less, and still more preferably 0.2 by weight or less.

Due to the use of the above-mentioned thermal-latent curing catalyst, a cured product obtained from the resin composition has drastically improved moisture resistance and maintains the excellent optical characteristics of the resin composition even in a harsh use environment. Therefore, such a cured product can be preferably used in various applications. Generally, moisture with a low refractive index, which is contained in the resin composition or the cured product, causes turbidity. However, if the thermal-latent curing catalyst is used, the excellent moisture resistance can be exhibited, which suppresses such turbidity. Therefore, the cured product can be preferably used in an optical application such as a lens. Particularly in applications such as an in-vehicle camera and a bar-code reader for delivery service, yellowing or deterioration of strength may be caused due to ultraviolet irradiation for a long time or exposure to summer high temperatures. These phenomena are caused because air or moisture is irradiated with ultraviolet or exposed to heat, and such a synergistic effect generates oxygen radicals. The improved moisture resistance suppresses the resin composition to absorb moisture, and therefore, generation of oxygen radicals, attributed to the synergistic effect of the ultraviolet irradiation or the heat exposure, can be suppressed. Therefore, the resin composition exhibits excellent heat resistance for a long time without yellowing or decrease in strength.

It is preferable that the above-mentioned thermal-latent cation generator is represented by the following formula (1)

(in the formula,

Z representing at least one element selected from the group consisting S, Se, Te, P, As, Sb, Bi, O, N, and halogen elements;

$R^1$, $R^2$, $R^3$, and $R^4$ being the same or different and representing an organic group;

a, b, c, and d being 0 or a positive number, and a total of a, b, c, and d being equal to a valency of Z;

a cation $(R^1{}_a R^2{}_b R^3{}_c R^4{}_d Z)^{+m}$ representing an oniun salt;

A representing a metal element or a metalloid element that is the center atom of a halide complex and being at least one selected from the group consisting of B, P, As, Al, Ca, In, Ti, Zn, Sc, V, Cr, Mn, and Co;

X representing a halogen element;

m being a net positive charge of a halide complex ion; and n being the number of a halogen element in the halogen complex ion).

The above-mentioned thermal-latent cation generator has the above-mentioned structure and generally generates cations at a curing temperature. The curing temperature is preferably 25 to 250° C., and more preferably 60 to 200° C., and still more preferably 80 to 180° C.

With respect to the curing conditions, the curing temperature may be changed stepwise. For example, in order to improve productivity when a cured product of the resin composition is produced, the resin composition is maintained within a mold at a specific temperature and for a specific time and then demolded and left in air or inert gas atmosphere to be subjected to heat treatment. In this case, the holding temperature as a curing temperature is 25 to 250° C., and more preferably 60 to 200° C., and still more preferably 80 to 180° C. The holding time is 10 seconds to 5 minutes, and more preferably 30 seconds to 5 minutes.

Specific examples of an anion $(Axn)^{-m}$ in the above formula (1) include tetrafluoroborate ($BF^{4-}$), hexafluorophosphate ($PF^{6-}$), hexafluoroantimonate ($SbF^{6-}$), hexafluoroarsenate ($AsF^{6-}$), and hexachloroantimonate ($SbCl^{6-}$).

Further, an anion represented by the formula AXn (OH)$^-$ may be used. Examples of other anions include a perchlorate ion ($ClO_4^-$), a trifluoromethyl sulfite ion ($CF_3SO_3^-$), a fluorosulfonate ion ($FSO_3^-$), a toluenesulfonate ion, and a trinitrobenzene sulfonate ion.

Specific trade products of the above-mentioned thermal-latent cation generator include: diazonium salt products such as AMERICURE series (product of American Can Corp.), ULTRASET series (product of ADEKA Corp.), and WPAG series (product of Wako Pure Chemical Industries, Ltd.);

iodonium salt products such as UVE series (product of General Electric Co.), FC series (product of 3M), UV9310C (product of GE Toshiba Silicones Co. Ltd.), Photoinitiator 2074 (product of Rhone-Poulenc Inc.), and WPI series (product of Wako Pure Chemical Industries, Ltd.);

sulfonium salt products such as CYRACURE series (product of Union Carbide Corp.), UVI series (product of General Electric Co.), FC series (product of 3M), CD series (product of Satomer Co., Inc.), optomer SP series and optomer CP series (product of ADEKA Corp.), San-Aid SI series (product of SANSHIN CHEMICAL INDUSTRY CO., LTD.), CI series (product of NIPPON SODA CO., LTD.), WPAG series (product of Wako Pure Chemical Industries, Ltd.), and CPI series (product of SAN-APRO Ltd.).

It is preferable that the resin composition of the present invention is demolded at a strength of 40 kgf/cm$^2$ or less. If the resin composition is demolded at a strength of 40 kgf/cm$^2$ or less, it is evaluated that the resin composition can be demolded with ease and produced with productivity in the production steps and therefore can be continuously produced, in this technical field. If the peel strength is more than 40 kgf/cm$^2$, the resin composition is not produced with productivity, which may result in economic inefficiency. The peel strength is preferably 20 kgf/cm$^2$ or less, and more preferably 10 kgf/cm$^2$ or less, and still more preferably 1 kgf/cm$^2$ or less, and particularly preferably 0.1 kgf/cm$^2$ or less.

With respect to the above-mentioned peel strength, it is preferable that the hardness of the resin composition becomes a certain level in a short time at a temperature of 150° C. or less where a side reaction occurs (the resin composition is demolded at a strength of 40 kgf/cm$^2$ or less), in order to continuously produce a transparent material. Such a peel strength (material hardness) can be evaluated as follows, for example. The resin composition is coated on a SUS304 substrate to have a thickness of 1 mm and cured at 120° C. for 2.5 minutes and then cooled to 30° C. within 30 seconds. Then, the resin is evaluated for demolding easiness by applying a desired pressure (for example, a peel strength of 40 kgf/cm$^2$) to the interface between the resin and the SUS 304 using a cutter (product of NT Inc., the body model number: L-500, the edge model number: BL-150P). In some molding conditions, the peel strength can be evaluated without cooling. The peel strength of 40 kgf/cm$^2$ is calculated as a value in the case where a 1.5 kg load is applied to the interface between the resin having a length of 2 cm and the SUS 304 using the cutter. The area to which the load of the cutter edge is applied is 0.04 cm$^2$. The cross cut test (JIS K-5400) is preferable as a method of testing demolding performances.

"Curing Method"

Various methods such as thermal curing and light curing can be preferably used as a method of curing the resin composition of the present invention. A method of: preparing a one-composite composition by mixing the above-mentioned curable catalyst or if necessary other materials with the resin composition; ejecting this one-composite solution into a mold having a shape which a desired cured product has; curing the solution; and demolding the cured product is preferably used. In such a method, it is preferable the viscosity of the curable resin composition including the curing catalyst and the like is not remarkably increased in terms of easiness of the handling ability.

That is, it is preferable that after 1 day preservation at 25° C., the resin composition has a viscosity which accounts for 1000% or less relative to the viscosity immediately after the mixing. If the viscosity accounts for more than 1000%, it might become difficult to eject the solution into a mold and the flowability of the resin composition within the mold may be adversely affected. The viscosity more preferably accounts for 500% or less, and still more preferably 10% or less. The preferable embodiments of the present invention include the one-composite mixture as the curable resin composition has an increase rate of the viscosity of 10% or less after three days preservation at 25° C., relative to the viscosity immediately after the mixing. It is preferable that the increase rate of the viscosity of the curable resin composition is 200% or less after three days preservation at 25° C. relative to the viscosity just after the mixing. If the increase rate of the viscosity is more than 200%, it may become difficult to eject the solution into a mold and the flowability of the resin composition within the mold may be adversely affected. The increase rate of the viscosity is more preferably 180% or less, and still more preferably 150% or less. Thus, the preferable embodiments of the present invention include the one-composite mixture as the above-mentioned curable resin composition has an increase rate of the viscosity of 200% or less after 3 days preservation at 25° C. relative to the viscosity just after the mixing.

Commonly used methods can be preferably used as a method for producing a cured product by curing the above-mentioned resin composition. The methods can be appropriately adopted depending on the kind of the resin composition, as mentioned below. A method for producing a cured product by curing the above-mentioned resin composition within 5 minutes is preferable. Specifically, it is preferable that the curing catalyst or if necessary other materials are mixed with the above-mentioned resin composition to prepare a one-composite solution and the one-composite solution is ejected into a mold having a shape which a desired cured product has and cured within 5 minutes. If the above-mentioned curing time (curing time in the case where the mold is used) is more than 5 minutes, the productivity is reduced. The curing time is more preferably within 3 minutes. It is preferable that the curing rate is higher because the productivity is more improved. Organic resin components containing an oxetane group, an alicyclic epoxy group (an epoxycyclohexyl group, an epoxy group which is added to a cyclic aliphatic hydrocarbon group directly or with a hydrocarbon group there between) show a curing rate higher than that of organic resin components containing a glycidyl group. These organic resin components have an Abbe number of 45 or more. The alicyclic epoxy compounds show a curing rate higher than a hydrogenated product of aromatic epoxy.

The above-mentioned curing temperature can be appropriately adopted depending on the resin composition to be cured and the like, and it is preferably 80 to 200° C. The curing temperature is more preferably 100 to 180° C., and still more preferably 110 to 150° C.

According to the above-mentioned curing method, the cured product has a high hardness enough to maintain the shape when being demolded. With respect to the curing strength (hardness), it is preferable that the change rate of the shape when the cured product is demolded at a strength of 1 kgf/cm$^2$ or more is 10% or less. The above-mentioned change rate of the shape is preferably 1% or less, and more preferably 0.1% or less, and still more preferably 0.01% or less.

It is preferable that the resin composition of the present invention is cured in a mold within 5 minutes, as mentioned above, and the cured product is demolded and subjected to post-curing (baking). Due to the post-curing, the cured product has a sufficient hardness, and therefore can be preferably used in various applications. The cured product having a certain level of hardness is further cured in the post-curing. Such post-curing is excellent in handling ability. Therefore, there is no need to use a mold, and therefore, a large number of products can be subjected to post-curing within a smaller area.

In the above-mentioned post-curing, the curing temperature and the curing time can be appropriately adopted depending on a resin composition to be cured and the like. The curing temperature is preferably 80 to 200° C., for example. The curing temperature is more preferably 100 to 180° C., and still more preferably 110 to 150° C. The curing time for the post-curing depends on the curing temperature, and is preferably 1 to 48 hours. The curing time is more preferably 1 to 10 hours and still more preferably 2 to 5 hours.

The method for curing the resin composition of the present invention is mentioned below. Commonly used methods can be applied to curing of the resin composition of the present invention depending on characteristics of a resin to be used.

The resin composition of the present invention is thermally cured using a curing catalyst to become a cured product. The above-mentioned thermal-latent cation generator is preferably used as the above-mentioned curing catalyst. A method of using a curing agent is mentioned as a curing method other than the cationic curing method using the cationic curing catalyst such as the thermal-latent cation generator. Acid anhydrides, amines, phenol resins, and the like may be mentioned as such a curing agent. Specific examples of such a curing agent include: acid anhydrides such as methyltetrahydrophthalic anhydride, hexahydrophthalic anhydride, methylhexahydrophthalic anhydride, pyromellitic anhydride, and methylnadic acid; amines such as ammonia, primary to tertiary amines, hexamethylene teteramine; various phenol resins such as a phenol novolac resin, a cresol novolac resin, a bisphenol A novolac resin, a dicyclopentadiene phenol resin, a phenol aralkyl resin, and a terpene phenol resin; various phenol resins such as polyphenol resins obtained by condensation reaction of various phenols with various aldehydes such as hydroxybenzaldehyde, crotonaldehyde, and glyoxal; $BF_3$ complexes, sulfonium salts, and imidazoles. One or more species of them may be used. The curing using a polyphenol compound is mentioned as a preferable embodiment.

In the above-mentioned curing method using the curing agent, a curing accelerator may be used if necessary. Examples of such a curing accelerator include organic phosphorus compounds such as imidazole, triphenylphosphine, tributylhexadecylphosphonium bromide, tributylphosphine, and tris(dimethoxylpenyl)phosphine. One or more species of them may be used. The above-mentioned curing temperature is preferably 70 to 200° C., and more preferably 80 to 150° C.

The above-mentioned curing agent and the curing accelerator may insufficiently exhibit excellent storage stability as one functional effect of the present invention. Therefore, it would be better not to use the curing agent and the curing accelerator actively, except for the case where they must be absolutely needed.

"Characteristics of Cured Product"

A cured product of the resin composition of the present invention can be produced by the above-mentioned curing method. Such a cured product is excellent in various optical characteristics. For example, it is preferable that the cured product has a haze of 20% or less. Thus, the preferable embodiments of the present invention include the above-mentioned resin composition, in which a cured product of the resin composition has a haze of 20% or less. The haze of the cured product is more preferably 10% or less, and still more preferably 5% or less, and particularly preferably 1% or less. With respect to the transparency, it is preferable that the cured product has a light transmittance in a visible region (a range having a wavelength of 360 to 780 nm) of 75% or more. The transmittance of the cured product is more preferably 80% or more, and still more preferably 85% or more, and particularly preferably 87% or more.

It is needed for the above-mentioned cured product to show a wide range of the refractive index and the Abbe number depending on optical design in an optical system to which the cured product is used. The transmittance of the cured product can be measured according to JIS K7361-1. The haze thereof can be measured according to JIS K7136. The refractive index and the Abbe number can be measured according to JIS K7142.

The PCT moisture absorptivity of the above-mentioned cured product varies depending on curing conditions. It is preferable that the curing conditions are optimized and thereby the PCT moisture absorptivity is adjusted to 2% or less and 1.0% or less, and more preferably 0.5% or less, and still more preferably 0.2 or less.

With respect to heat resistance of the above-mentioned cured product, it is preferable that any change such as crack generation are not observed and the change rate of the total light transmittance and the haze is 20% or less. The change rate of the total light transmittance and the haze is more preferably 15% or less, and still more preferably 10% or less.

Particularly in the application such as an in-vehicle camera and a bar-code reader for delivery service, yellowing or deterioration of strength may be caused due to ultraviolet irradiation or exposure to summer high temperatures for a long time. These phenomena are caused because air or moisture is irradiated with ultraviolet or exposed to heat and such a synergistic effect generates oxygen radicals. The improved moisture resistance of the resin composition suppresses the resin composition to absorb moisture, and therefore, generation of oxygen radicals, attributed to the synergistic effect of the ultraviolet irradiation or the heat exposure, can be suppressed. As a result, the cured product is excellent in heat resistance and therefore yellowing or deterioration of strength can be suppressed for a long time.

"Optical Material"

The present invention is an optical material comprising the curable resin composition. The optical material is a curing material including the above-mentioned resin composition, and also referred to as simply "curing material" or "curable material for optical members". The resin composition of the present invention exhibits excellent transparency and optical characteristics, as mentioned above. A cured product obtained by curing such a resin composition also exhibits the same characteristics, and therefore can be preferably used in various applications such as an optical application, an opto device application, and a display device application. It is preferable that the optical material of the present invention is a curable optical material which is constituted by the above-mentioned resin composition and is a thermal or photocuring optical material cured by heat or light (a thermal curing optical material or a photocuring optical material).

As mentioned above, the Abbe number and the refractive index of the above-mentioned optical materials can be controlled by adjusting a combination of the metalloxane component and/or the epoxy compound. The above-mentioned combinations are mentioned as such a preferable combination. It is preferable that a method of curing such an optical material, various characteristics such as viscosity thereof, and the like are the same as those in the above-mentioned resin composition. Metal oxide fine particles may be used singly or in combination with an organosiloxane compound, as the metalloxane component. The above-mentioned metal oxide fine particles may be preferably used as the metal oxide fine particles, and appropriately adopted depending on a desired refractive index or an Abbe number.

An embodiment in which the optical material has an Abbe number of 45 or more and has a transmittance at a wavelength of 500 nm of 60% or more is preferable as an embodiment in which the above-mentioned optical material has a large Abbe number. Such an optical material which has an Abbe number and a transmittance within such ranges, respectively, has excellent optical characteristics such as high transparency and resolution. The Abbe number of the optical material is more preferably 55 or more, and still more preferably 58 or more. The transmittance of the optical material is more preferably 80% or more, and still more preferably 85% or more.

An embodiment in which the optical material has an Abbe number of 35 or less and has a transmittance at a wavelength of 500 nm of 60% or more is preferable as an embodiment in which the above-mentioned optical material has a small Abbe number. Such an optical material which has an Abbe number and a transmittance within such ranges, respectively, has excellent optical characteristics such as high transparency and resolution. The Abbe number of the optical material is more preferably 34 or less, and still more preferably 33.5 or less, and particularly preferably 30 or less. The transmittance of the optical material is more preferably 80% or more, and still more preferably 85% or less.

It is preferable that the above-mentioned optical material (transparent optical material) has a bending resistance strength of 60 MPa or more when being cured at 120° C. for 2 minutes. The bending resistance strength is as mentioned above.

The above-mentioned optical material includes the above-mentioned resin composition, but may appropriately contain other components depending on the application of the optical material. Specifically, preferable examples of such other components include an UV absorbent, an IR cut agent, a reactive diluent, a pigment, a dye, an antioxidant, a light stabilizer, a plasticizer, a non-reactive compound, a chain transfer agent, a thermal polymerization initiator, an anaerobic polymerization initiator, a light stabilizer, a polymerization inhibitor, and a defoaming agent.

The present invention is also an optical member produced by curing the optical material. An optical member prepared by curing an optical material having a large Abbe number among the above-mentioned optical materials as such an optical member (a cured product formed by the above-mentioned resin composition). A cured product which includes the resin containing 10% or less of double bonds (aromatic ring and the like) is preferable as the optical member having a high Abbe number. If the compound having a double bond such as an aromatic ring accounts for 10% by weight or less in the resin composition, such a cured product is excellent in optical characteristics such as refractive index and can be preferably used in optical applications and the like.

The Abbe number and the refractive index of the above-mentioned optical member can be controlled by adjusting the combination of the metalloxane component and/or the epoxy compound constituting the resin composition in such a way that the Abbe number and the refractive index can be within preferable ranges, respectively, depending on the application. If an optical member having a large Abbe number is prepared, for example, such an optical member satisfy the same conditions as in the above-mentioned optical material. Such a cured product having a large Abbe number can be used in the following various applications. Metal oxide fine particles may be used singly or in combination with an organosiloxane compound, as the metalloxane component. The above-mentioned metal oxide fine particles may be preferably used as the metal oxide fine particles, and appropriately adopted depending on a desired refractive index or an Abbe number.

"Application of Cured Product"

Specifically, the following applications may be mentioned as a preferable application of the above-mentioned cured product. Optical applications, for example, spectacle lens, camera lens such as a (digital) camera, a cellular phone and an in-vehicle camera, a filter, a diffraction grating, a prism, a light guide element, a light beam condenser lens, a light diffusing lens, a watch glass, a transparent glass or cover glass such as a cover glass for display devices; opto device applications such as a photosensor, a photoswitch, a LED, a light-emitting element, a optical waveguide tube, a multiplexer, a demultiplexer, a disconnector, an optical divider, and an optical-fiber adhesive; and display device applications, for example, a substrate for display elements such as a LCD, an organic EL, and a PDP, a color filter substrate, a touch panel substrate, a display protective film, a display backlight, a light guide plate, an antireflective film, and an antifogging film.

Among the above-mentioned applications, the following optical characteristics will be needed in the lens applications. The curable resin composition, the optical material, and the method for controlling the optical material according to the present invention can be preferably used in order to prepare an optical member which needs the following characteristics.
(1) Large-Abbe Lens
Abbe number: 50 or more, refractive index: about 1.5
(2) Small-Abbe Lens
Abbe number: 35 or more, refractive index: 1.57 or more The shape of the above-mentioned cured product can be appropriately adopted depending on the application, but it is not especially limited. The cured product may be a molded product such as a deformed product, or may have a film, sheet, or pellet shape.

The Abbe number and/or the refractive index of the resin composition of the present invention can be controlled by appropriately selecting the organic resin component and the metalloxane component. With respect to such control, the Abbe number and/or the refractive index, especially the Abbe number can be controlled by appropriately selecting the organic resin component. With respect to a correlation line between the Abbe number and the refractive index of the curable resin composition, the Abbe number is almost determined depending on the organic resin component, and the refractive index can be adjusted depending on the metalloxane component while the Abbe number of the organic resin component is maintained. For example, if the refractive index is reduced, silica nanoparticles, the siloxane A, and the siloxane AB having a high ratio of the $R^1$, and the like are preferably used. For increase in the refractive index, high-refractive nanoparticles such as $TiO_2$, the siloxane B, the siloxane AB having a high ratio of the $R^2$, a titanoxane compound, and the like may be preferably used. The high refractive nanoparticles are better than the siloxane B, and the siloxane AB having a high ratio of the $R^2$, and $TiO_2$ is better than the titanoxane compound in order to increase the refractive index. The titanoxane compound and the like can be mixed at a high concentration. The metal oxide fine particles (oxide nanoparticles) are better than the organosiloxane compound because the particles themselves have uneven refractive indexes and therefore have a broader selection. However, a large amount of the metal oxide fine particles is difficult to blend because they have a high true specific gravity and light scattering on the surface of the curable resin composition makes it difficult to provide high transparency. Further, a metal hydroxyl group of the oxide adversely affects the stability of the cation polymerizable compound, to which attention needs to be paid. In view of these points, an organosiloxane compound without a reactive group (metalloxane polymer) is preferable and the above-mentioned organosiloxane compound without the Y group in the above formula, such as a hydroxyl group and an alkoxy group is more preferable.

As mentioned above, the Abbe number and/or the refractive index of the resin composition can be controlled by appropriately determining the organosiloxane compound and the organic resin component. The Abbe number and/or the refractive index of the optical material constituted by the resin composition and the optical member which can be produced by curing the optical material also can be controlled, in addition to the Abbe number and/or the refractive index of the above-mentioned resin composition. That is, the method of controlling an Abbe number and/or a refractive index of the resin component, the optical material, and the optical member preferably has the following embodiments (i) to (iv): (i) the ratio of the $R^1$ to the $R^2$ of the organosiloxane compound is varied; (ii) at least one selected from the group consisting of aliphatic epoxy compounds, hydrogenated epoxy compounds, and alicyclic epoxy compounds is used as the organic resin component; (iii) the aromatic epoxy compounds are used as the organic resin component; (iv) the above-mentioned (i) to (iii) embodiments are employed in combination.

The above-mentioned embodiments (i) to (iii) are the same as those mentioned in the above-mentioned resin composition. The combination of these embodiments (iv) is also as mentioned above. Specifically, the above-mentioned embodiment (i) includes a method of controlling an Abbe number and/or a refractive index of the above-mentioned optical material, wherein the Abbe number and/or the refractive index are/is controlled by varying the ratio of the $R^1$ to the $R^2$ of the organosiloxane component. Such an embodiment (i) is preferably as mentioned above. Specifically, the control is permitted by varying a and b in the above-mentioned average compositional formula, and the following embodiments (a) and (b) are preferable, for example. That is, an embodiment (a) in which the siloxane A and the siloxane B are used in combination as the organosiloxane compound, and the content of the siloxane A in the organosiloxane compound is varied; and an embodiment (b) in which the control is performed by using the siloxane AB as the organosiloxane compound and the content of the $R^1$ in the siloxane AB is varied, are preferable. As mentioned above, the siloxane A means an organosiloxane component in which the b is 0 in the above-mentioned average compositional formula, and the siloxane B means an organosiloxane component in which the a is 0 in the above-mentioned average compositional formula. The siloxane AB means an organosiloxane component in which the a is not 0 and the b is not 0 in the above-mentioned average compositional formula.

An embodiment in which at least one selected from the group consisting of aliphatic epoxy compounds, hydrogenated epoxy compounds, and alicyclic epoxy compounds is used is preferable as the above-mentioned embodiment (ii). An embodiment in which one or more different aromatic epoxy compounds are used is preferable as the above-mentioned embodiment (iii).

Preferable examples of the above-mentioned embodiment (iv) include embodiments in which the above-mentioned embodiments (i) and (ii) are employed; the above-mentioned embodiments (i) and (iii) are employed; the above-mentioned embodiments (ii) and (iii) are employed; and all of the embodiments (i) to (iii) are employed. Among them, the embodiment in which all of the embodiments (i) to (iii) are employed is more preferable. That is, the present invention also includes a method for controlling an Abbe number and/or a refractive index of the optical material, in which at least one selected from the group consisting of aliphatic epoxy compounds, hydrogenated epoxy compounds, and alicyclic epoxy compounds, and an aromatic epoxy compound are used in combination as the organic resin component, and the ratio of the $R^1$ to $R^2$ in the organosiloxane compound is varied.

In the above-mentioned production method, an embodiment in which the $R^1$ is an alkyl group and the $R^2$ is a phenyl group is still more preferable in the above-mentioned embodiments (i) to (iii). Thus, the present invention also includes a method for controlling an Abbe number and/or a reflective index of the optical material, in which at least one selected from the group consisting of aliphatic epoxy compounds, hydrogenated epoxy compound, and alicyclic epoxy compounds, and an aromatic epoxy compound are used in combination as the organic resin component, and a ratio of an alkyl group to a phenyl group in the organosiloxane compound is varied.

The method having the above-mentioned embodiment (i) that is the above-mentioned embodiment (a) is preferable. Thus, the preferable embodiments of the present invention also include a method for controlling an Abbe number and/or a reflective index of the optical material, in which at least one selected from the group consisting of aliphatic epoxy compounds, hydrogenated epoxy compounds, and alicyclic epoxy compounds, and an aromatic epoxy compound are used in combination as the organic resin component; the siloxane A and the siloxane B are used in combination as the organosiloxane compound; and the content of the siloxane A in the organosiloxane compound is varied. That is, such a method is a method for controlling the Abbe number and/or the refractive index of the optical material, in which the epoxy components A and B are used and the siloxane A and the siloxane B are used in combination.

The embodiment which employs all of the above-mentioned embodiments (i) to (iii) preferably is an embodiment in which the above-mentioned embodiment (i) is the above-mentioned embodiment (b). Thus, the preferable embodiments of the present invention include a method for controlling an Abbe number and/or a refractive index of the above-mentioned optical material, in which at least one selected from the group consisting of aliphatic epoxy compounds, hydrogenated epoxy compounds, and alicyclic epoxy compounds, and an aromatic epoxy compound are used in combination as the organic resin component; the siloxane AB is used as the organosiloxane compound; and the $R^1$ content in the siloxane AB is varied. That is, such a method is a method for controlling the Abbe number and the refractive index of the above-mentioned optical material, in which the epoxy components A and B are used and the $R^1$ content in the siloxane AB is varied.

The above-mentioned embodiment (iv) is preferably an embodiment in which the embodiments (i) and (ii) are employed if the Abbe number is controlled to be a high value. That is, the present invention is also a method for controlling an Abbe number and/or a refractive index of the above-mentioned optical material, in which at least one selected from the group consisting of aliphatic epoxy compounds, hydrogenated epoxy compounds, and alicyclic epoxy compounds is used as the organic resin component, and a ratio of the $R^1$ to the $R^2$ in the organosiloxane compound is varied.

According to the above-mentioned production method, it is more preferable that the $R^1$ is an alkyl group and the $R^2$ is a phenyl group. That is, the present invention include a method for controlling an Abbe number and/or a refractive index of the optical material, wherein at least one compound selected from the group consisting of aliphatic epoxy compounds, hydrogenated epoxy compounds, and alicyclic epoxy compounds is used as the organic resin component and a ratio of a saturated aliphatic hydrocarbon group to at least one selected from the group consisting of aryl groups and aralkyl groups, contained in the organosiloxane compound as the metalloxane component, is varied.

The present invention also includes a method for controlling an Abbe number and/or a refractive index of the optical material, wherein the at least one selected from the group consisting of aliphatic epoxy compounds, hydrogenated epoxy compounds, and alicyclic epoxy compounds is used as the organic resin component; one or more different organosiloxane compounds represented by the following average formula:

$$R^1{}_aR^2{}_bY_cSiO_d$$

(in the formula, $R^1$ represents a saturated aliphatic hydrocarbon group; $R^2$ represents at least one selected from the group consisting of aryl groups and aralkyl groups; Y represents at least one selected from the group consisting of RO groups, hydroxyl groups, halogen atoms and a hydrogen atom; R represents at least one selected from the group consisting of alkyl groups, cycloalkyl groups, aryl groups, and aralkyl groups; and a, b, c, and d satisfy $0 \leq a < 3$, $0 \leq b < 3$, $0 \leq c < 3$, $0 < a+b+c < 3$, $0 < a+b < 3$, and $a+b+c+2d=4$); and a ratio of $R^1$ to $R^2$ in the total amount of the organosiloxane compound is varied.

According to the above-mentioned embodiment, it is preferable that substantially only the epoxy A is used. In the embodiment in which all of the above-mentioned embodiments (i) to (iii) are employed, it is preferable that no epoxy B is included. That is, the embodiment in which the epoxy A is mainly included in accordance with the above-mentioned embodiments (i) to (iii) is also preferable.

In the embodiment in which the above-mentioned embodiments (i) and (ii) are employed, it is preferable that the above-mentioned embodiment (i) is the above-mentioned embodiment (a). Thus, the preferable embodiments include a method for controlling an Abbe number and/or a refractive index of the above-mentioned optical material, in which one or more different compounds selected from the group consisting of aliphatic epoxy compounds, hydrogenated epoxy compounds, and alicyclic epoxy compounds are used as the organic resin component; the siloxane A and the siloxane B are used in combination as the organosiloxane compound; and the siloxane A content in the organosiloxane compound is varied.

It is preferable that the above-mentioned embodiment (iv) is an embodiment which employs the above-mentioned embodiments (ii) and (iii) if a resin which has a small Abbe number and a high curing rate is produced. Such an embodiment has an advantage that the embodiment (ii) can redeem a defect of the component which has a low curing rate in the embodiment (iii). That is, the present invention also includes a method for controlling an Abbe number and/or a refractive index of the optical material, wherein at least one compound selected from the group consisting of aliphatic epoxy compounds, hydrogenated epoxy compounds, and alicyclic epoxy compounds, and an aromatic epoxy compound are use together as the organic resin component, and a ratio of the at least one compound to the aromatic epoxy compound is varied. That is, the Abbe number and/or the refractive index are/is controlled by adjusting the epoxy A content relative to the total amount of the at least one (the epoxy A) selected from the group consisting of aliphatic epoxy compounds, hydrogenated epoxy compounds, and alicyclic epoxy compounds, and the aromatic epoxy compound (the epoxy B).

The method for controlling the optical material of the present invention is also a method for controlling the optical material, in which the organic resin component contains an epoxycyclohexane skeleton. The use of such a control method permits easy production of a resin composition and an optical material, each having desired optical characteristics, and therefore, such a resin composition and an optical material can be preferably applied in an optical application and the like. According to the control method which employs the above-mentioned embodiment (i), it is preferable that the organic resin component is a compound having an epoxycyclohexane skeleton (epoxy C). Specifically, it is preferable that the organic resin component is a compound having an epoxycyclohexane skeleton (epoxy C) in the above-mentioned embodiment (i), the embodiment which employs the above-mentioned embodiments (i) and (ii), the embodiment which employs the above-mentioned embodiments (i) and (iii), and the embodiment which employs the above-mentioned embodiments (i), (ii), and (iii).

Specific methods of the above-mentioned control method are preferable as mentioned in the above-mentioned resin composition and the like.

"Production Method of Optical Material"

The present invention is also a method for producing an optical material by the above-mentioned method for controlling an optical material. Such a production method is not especially limited as long as the above-mentioned resin composition can be produced. If it is difficult for the metalloxane component and the organic resin to be homogeneously mixed with each other, it is preferable that the production method includes a step (1) of preparing a mixture containing the metalloxane component, the organic resin, and the solvent and a step (2) of degassing the solvent from the above-mentioned mixture.

The above-mentioned preparing step (1) is not especially limited as long as the mixture containing the above-mentioned three components can be prepared and the three components are homogeneously mixed with each other. Arbitrary additional (blending) order and arbitrary mixing method can be employed. Further, the above-mentioned mixture may contain other components.

Organic solvents are preferable as the above-mentioned solvent. Examples thereof include mineral oils, vegetable oils, wax oils, and silicone oils, in addition to alcohols, ketones, aliphatic and aromatic carboxylic acid esters, ethers, ether esters, aliphatic and aromatic hydrocarbons, and halogenated hydrocarbons. Among these, solvents in which a compound containing a glycidyl group and/or an epoxy group easily is dissolved are preferable. Specifically, ketones, aliphatic and aromatic carboxylic acid esters, ethers, aliphatic and aromatic hydrocarbons are preferable. Among these, methanol, ethanol, isopropanol, butanol, methyl ethyl ketone, acetone, methyl isobutyl ketone, acetonitrile, chloroform, toluene, and xylene are preferable. Isopropanol, butanol, methyl ethyl ketone, and toluene are more preferable.

It is preferable in the above-mentioned preparation step that the preparation is performed at 100° C. or less by adjusting a degree of depressurization. In the above-mentioned preparation method, a ratio of the organic resin component and the metalloxane component to the organic resin component and the metalloxane component and the solvent is preferably 10 to 90% by weight. The ratio is more preferably 15 to 60% by weight.

It is preferable that the above-mentioned degassing step (2) is performed in the coexistence of a high-boiling component.

That is, it is preferable in the production method of the present invention that the step of degassing the solvent in the coexistence of a high-boiling component if a composition intermediate includes a solvent in the production processes of the resin composition.

Such a production method can be preferably applied to the case where a solvent dispersion of a metal oxide or a solution of organosiloxane is used as a starting material of the metalloxane component. The degassing in the coexistence of a high-boiling component permits increase in concentration of the metalloxane component, and a resin composition with high transparency and a large Abbe number can be produced. In addition, increase in viscosity and gelling of the mixture can be effectively suppressed, which permits continuous production of the composition. The "in the coexistence of a high-boiling component" means that a high-boiling component coexists during the degassing step and may coexist throughout the degassing step or temporarily during the degassing step. However, it is preferable that such a high-boiling component coexists throughout the degassing step in order to prevent increase in the viscosity.

A method of adding the above-mentioned high-boiling component is not especially limited as long as the operation and effects of the present invention are exhibited. The high-boiling component may be added in one portion, added dropwise, or added in some portions. Among these, it is preferable that the high-boiling component is added in one portion. It is not especially limited when to add (or start to add) the high-boiling component. For example, (1) the high-boiling component may be added after completion of the preparation step and before initiation of the degassing step, (2) the high-boiling component may be added during the preparation step, or (3) the high-boiling component may be added during the degassing step. Among these, the embodiment (1) is preferable in order to prevent increase in viscosity. Thus, the preferable embodiments of the present invention include the method of producing an optical material, in which a high-boiling material is added to the mixture after mixing the organosiloxane compound (inorganic substance) with the organic resin component (organic substance) and before degassing the solvent from the mixture.

The addition amount of the above-mentioned high-boiling component is preferably 0.01 to 10% by weight relative to 100% by weight of the mixture containing the organic resin component and the organosiloxane compound and the solvent before being degassed and the high-boiling component and other components if necessary. The addition amount is more preferably 0.1 to 5% by weight, and still more preferably 0.5 to 3% by weight. If the addition amount of the high-boiling component is more than 10% by weight, the degassing needs to be performed at a high temperature in order to reduce the content of the high-boiling component in the curable resin composition to 30000 ppm (3% by weight) or less. Therefore, the cationic curable functional group in the organic resin component may possibly react with the metal hydroxyl group of the metalloxane.

The above-mentioned high-boiling component is included in the curable resin composition that is a final product after completion of the degassing step. The high-boiling component is preferably a high-boiling alcohol as mentioned below. The alcohols are generally known to have high esterification activity to metal hydroxyl groups such as a silanol group and easily cause a reaction of blocking the metal hydroxyl groups. If the curable resin composition of the present invention includes a metal hydroxyl group in the metalloxane component, for example, a silanol group of silica particles, or a silanol group of organosiloxane, the coexistence of the high-boiling alcohol during production or preservation of the resin composition causes the reaction of blocking the metal hydroxyl groups. Therefore, the storage stability of the resin composition is improved.

The content of the high-boiling component in the above-mentioned curable resin composition is preferably 100 to 30000 ppm (0.01 to 3% by weight) relative to the total amount of the curable resin composition. If the content is more than 30000 ppm, the above-mentioned reaction of blocking the metal hydroxyl group increases a concentration of by-product water. Therefore, the chemical stability of the resin composition may be deteriorated. Further, the high-boiling alcohol or moisture generated by the above-mentioned blocking reaction is gasified and may generate bubbles when the resin composition is cured. Such gasification causes void in the cured product or inhibits the curing reaction. If the content is less than 100 ppm, the above-mentioned effect of improving storage stability of the resin composition may be insufficiently exhibited.

The preferable embodiments of the present invention include an embodiment in which the metalloxane component is metal oxide fine particles having an average particle diameter of 50 nm or less, the metal oxide fine particles being derived from an organic solvent dispersion of wet metal oxide fine particles having a pH of 3.4 to 11 at 25° C. when being dispersed in a solution, and the curable resin composition includes 100 to 30000 ppm of a high-boiling component and 5% by weight or less of an organic solvent, relative to the total amount of the curable resin composition.

The above-mentioned metalloxane component is metal oxide fine particles derived from the organic solvent dispersion, which are wet metal oxide fine particles with a pH of 3.4 to 11 at 25° C., dispersed in a solution.

The preferable embodiments of the above-mentioned metalloxane component can be appropriately combined with the preferable embodiments mentioned in this description.

The residual amount of the above-mentioned high-boiling component can be measured by gas chromatography (GC). The measurement conditions are as follows.

"GC Measurement Conditions"
Column: product of GL Sciences Inc., "DB-17"
Carrier gas: Helium
Flow rate: 1.44 mL/min The conditions of the above-mentioned degassing step are not especially limited as long as the solvent can be degassed. It is preferable that the degassing step is performed under conditions where excessive decomposition or curing reaction of the organic resin component, or excessive aggregation of the metalloxane component is suppressed. Specifically, the degassing temperature is preferably 200° C. or less. The degassing temperature is more preferably 100° C. or less, and still more preferably 80° C. or less. The degassing time is preferably 72 hours or less. The degassing time is more preferably 24 hours or less, and still more preferably 2 hours or less. The pressure in the degassing step may be a normal pressure, and preferably 200 torr or less, and more preferably 100 torr or less. The degassing step is completed when the content of the solvent accounts for 5% by weight or less relative to 100% by weight of the mixture at that time. The content of the solvent after completion of the degassing step is more preferably 3% by weight or less, and still more preferably 1% by weight or less, and particularly preferably 0.5% by weight or less.

The above-mentioned high-boiling component is a component having a boiling point of 100° C. or more at a normal pressure, which is contained in the organic solvent included in the curable resin composition. Alcohols having a boiling point of 100° C. or more such as 2-ethyl-1-hexanol, dodecanol, and butanol are preferable as the above-mentioned high-boiling component. Alcohol having a boiling point of 120° C. or more such as 2-ethyl-1-hexanol and dodecanol are more preferable and alcohols having a boiling point of 150° C. or more are still more preferable. Thus, a composition including an alcohol as the high-boiling material is preferable. Among these, 2-ethyl-1-hexanol and dodecanol are more preferable, and 2-ethyl-1-hexanol is still more preferable as the alcohol having a boiling point of 120° C. If alcohols having a boiling point of less than 100° C., the increase in viscosity of the mixture may be insufficiently prevented, and therefore alcohols having a boiling point of 100° C. or more are preferable. The preferable embodiments of the present invention include the method for producing the resin composition, in which the above-mentioned high-boiling component is an alcohol having a boiling point of 100° C. or more. Among the alcohols having a boiling point of 120° C. or more, alcohols having a boiling point of 150° C. or more are more preferable and alcohols having a boiling point of 190° C. or more are still more preferable.

Polyalcohols such as diethylene glycol, glycerin, propylene glycol, butanediol, hexanediol, triethylene glycol, and tetraethylene glycol are preferable as the above-mentioned high-boiling alcohols. Diethylene glycol, glycerin, butanediol are more preferable and butanediol is still more preferable as the above-mentioned high-boiling alcohols.

The polyalcohols are excellent in an effect of improving the storage stability of the resin composition because the polyalcohols have a high esterification activity for the above-mentioned metal hydroxyl group contained in the metalloxane component, in comparison to monovalent alcohols.

Alcohols having a melting point of 20° C. or less are preferable as the above-mentioned high-boiling alcohols. If the melting point is higher than 20° C., the high-boiling alcohols may be deposited immediately after the production of the resin composition or during preservation of the composition.

The resin composition of the present invention is preferably produced by the above-mentioned method. That is, the preferable embodiments of the present invention includes a method for producing a resin composition including an organic resin component and a metalloxane component, in which the method includes a step of preparing a mixture containing the metalloxane component, the organic resin component, and a solvent; a step of degassing the solvent from the mixture, and the degassing step is performed in the coexistence of the high-boiling component.

The resin composition which is produced in the above-mentioned production method includes an organic resin component and a metalloxane component. The above-mentioned organic resin component and metalloxane component are preferably used as the organic resin component and the metalloxane component, respectively. All of the contents on the resin composition such as other components and a curing method can be preferably applied to the above-mentioned method for producing the resin composition. Alicyclic epoxy compounds are particularly preferable as the organic resin component. The preferable embodiments of the present invention include the method for producing the resin composition in which the above-mentioned organic resin component is an alicyclic epoxy compound. In addition, the above-mentioned production method can be preferably used in each case where (1) the metalloxane component is an organosiloxane compound, (2) the metalloxane component is metal oxide fine particles, and (3) the cases (1) and (2) are employed together. The above-mentioned compounds may be preferably used as the metal oxide fine particles. Proper compounds can be appropriately selected from the above-mentioned components depending on a desired refractive index or Abbe number.

It is preferable that the resin composition of the present invention is produced by the above-mentioned production method. In this case, the degassing is performed in the coexistence of the high-boiling component and the high-boiling component remains in the composition according to the above-mentioned production method. Therefore, the resin composition includes the high-boiling component. As mentioned above, a preferable embodiment of the high-boiling component is an alcohol having a high boiling point. A resin composition including a high-boiling material (high-boiling alcohol)-containing organic resin component (for example, an alicyclic curable substance) and a metalloxane component (for example, an organosiloxane compound and an inorganic dispersion) is preferable. Thus, the preferable embodiments of the present invention include a transparent resin composition including an alcohol having a boiling point of 100° C. or more (preferably 120° C. or more, and more preferably 150° C. or more, and still more preferably 190° C. or more), an organic resin component (for example, a thermosetting material), an organosiloxane compound (for example, an inorganic oxide).

An external addition method and an internal deposition method are preferably used as a method of mixing the metalloxane component with the resin component when the above-mentioned resin composition is produced. If the curable resin composition of the present invention is used in an optical application, generation of the metalloxane compound by an internal deposition method may cause the following various adverse effects: reduction in stability of the composition, due to the used catalyst; difficulty in control of the metalloxane structure and the proportions of components in the metalloxane; modification before curing, due to reaction with the organic resin component (epoxy group); residual catalyst; and residual water which is hard to remove. Therefore, the internal addition method is not preferable if the curable resin composition is used as an optical material.

The external addition method of the above-mentioned metalloxane component, specifically an embodiment of adding the metalloxane compound into the resin composition, and the dispersion are mentioned below.

With respect to the form of the above-mentioned metalloxane component, it is preferable that the above-mentioned metalloxane component in the form of powder, liquid, or solution in which the component is dissolved, is mixed with the resin component. The form of the solution in which the metalloxane component is dissolved is preferable.

Examples of the above-mentioned medium include solvents, plasticizers, monomers, and liquid resins. Water, organic solvents, mineral oils, vegetable oils, wax oils, silicone oils, and the like are preferably used as the solvents. Solvents in which compounds containing an epoxy group can be easily dissolved are preferable.

The form of a solvent dispersion may be mentioned as the above-mentioned solution including the solvent and the metalloxane component. The content of the metalloxane component in the solvent dispersion is not especially limited, but preferably 10 to 70% by weight in the entire solvent dispersion, and more preferably 20 to 50% by weight. The solvent dispersion can be easily handled within such a content range. The content of the solvent in the solvent dispersion is not especially limited, but preferably 90 to 30% by weight and more preferably 80 to 50% by weight in the entire solvent dispersion.

A proper organic solvent selected from the above-mentioned organic solvents mentioned in the method for producing the optical material can be used as the above-mentioned organic solvent.

As a method for producing the metalloxane component used in the present invention, a method of producing the metalloxane component by hydrolyzing and condensing the above-mentioned alkoxide compound in the above-mentioned liquid solvent containing the resin component (internal deposition method) also can be employed. However, a method of producing a metalloxane compound by hydrolyzing and condensing the alkoxide compound in the liquid solvent, then removing the hydrolysis catalyst, and mixing the resin component with metalloxane component, is preferable. If the hydrolysis condensation product is produced in the liquid medium containing the resin component, the organic substance and the inorganic substance are compounded. Then, a resin composition of the present invention as an organic-inorganic hybrid (complex) in which the metalloxane components are finely dispersed into the resin that is a matrix can be obtained. Thus-obtained organic-inorganic hybrid exhibits excellent curing property and flame resistance.

The internal deposition method is mentioned below. According to the internal deposition method, the above-mentioned starting materials and the like mentioned in the hydrolysis condensation method of the metal alkoxide such as a silane compound can be preferably used.

According to a specific production method of the metalloxane component (internal deposition method), a liquid medium containing a resin, preferably a solution containing a resin is first prepared, and into the solution, a metal alkoxide compound and/or a carboxylic acid salt compound, and water or a solvent containing such a compound are added, and then a hydrolysis reaction and a condensation reaction are performed. The above-mentioned resin component and a solvent, a plasticizer, or, a compound having at least one structure selected from the group consisting of an ether bond, an ester bond, and a nitrogen atom as a lubricant are preferably used as the above-mentioned liquid medium containing the resin component.

The use amount of the above-mentioned solvent and the like is preferably 5 parts by weight or more and 500 parts by weight or less relative to 100 parts of the resin. The use amount is more preferably 20 parts by weight or more and 200 parts by weight or less. Methanol, ethanol, and the like are preferable as the above-mentioned other solvents.

With respect to reaction conditions of the hydrolysis condensation in the above-mentioned liquid medium containing the resin, the reaction temperature is preferably 0 to 120° C., and more preferably 10 to 100° C., and still more preferably 20 to 80° C. The reaction time is preferably 30 minutes to 24 hours.

With respect to the above-mentioned method for producing the resin composition (internal deposition method), it is preferable that the resin composition is produced by hydrolyzing and condensing the metal alkoxide in the presence of water. In such a production method, it is more preferable that to a reaction liquid in which part of two or more different silane compounds are hydrolyzed and condensed, the rest silane compound is added, and then successively the hydrolysis and condensation are performed. According to the above-mentioned production method, it is preferable that a compound having lower hydrolysis and condensation rates of the two or more different silane compounds is first charged, and the hydrolysis and condensation are allowed to proceed to a specific reaction rate, and then, a compound having higher hydrolysis and condensation rates is charged and the hydrolysis and condensation are successively performed. As a result, the obtained hydrolysis condensation products tend to have uniform proportions and molecular weight of the starting materials.

The resin composition of the present invention and an optical member thereof have the above-mentioned configurations, respectively. The resin composition and the optical member can be continuously produced and have excellent basic performances such as heat resistance and optical characteristics such as transparency. Therefore, the resin composition and the optical member can be useful in an optical application, an opto device application, or a display device application, or useful as a mechanical component material, an electrical and electronic component material, and the like.

DESCRIPTION OF THE PREFERRED EMBODIMENTS

The present invention is mentioned in more detail below with reference to the following Examples, but the present invention is not limited to only these Examples. The term "part(s)" represents "part(s) by weight" and the term "%" represents "% by weight", unless otherwise specified.

Synthesis Example 1-1

A hydrogenated bisphenol A epoxy resin (product of Japan Epoxy Resins Co., Ltd., YX-8000, the epoxy equivalent: 205, a liquid hydrogenated epoxy resin) 60 g and a hydrogenated bisphenol A epoxy resin (product of Japan Epoxy Resins Co., Ltd., YL-7170, the epoxy equivalent: 1000, a solid hydrogenated epoxy resin) 35 g were each weighed, and homogeneously mixed at 140° C. Therewith, a methylsilicone oligomer (product of KONISHI CHEMICAL IND CO., LTD., PMSQ-E, the number average molecular weight: 1800) 5 g was homogeneously mixed at 100° C. to obtain a resin composition for Example 1-1. The yield was 100 g.

Synthesis Example 1-2

A hydrogenated bisphenol A epoxy resin (product of Japan Epoxy Resins Co., Ltd., YX-8000, the epoxy equivalent: 205, a liquid hydrogenated epoxy resin) 91 g and a methylsilicone oligomer (product of KONISHI CHEMICAL IND CO., LTD., PMSQ-E, the number average molecular weight: 1800) 9 g were homogeneously mixed at 100° C. to obtain a resin composition for Example 1-2. The yield was 100 g.

Synthesis Example 1-3

A hydrogenated bisphenol A epoxy resin (product of Japan Epoxy Resins Co., Ltd., YX-8000, the epoxy equivalent: 205, a liquid hydrogenated epoxy resin) 91 g and a methylphenylsilicone oligomer (product of KONISHI CHEMICAL IND CO., LTD., PMPSQ-E, the number average molecular weight: 1100) 9 g were homogeneously mixed at 100° C. to obtain a resin composition for Example 1-3. The yield was 100 g.

Synthesis Example 1-4

A hydrogenated bisphenol A epoxy resin (product of Japan Epoxy Resins Co., Ltd., YX-8000, the epoxy equivalent: 205, a liquid hydrogenated epoxy resin) 65 g and a hydrogenated bisphenol A epoxy resin (product of Japan Epoxy Resins Co., Ltd., YL-7170, the epoxy equivalent: 1000, a solid hydrogenated epoxy resin) 25 g were each weighed, and homogeneously mixed at 140° C. Therewith, a methylsilicone oligomer (product of KONISHI CHEMICAL IND CO., LTD., PMSQ-E, the number average molecular weight: 1800) 10 g was homogeneously mixed at 100° C. to obtain a resin composition for Example 1-4. The yield was 100 g.

Synthesis Example 1-5

A hydrogenated bisphenol A epoxy resin (product of Japan Epoxy Resins Co., Ltd., YX-8000, the epoxy equivalent: 205, a liquid hydrogenated epoxy resin) 55.5 g and a hydrogenated bisphenol A epoxy resin (product of Japan Epoxy Resins Co., Ltd., YL-7170, the epoxy equivalent: 1000, a solid hydrogenated epoxy resin) 30 g were each weighed, and homogeneously mixed at 140° C. Therewith, a methylsilicone oligomer (product of KONISHI CHEMICAL IND CO., LTD., PMSQ-E, the number average molecular weight: 1800) 4.5 g and an alicyclic epoxy resin (product of DAICEL CHEMICAL INDUSTRIES., LTD., CELLOXIDE 2021P, the epoxy equivalent: 130) 10 g were homogeneously mixed at 100° C. to obtain a resin composition for Example 1-5. The yield was 100 g. After stearic acid and SI-80L having concentrations in Table, respectively, were added, the resin composition had a viscosity of 23 Pa·s.

Synthesis Example 1-6

A hydrogenated bisphenol A epoxy resin (product of Japan Epoxy Resins Co., Ltd., YX-8000, the epoxy equivalent: 205, a liquid hydrogenated epoxy resin) 68 g and a hydrogenated bisphenol A epoxy resin (product of Japan Epoxy Resins Co., Ltd., YL-7170, the epoxy equivalent: 1000, a solid hydrogenated epoxy resin) 22 g were each weighed, and homogeneously mixed at 140° C. Therewith, a phenylsilicone oligomer (product of KONISHI CHEMICAL IND CO., LTD., PPSQ-E, the number average molecular weight: 850) 10 g was homogeneously mixed at 100° C. to obtain a resin composition for Example 1-6. The yield was 100 g. After stearic acid and SI-80L having concentrations in Table, respectively, were added, the resin composition had a viscosity of 18 Pa·s.

Synthesis Example 1-7

A hydrogenated bisphenol A epoxy resin (product of Japan Epoxy Resins Co., Ltd., YX-8000, the epoxy equivalent: 205, a liquid hydrogenated epoxy resin) 53 g and a hydrogenated bisphenol A epoxy resin (product of Japan Epoxy Resins Co., Ltd., YL-7170, the epoxy equivalent: 1000, a solid hydrogenated epoxy resin) 17 g were each weighed, and homogeneously mixed at 140° C. Therewith, a methylsilicone oligomer (product of KONISHI CHEMICAL IND CO., LTD., PMSQ-E, the number average molecular weight: 1800) 30 g was homogeneously mixed at 100° C. to obtain a resin composition for Example 1-7. The yield was 100 g.

Synthesis Example 1-8

A hydrogenated bisphenol A epoxy resin (product of Japan Epoxy Resins Co., Ltd., YX-8000, the epoxy equivalent: 205, a liquid hydrogenated epoxy resin) 55 g and a hydrogenated bisphenol A epoxy resin (product of Japan Epoxy Resins Co., Ltd., YL-7170, the epoxy equivalent: 1000, a solid hydrogenated epoxy resin) 30 g were each weighed, and homogeneously mixed at 140° C. Therewith, a methylphenylsilicone oligomer (product of KONISHI CHEMICAL IND CO., LTD., PMPSQ-E, the number average molecular weight: 1100) 10 g and an alicyclic epoxy resin (product of DAICEL CHEMICAL INDUSTRIES., LTD., CELLOXIDE 2021P, the epoxy equivalent: 130) 5 g were homogeneously mixed at 100° C. to obtain a resin composition for Example 1-8. The yield was 100 g.

Synthesis Example 1-9

A hydrogenated bisphenol A epoxy resin (product of Japan Epoxy Resins Co., Ltd., YX-8000, the epoxy equivalent: 205, a liquid hydrogenated epoxy resin) 5 g and a hydrogenated bisphenol A epoxy resin (product of Japan Epoxy Resins Co., Ltd., YL-7170, the epoxy equivalent: 1000, a solid hydrogenated epoxy resin) 25 g were each weighed, and homogeneously mixed at 140° C. Therewith, a phenylsilicone oligomer (product of KONISHI CHEMICAL IND CO., LTD., PPSQ-E, the number average molecular weight: 850) 3 g, a methylsilicone oligomer (product of KONISHI CHEMICAL IND CO., LTD., PMSQ-E, the number average molecular weight: 1800) 7 g were homogeneously mixed at 100° C. to obtain a resin composition for Example 1-9. The yield was 100 g. After stearic acid and SI-80L having the concentrations in Table, respectively, were added, the resin composition had a viscosity of 19 Pa·s.

Synthesis Example 1-10

A hydrogenated bisphenol A epoxy resin (product of Japan Epoxy Resins Co., Ltd., YX-8000, the epoxy equivalent: 205, a liquid hydrogenated epoxy resin) 65 g and a hydrogenated bisphenol A epoxy resin (product of Japan Epoxy Resins Co., Ltd., YL-7170, the epoxy equivalent: 1000, a solid hydrogenated epoxy resin) 15 g were each weighed, and homogeneously mixed at 140° C. Therewith, a phenylsilicone oligomer (product of KONISHI CHEMICAL IND CO., LTD., PPSQ-E, the number average molecular weight: 850) 3 g, a methylsilicone oligomer (product of KONISHI CHEMICAL IND CO., LTD., PMSQ-E, the number average molecular weight: 1800) 7 g, and an alicyclic epoxy resin (product of DAICEL CHEMICAL INDUSTRIES., LTD., CELLOXIDE 2021P, the epoxy equivalent: 130) 10 g were homogeneously mixed at 100° C. to obtain a resin composition for Example 1-10. The yield was 100 g.

Synthesis Example 1-11

A hydrogenated bisphenol A epoxy resin (product of Japan Epoxy Resins Co., Ltd., YL-7170, the epoxy equivalent: 1000, a solid hydrogenated epoxy resin) 50 g and an alicyclic epoxy resin (product of DAICEL CHEMICAL INDUSTRIES., LTD., CELLOXIDE 2021P, the epoxy equivalent: 130) 45 g were each weighed, and homogeneously mixed at 140° C. Therewith, a methylsilicone oligomer (product of KONISHI CHEMICAL IND CO., LTD., PMSQ-E, the number average molecular weight: 1800) 5 g was homogeneously mixed at 100° C. to obtain a resin composition for Example 1-11 The yield was 100 g. After stearic acid and SI-80L having concentrations in Table, respectively, were added, the resin composition had a viscosity of 49 Pa·s.

Synthesis Example 1-12

A hydrogenated bisphenol A epoxy resin (product of Japan Epoxy Resins Co., Ltd., YX-8000, the epoxy equivalent: 205, a liquid hydrogenated epoxy resin) 55 g and a hydrogenated bisphenol A epoxy resin (product of Japan Epoxy Resins Co., Ltd., YL-7170, the epoxy equivalent: 1000, a solid hydrogenated epoxy resin) 15 g were each weighed, and homogeneously mixed at 140° C. Therewith, a phenylsilicone oligomer (product of KONISHI CHEMICAL IND CO., LTD., PPSQ-E, the number average molecular weight: 850) 3 g, a methylsilicone oligomer (product of KONISHI CHEMICAL IND CO., LTD., PMSQ-E, the number average molecular weight: 1800) 7 g, and an alicyclic epoxy resin (product of DAICEL CHEMICAL INDUSTRIES., LTD., EHPE-3150, the epoxy equivalent: 177) 20 g were homogeneously mixed at 100° C. to obtain a resin composition for Example 1-12. The yield was 100 g. After stearic acid and SI-80L having concentrations in Table, respectively, were added, the resin composition had a viscosity of 67 Pa·s.

Synthesis Example 1-13

A hydrogenated bisphenol A epoxy resin (product of Japan Epoxy Resins Co., Ltd., YX-8000, the epoxy equivalent: 205, a liquid hydrogenated epoxy resin) 20 g and a hydrogenated bisphenol A epoxy resin (product of Japan Epoxy Resins Co., Ltd., YL-7170, the epoxy equivalent: 1000, a solid hydrogenated epoxy resin) 10 g were each weighed, and homogeneously mixed at 140° C. Therewith, an alicyclic epoxy resin (product of DAICEL CHEMICAL INDUSTRIES., LTD., CELLOXIDE 2021P, the epoxy equivalent: 130) 40 g and an alicyclic epoxy resin (product of DAICEL CHEMICAL INDUSTRIES., LTD., EHPE-3150, the epoxy equivalent: 177) 20 g were homogeneously mixed at 100° C. Therewith, a phenylsilicone oligomer (product of KONISHI CHEMICAL IND CO., LTD., PPSQ-E, the number average molecular weight: 850) 3 g and a methylsilicone oligomer (product of KONISHI CHEMICAL IND CO., LTD., PMSQ-E, the number average molecular weight: 1800) 7 g were homogeneously mixed at 70° C. to obtain a resin composition for Example 1-13. The yield was 100 g.

Synthesis Example 1-14

A hydrogenated bisphenol A epoxy resin (product of Japan Epoxy Resins Co., Ltd., YX-8000, the epoxy equivalent: 205, a liquid hydrogenated epoxy resin) 55 g, a hydrogenated bisphenol A epoxy resin (product of Japan Epoxy Resins Co., Ltd., YL-7170, the epoxy equivalent: 1000, a solid hydrogenated epoxy resin) 15 g, and an alicyclic epoxy resin (product of DAICEL CHEMICAL INDUSTRIES., LTD., CELLOXIDE 2081, the epoxy equivalent: 201) 20 g were each weighed, and homogeneously mixed at 140° C. Therewith, a phenylsilicone oligomer (product of KONISHI CHEMICAL IND CO., LTD., PPSQ-E, the number average molecular weight: 850) 3 g, and a methylsilicone oligomer (product of KONISHI CHEMICAL IND CO., LTD., PMSQ-E, the number average molecular weight: 1800) 7 g were homogeneously mixed at 70° C. to obtain a resin composition for Example 1-14. The yield was 100 g.

Synthesis Example 1-15

A bisphenol A epoxy resin (product of Japan Epoxy Resins Co., Ltd., 828EL, the epoxy equivalent: 188, a liquid hydrogenated epoxy resin) 60 g and a bisphenol A epoxy resin (product of Japan Epoxy Resins Co., Ltd., JER1007, the epoxy equivalent: 1998, a solid hydrogenated epoxy resin) 20 g were each weighed, and homogeneously mixed at 150° C. Therewith, an alicyclic epoxy resin (product of DAICEL CHEMICAL INDUSTRIES., LTD., CELLOXIDE 2021P, the epoxy equivalent: 130) 10 g and a phenylsilicone oligomer (product of KONISHI CHEMICAL IND CO., LTD., PPSQ-E, the number average molecular weight: 850) 10 g were homogeneously mixed at 90° C. to obtain a resin composition for Example 1-15. The yield was 100 g.

Synthesis Example 1-16

A bisphenol A epoxy resin (product of Japan Epoxy Resins Co., Ltd., 828EL, the epoxy equivalent: 188, a liquid hydrogenated epoxy resin) 60 g and a bisphenol A epoxy resin (product of Japan Epoxy Resins Co., Ltd., JER1007, the epoxy equivalent: 1998, a solid hydrogenated epoxy resin) 20 g were each weighed, and homogeneously mixed at 150° C. Therewith, an alicyclic epoxy resin (product of DAICEL CHEMICAL INDUSTRIES., LTD., CELLOXIDE 2021P, the epoxy equivalent: 130) 10 g and a phenylsilicone oligomer (product of KONISHI CHEMICAL IND CO., LTD., PPSQ-E, the number average molecular weight: 850) 10 g were homogeneously mixed at 90° C. to obtain a resin composition for Example 1-16. The yield was 100 g.

Synthesis Example 1-17

A bisphenol A epoxy resin (product of Japan Epoxy Resins Co., Ltd., 828EL, the epoxy equivalent: 188, a liquid hydrogenated epoxy resin) 60 g and a bisphenol A epoxy resin (product of Japan Epoxy Resins Co., Ltd., JER1007, the epoxy equivalent: 1998, a solid hydrogenated epoxy resin) 20 g were each weighed, and homogeneously mixed at 150° C. Therewith, an alicyclic epoxy resin (product of DAICEL CHEMICAL INDUSTRIES., LTD., CELLOXIDE 2021P, the epoxy equivalent: 130) 10 g and a phenylsilicone oligomer (product of KONISHI CHEMICAL IND CO., LTD., PPSQ-E, the number average molecular weight: 850) 10 g were homogeneously mixed at 90° C. to obtain a resin composition for Example 1-17. The yield was 100 g.

Synthesis Example 1-18

A bisphenol A epoxy resin (product of Japan Epoxy Resins Co., Ltd., 828EL, the epoxy equivalent: 188, a liquid hydrogenated epoxy resin) 20 g and a bisphenol A epoxy resin (product of Japan Epoxy Resins Co., Ltd., JER1007, the epoxy equivalent: 1998, a solid hydrogenated epoxy resin) 10 g were each weighed, and homogeneously mixed at 150° C. Therewith, an alicyclic epoxy resin (product of DAICEL CHEMICAL INDUSTRIES., LTD. CELLOXIDE 2021P, the epoxy equivalent: 130) 25 g, a fluorene epoxy compound (product of Osaka G as Chemicals Co., Ltd., ONCOAT EX-1020, the epoxy equivalent: 296) 35 g, and a phenylsilicone oligomer (product of KONISHI CHEMICAL IND CO., LTD., PPSQ-E, the number average molecular weight: 850) 10 g were homogeneously mixed at 100° C. to obtain a resin composition for Example 1-18. The yield was 100 g.

Synthesis Example 1-19

A bisphenol A epoxy resin (product of Japan Epoxy Resins Co., Ltd., 828EL, the epoxy equivalent: 188, a liquid epoxy resin) 55 g and a bisphenol A epoxy resin (product of Japan Epoxy Resins Co., Ltd., JER1007, the epoxy equivalent: 1998, a solid epoxy resin) 20 g were each weighed, and homogeneously mixed at 150° C. Therewith, an alicyclic epoxy resin (product of DAICEL CHEMICAL INDUSTRIES., LTD., CELLOXIDE 2021P, the epoxy equivalent: 130) 10 g, an oxetane compound (product of UBE INDUSTRIES, LTD., ETERNACOLL (R), OXBP) 5 g, and a phenylsilicone oligomer (product of KONISHI CHEMICAL IND CO., LTD., PPSQ-E, the number average molecular weight: 850) 10 g were homogeneously mixed at 80° C. to obtain a resin composition for Example 1-19. The yield was 100 g.

Synthesis Example 1-20

A bisphenol A epoxy resin (product of Japan Epoxy Resins Co., Ltd., 828EL, the epoxy equivalent: 188, a liquid epoxy resin) 25 g and a bisphenol A epoxy resin (product of Japan Epoxy Resins Co., Ltd., JER1007, the epoxy equivalent: 1998, a solid hydrogenated epoxy resin) 10 g were each weighed, and homogeneously mixed at 150° C. Therewith, an alicyclic epoxy resin (product of DAICEL CHEMICAL INDUSTRIES., LTD., CELLOXIDE 2021P, the epoxy equivalent: 130) 25 g, a fluorene epoxy compound (product of Osaka G as Chemicals Co., Ltd., OGSOL EG-210, the epoxy equivalent: 340) 30 g, and a phenylsilicone oligomer (product of KONISHI CHEMICAL IND CO., LTD., PPSQ-E, the number average molecular weight: 850) 10 g were homogeneously mixed at 100° C. to obtain a resin composition for Example 1-20. The yield was 100 g.

Synthesis Example 1-21

A hydrogenated bisphenol A epoxy resin (product of Japan Epoxy Resins Co., Ltd., YL-7170, the epoxy equivalent: 1000, a solid hydrogenated epoxy resin) 10 g, a bisphenol A epoxy resin (product of Japan Epoxy Resins Co., Ltd., 828EL, the epoxy equivalent: 188, a liquid epoxy resin) 60 g, and a bisphenol A epoxy resin (product of Japan Epoxy Resins Co., Ltd., JER1007, the epoxy equivalent: 1998, a solid epoxy resin) 15 g were each weighed, and homogeneously mixed at 150° C. Therewith, an alicyclic epoxy resin (product of DAICEL CHEMICAL INDUSTRIES., LTD., CELLOXIDE 2021P, the epoxy equivalent: 130) 10 g and a phenylsilicone oligomer (product of KONISHI CHEMICAL IND CO., LTD., PPSQ-E, the number average molecular weight: 850) 5 g were homogeneously mixed at 100° C. to obtain a resin composition for Example 1-21. The yield was 100 g.

Synthesis Example 1-22

An alicyclic epoxy resin (product of DAICEL CHEMICAL INDUSTRIES., LTD., CELLOXIDE 2021P, the epoxy equivalent: 130) 25 g, an alicyclic epoxy resin (product of DAICEL CHEMICAL INDUSTRIES., LTD., EHPE-3150, the epoxy equivalent: 177) 15 g, a fluorene epoxy compound (product of Osaka G as Chemicals Co., Ltd., OGSOL EG-210, the epoxy equivalent: 340) 50 g, and a phenylsilicone oligomer (product of KONISHI CHEMICAL IND CO., LTD., PPSQ-E, the number average molecular weight: 850) 10 g were homogeneously mixed at 100° C. to obtain a resin composition for Example 1-22. The yield was 100 g.

Synthesis Example 1-23

An alicyclic epoxy resin (product of DAICEL CHEMICAL INDUSTRIES., LTD., CELLOXIDE 2021P, the epoxy equivalent: 130) 20 g, an alicyclic epoxy resin (product of DAICEL CHEMICAL INDUSTRIES., LTD., EHPE-3150, the epoxy equivalent: 177) 10 g, a brominated epoxy compound (product of Japan Epoxy Resins Co., Ltd., JER5050, the epoxy equivalent: 395) 60 g, a phenylsilicone oligomer (product of KONISHI CHEMICAL IND CO., LTD., PPSQ-E, the number average molecular weight: 850) 8 g, and a methylphenylsilicone oligomer (product of KONISHI CHEMICAL IND CO., LTD., PMPSQ-E, the number average molecular weight: 1100) 2 g were homogeneously mixed at 100° C. to obtain a resin composition for Example 1-23. The yield was 100 g.

Synthesis Example 1-24

An alicyclic epoxy resin (product of DAICEL CHEMICAL INDUSTRIES., LTD., CELLOXIDE 2021P, the epoxy equivalent: 130) 25 g, an alicyclic epoxy resin (product of DAICEL CHEMICAL INDUSTRIES., LTD., EHPE-3150, the epoxy equivalent: 177) 15 g, a brominated epoxy compound (product of Japan Epoxy Resins Co., Ltd., JER5050, the epoxy equivalent: 395) 15 g, a fluorene epoxy compound (product of Osaka G as Chemicals Co., Ltd., OGSOL EG-210, the epoxy equivalent: 340) 40 g, and a phenylsilicone oligomer (product of KONISHI CHEMICAL IND CO., LTD., PPSQ-E, the number average molecular weight: 850) 5 g were homogeneously mixed at 100° C. to obtain a resin composition for Example 1-24. The yield was 100 g.

Synthesis Example 1-25

A bisphenol A epoxy resin (product of Japan Epoxy Resins Co., Ltd., 828EL, the epoxy equivalent: 188, a liquid epoxy resin) 25 g and a bisphenol A epoxy resin (product of Japan Epoxy Resins Co., Ltd., JER1007, the epoxy equivalent: 1998, a solid epoxy resin) 10 g were each weighed, and homogeneously mixed with each other at 150° C. Therewith, an alicyclic epoxy resin (product of DAICEL CHEMICAL INDUSTRIES., LTD. CELLOXIDE 2021P, the epoxy equivalent: 130) 25 g, a phenol novolac epoxy resin (product of Japan Epoxy Resins Co., Ltd., JER152, the epoxy equivalent: 175, a polyfunctional epoxy resin) 30 g, a phenylsilicone oligomer (product of KONISHI CHEMICAL IND CO., LTD., PPSQ-E, the number average molecular weight: 850) 9 g, and a methylsilicone oligomer (product of KONISHI CHEMICAL IND CO., LTD., PMSQ-E, the number average molecular weight: 1800) 1 g were homogeneously mixed at 100° C. to obtain a resin composition for Example 1-25. The yield was 100 g.

Synthesis Example 1-26

YX-8000/SiO$_2$ (Silicone Oligomer PPSQ-E)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 22.8 g and a silicon (product of KONISHI CHEMICAL IND CO., LTD., PPSQ-E, the number average molecular weight: 850) 9.8 g were homogeneously mixed to obtain a resin composition for Example 1-26. The resin composition had a yield of 32.6 g and a viscosity of 3 Pa·s. The unsaturated bond amount measured by NMR was 18% by weight.

Synthesis Example 1-27

YX-8000=100 (% by Weight)

A hydrogenated bisphenol A (product of Japan Epoxy Resins Co., Ltd. EPICOAT, YX-8000, the epoxy equivalent: 205, a liquid hydrogenated epoxy resin) was used as a resin composition for Comparative Example 1-1.

Synthesis Example 1-28

YL-7170=100 (% by Weight)

A hydrogenated bisphenol (product of Japan Epoxy Resins Co., Ltd., YL-7170, the epoxy equivalent: 1000, a solid hydrogenated epoxy resin) 53.7 g, and isopropanol 36.7 g were mixed at 80° C. to obtain a resin composition for Comparative Example 1-2.

Synthesis Example 1-29

828EL=100 (% by Weight)

A bisphenol A (product of Japan Epoxy Resins Co., Ltd., EPICOAT 828EL, the epoxy equivalent: 184 to 194) was used as a resin composition for Comparative Example 1-3.

Synthesis Example 1-30

YX-8000/SiO$_2$(MEK-ST)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 168 g and an organosilica sol (product of NISSAN CHEMICAL INDUSTRIES., LTD., MEK-ST, the particle diameter: 10 to 15 nm, the solid content: 30%) 240 g were homogeneously mixed. The solvent was subjected to vacuum distillation at 80° C. using an evaporator. The resin composition had a yield of 249.7 g and a viscosity of 40 Pa·s.

Synthesis Example 1-31

YX-8000/SiO$_2$(MEK-ST)=90/10 (% by Weight)

The resin composition, which was obtained in Synthesis Example 1-30, 93.6 g and YX-8000, 10 g were each weighed and homogeneously mixed at 50° C. to obtain a resin composition for Example 1-27. The resin composition had a yield of 103.6 g and a viscosity of 1 Pa·s.

Synthesis Example 1-32

YX-8000/SiO$_2$(MEK-ST)=60/40 (% by Weight)

A hydrogenated bisphenol A (product of Japan Epoxy Resins Co., Ltd., EPICOAT YX-8000, the epoxy equivalent: 205, a liquid hydrogenated epoxy resin) 27 g and an organosilica sol (product of NISSAN CHEMICAL INDUSTRIES., LTD., MEK-ST, the particle diameter: 10 to 15 nm, the solid content: 30%) 60 g were homogeneously mixed. The solvent was subjected to vacuum distillation at 80° C. using an evaporator. As a result, a resin composition for Example 1-27 was obtained. The resin composition had a yield of 47.32 g and a viscosity of 880 Pa·s.

Synthesis Example 1-33

YX-8000/YL-7170/SiO$_2$ (MEK-ST)=65/25/10 (% by Weight)

The resin composition, which was obtained in Synthesis Example 1-30, 34.7 g, a hydrogenated bisphenol (product of Japan Epoxy Resins Co., Ltd., YL-7170, the epoxy equivalent: 1000, a solid hydrogenated epoxy resin) 25 g, and YX-8000, 41.6 g were each weighed and homogeneously mixed at 80° C. to obtain a resin composition for Example 1-29. The resin composition had a yield of 101.3 g and a viscosity of 130 Pa·s.

Examples 1-1 to 1-29 and Comparative Examples 1-1 to 1-3

Preparation of Curable Resin Composition

To the above-mentioned resin compositions (Examples 1-1 to 1-25), stearic acid as a demolding agent was added to have a concentration in Table 1 relative to the total weight, and the mixture was homogeneously mixed at 80° C. The mixture was cooled to 50° C., and thereto a thermal-latent cation generator (cationic polymerization initiator) (product of SANSHIN CHEMICAL INDUSTRY CO., LTD., San-Aid SI-80L, the solid content: 50%) was added to have a concentration shown in Table 1 relative to the total weight.

To the above-mentioned resin compositions (Comparative Examples 1-1 to 1-3, and Examples 1-26 to 1-29), stearic acid as a demolding agent was added to account for 0.5% by weight relative to the total weight and the mixture was homogeneously mixed at 80° C. The mixture was cooled to 50° C. Thereto, a cationic polymerization initiator (product of SANSHIN CHEMICAL INDUSTRY CO., LTD., San-Aid SI-80L) was added to account for 1% by weight (0.5% by weight on the solid content equivalent basis) relative to the total weight, and the mixture was homogeneously mixed.

(Molded Product)

The resin composition was subjected to vacuum degassing treatment, if necessary, by heating (at 50° C. and the like). Then, the resin composition was cured at 150° C. for 2 hour, while vacuum treatment is performed if the existence of the solvent caused bubbles. As a result, films each having a thickness of 500 micrometers were obtained in Examples 1-1 to 1-25, and films each having a thickness in Table were obtained in Examples 1-26 to 1-29 and Comparative Examples 1-1 to 1-3.

The obtained resin compositions and the molded products were evaluated for the following physical properties. Tables 1 to 3 show the results.

"Evaluation of Transparency (Haze, Transmittance)"

Haze: The haze was evaluated using a turbidimeter (product of Nippon Denshoku, NDH 2000).

(Cured product): The above-mentioned molded products and films were evaluated for haze.

Transmittance: The cured products were evaluated for transmittance at a wavelength of 500 nm using an absorption spectrometer (product of Shimazu Corporation, spectrophotometer UV-3100).

(Cured product): The above-mentioned molded products and films were evaluated for transmittance. In Examples 1-7, 1-10, 1-20, and 1-24, the films after being maintained in a drier at 260° C. for 5 minutes were also evaluated for transmittance.

"Viscosity"

The resin compositions before addition of the demolding agent and the curing agent were evaluated for viscosity at 40° C. and at a rotation speed D of 1/s using an R/S Rheometer (product of Brookfield). A measuring jig RC 25-1 was used for measuring the viscosity of 20 Pa·s or more and a measuring jig RC 50-1 was used for measuring the viscosity of less than 20 Pa·s. The resin composition whose viscosity at D of 1/s could not be measured was evaluated by extrapolating a value at D of 5 to 100/s.

"Evaluation of Refractive Index and Abbe Number"

The refractive index and Abbe number were evaluated at 20° C. using a refractometer (product of ATAGO CO., LTD., DR-M2). (Cured product): The above-mentioned molded products and films were evaluated for refractive index and Abbe number

TABLE 1

| Sample | Organic resin component content (%) | | | | | | | | | | | |
|---|---|---|---|---|---|---|---|---|---|---|---|---|
| | YX-8000 | YL-7170 | 828EL | JER 1007 | JER 5050 | 2021P | CELLOXIDE 2081 | EHPE-3150 | ONCOAT 1020 | OGSOL EG210 | JER 152 | OXBP |
| Example 1-1 | 60 | 35 | — | — | — | — | — | — | — | — | — | — |
| Example 1-2 | 91 | — | — | — | — | — | — | — | — | — | — | — |
| Example 1-3 | 91 | — | — | — | — | — | — | — | — | — | — | — |
| Example 1-4 | 65 | 25 | — | — | — | — | — | — | — | — | — | — |
| Example 1-5 | 55.5 | 30 | — | — | — | 10 | — | — | — | — | — | — |
| Example 1-6 | 68 | 22 | — | — | — | — | — | — | — | — | — | — |
| Example 1-7 | 53 | 17 | — | — | — | — | — | — | — | — | — | — |
| Example 1-8 | 55 | 30 | — | — | — | 5 | — | — | — | — | — | — |
| Example 1-9 | 65 | 25 | — | — | — | — | — | — | — | — | — | — |
| Example 1-10 | 65 | 15 | — | — | — | 10 | — | — | — | — | — | — |
| Example 1-11 | — | 50 | — | — | — | 45 | — | — | — | — | — | — |
| Example 1-12 | 55 | 15 | — | — | — | — | — | 20 | — | — | — | — |
| Example 1-13 | 20 | 10 | — | — | — | 40 | — | 20 | — | — | — | — |
| Example 1-14 | 55 | 15 | — | — | — | — | 20 | — | — | — | — | — |
| Example 1-15 | — | — | 60 | 20 | — | 10 | — | — | — | — | — | — |
| Example 1-16 | — | — | 60 | 20 | — | 10 | — | — | — | — | — | — |
| Example 1-17 | — | — | 60 | 20 | — | 10 | — | — | — | — | — | — |
| Example 1-18 | — | — | 20 | 10 | — | 25 | — | — | 35 | — | — | — |
| Example 1-19 | — | — | 55 | 20 | — | 10 | — | — | — | — | — | 5 |
| Example 1-20 | — | — | 25 | 10 | — | 25 | — | — | — | 30 | — | — |
| Example 1-21 | — | 10 | 60 | 15 | — | 10 | — | — | — | — | — | — |
| Example 1-22 | — | — | — | — | — | 25 | — | 15 | — | 50 | — | — |
| Example 1-23 | — | — | — | — | 60 | 20 | — | 10 | — | — | — | — |
| Example 1-24 | — | — | — | — | 15 | 25 | — | 15 | — | 40 | — | — |
| Example 1-25 | — | — | 25 | 10 | — | 25 | — | — | — | — | 30 | — |

| Sample | Metalloxane component content (%) | | | Demolding agent | Thermal-latent cation generator |
|---|---|---|---|---|---|
| | PPSQ-E | PMPSQ-E | PMSQ-E | Stearic acid (%) | SI-80L (%) |
| Example 1-1 | — | — | 5 | 0.5 | 1.0 |
| Example 1-2 | — | — | 9 | 0.5 | 1.0 |
| Example 1-3 | — | 9 | — | 0.5 | 1.0 |
| Example 1-4 | — | — | 10 | 0.5 | 1.0 |
| Example 1-5 | — | — | 4.5 | 0.5 | 1.0 |
| Example 1-6 | 10 | — | — | 0.5 | 1.0 |
| Example 1-7 | — | — | 30 | 0.5 | 1.0 |
| Example 1-8 | — | 10 | — | 0.5 | 1.0 |
| Example 1-9 | 3 | — | 7 | 1.0 | 1.0 |
| Example 1-10 | 3 | — | 7 | 0.5 | 0.2 |
| Example 1-11 | — | — | 5 | 0.5 | 1.0 |
| Example 1-12 | 3 | — | 7 | 0.5 | 0.2 |
| Example 1-13 | 3 | — | 7 | 0.5 | 0.2 |
| Example 1-14 | 3 | — | 7 | 0.5 | 0.2 |
| Example 1-15 | 10 | — | — | 0.5 | 1.0 |
| Example 1-16 | 10 | — | — | 0.5 | 3.0 |
| Example 1-17 | 10 | — | — | 0.5 | 5.0 |
| Example 1-18 | 10 | — | — | 0.5 | 1.0 |
| Example 1-19 | 10 | — | — | 0.5 | 1.0 |
| Example 1-20 | 10 | — | — | 0.5 | 0.2 |
| Example 1-21 | 5 | — | — | 0.5 | 1.0 |
| Example 1-22 | 10 | — | — | 0.5 | 0.4 |
| Example 1-23 | 8 | 2 | — | 0.5 | 0.4 |
| Example 1-24 | 5 | — | — | 0.5 | 0.4 |
| Example 1-25 | 9 | — | 1 | 0.5 | 0.6 |

TABLE 2

| | Refractive index | | | Abbe number | Viscosity (Pa·s at 1D (1/s)) | Transmittance (%) (500 nm) Immediately after molding (blank) | 260° C. 5 min |
|---|---|---|---|---|---|---|---|
| | 486 nm | 589 nm | 656 nm | | | | |
| Example 1-1 | 1.5181 | 1.5116 | 1.5098 | 61.6 | 40 | 91.9 | — |
| Example 1-2 | 1.5130 | 1.5067 | 1.5040 | 56.3 | 2 | 92.1 | — |
| Example 1-3 | 1.5175 | 1.5109 | 1.5084 | 56.1 | 2 | 91.8 | — |
| Example 1-4 | 1.5127 | 1.5064 | 1.5040 | 58.2 | 23 | 91.6 | — |
| Example 1-5 | 1.5156 | 1.5089 | 1.5065 | 55.9 | 18 | 91.5 | — |
| Example 1-6 | 1.5243 | 1.5171 | 1.5146 | 53.3 | 3 | 92.3 | — |
| Example 1-7 | 1.4960 | 1.4898 | 1.4878 | 59.7 | 61 | 91.0 | 75.1 |
| Example 1-8 | 1.5185 | 1.5118 | 1.5092 | 55.0 | 32 | 92.1 | — |
| Example 1-9 | 1.5169 | 1.5104 | 1.5079 | 56.7 | 19 | 91.6 | — |
| Example 1-10 | 1.5171 | 1.5107 | 1.5082 | 57.4 | 5 | 93.0 | 92.8 |
| Example 1-11 | 1.5176 | 1.5109 | 1.5084 | 55.5 | 49 | 92.2 | — |
| Example 1-12 | 1.5178 | 1.5110 | 1.5085 | 54.9 | 67 | 92.4 | — |
| Example 1-13 | 1.5179 | 1.5111 | 1.5084 | 53.8 | 4 | 93.1 | — |
| Example 1-14 | 1.5180 | 1.5112 | 1.5086 | 54.4 | 4 | 92.1 | — |
| Example 1-15 | 1.5943 | 1.5816 | 1.5766 | 32.9 | 127 | 90.2 | — |
| Example 1-16 | 1.5935 | 1.5806 | 1.5753 | 31.9 | 103 | 89.9 | — |
| Example 1-17 | 1.5938 | 1.5804 | 1.5761 | 32.8 | 74 | 89.7 | — |
| Example 1-18 | 1.5961 | 1.5836 | 1.5781 | 32.4 | 47 | 90.7 | — |
| Example 1-19 | 1.5951 | 1.5823 | 1.5778 | 33.7 | 93 | 90.3 | — |
| Example 1-20 | 1.5927 | 1.5793 | 1.5748 | 32.4 | 66 | 92.7 | 90.7 |
| Example 1-21 | 1.5878 | 1.5762 | 1.5709 | 34.1 | 86 | 90.1 | — |
| Example 1-22 | 1.5892 | 1.5769 | 1.5719 | 33.3 | 220 | 91.8 | — |
| Example 1-23 | 1.5915 | 1.5804 | 1.5756 | 36.5 | 290 | 92.1 | — |
| Example 1-24 | 1.5914 | 1.5790 | 1.5741 | 33.5 | 156 | 92.3 | 88.7 |
| Example 1-25 | 1.5882 | 1.5754 | 1.5718 | 35.1 | 9 | 91.7 | — |

TABLE 3

| Sample | Molded state | YX8000 content (% by weight) | YL7170 content (% by weight) | 828EL content (% by weight) | Starting material silica | Silica content (% by weight) | Refractive index (486 nm) | Refractive index (589 nm) | Refractive index (656 nm) |
|---|---|---|---|---|---|---|---|---|---|
| Example 1-26 | 1 mm plate | 70 | 0 | 0 | Phenyl silicone oligomer PPSQ-E | 30 | 1.5393 | 1.531 | 1.5274 |
| Comparative Example 1-1 | 1 mm plate | 100 | 0 | 0 | — | 0 | 1.5201 | 1.5127 | 1.5105 |
| Comparative Example 1-2 | 70 μm film | 0 | 100 | 0 | — | 0 | 1.5200 | 1.5174 | 1.5101 |
| Comparative Example 1-3 | 1 mm plate | 0 | 0 | 100 | — | 0 | 1.6022 | 1.5890 | 1.5839 |
| Example 1-27 | 1 mm plate | 90 | 0 | 0 | MEK-ST | 10 | 1.5170 | 1.5106 | 1.5082 |
| Example 1-28 | 1 mm plate | 60 | 0 | 0 | MEK-ST | 40 | 1.5049 | 1.4991 | 1.4966 |
| Example 1-29 | 1 mm plate | 65 | 25 | 0 | MEK-ST | 10 | 1.5164 | 1.5101 | 1.5077 |

| Sample | Abbe number Organic resin component | Abbe number Organic-inorganic composite resin composition | Viscosity (Pa·s at 1D (1/s)) | Transmittance (%) (500 nm) | Haze (%) |
|---|---|---|---|---|---|
| Example 1-26 | 53.4 | 44.6 | 3 | 90.3 | 1.1 |
| Comparative Example 1-1 | 53.4 | 53.4 | 0.5 | 89.1 | 0.8 |
| Comparative Example 1-2 | 52.3 | 52.3 | 2 | 92.5 | 0.2 |
| Comparative Example 1-3 | 32.2 | 32.2 | 2 | 88.9 | 0.9 |
| Example 1-27 | 53.4 | 58 | 1 | 88.7 | 0.9 |

TABLE 3-continued

| | | | | | |
|---|---|---|---|---|---|
| Example 1-28 | 53.4 | 60.1 | 880 | 71.1 | 3 |
| Example 1-29 | 53.1 | 58.6 | 130 | 83.9 | 1.3 |

Synthesis Example 2-1

YX-8000/SiO$_2$(MEK-ST)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 168 g and an organosilica sol (product of NISSAN CHEMICAL INDUSTRIES., LTD., MEK-ST, the particle diameter: 10 to 15 nm, the solid content: 30%) 240 g were homogeneously mixed. The solvent was subjected to vacuum distillation at 80° C. using an evaporator. The resin composition had a yield of 249.7 g and a viscosity of 40 Pa·s. (Resin composition for Example 2-4)

Synthesis Example 2-2

YX-8000/SiO$_2$(MEK-ST)=60/40 (% by Weight)

A hydrogenated bisphenol A (product of Japan Epoxy Resins Co., Ltd., EPICOAT YX-8000, the epoxy equivalent: 205, a liquid hydrogenated epoxy resin) 27 g and an organosilica sol (product of NISSAN CHEMICAL INDUSTRIES., LTD., MEK-ST, the particle diameter: 10 to 15 nm, the solid content: 30%) 60 g were homogeneously mixed. The solvent was subjected to vacuum distillation at 80° C. using an evaporator. The resin composition had a yield of 47.32 g and a viscosity of 880 Pa·s. (Resin composition for Example 2-5)

Synthesis Example 2-3

YX-8000/SiO$_2$(MEK-ST)=90/10 (% by Weight)

The resin composition for Example 2-4, 93.6 g and YX-8000, 10 g were each weighed and homogeneously mixed at 50° C. The resin composition had a yield of 103.6 g and a viscosity of 1 Pa·s (resin composition for Example 2-1).

Synthesis Example 2-4

YX-8000/SiO$_2$(MEK-ST)=85/15 (% by Weight)

The resin composition for Example 2-4, 88.4 g and YX-8000, 15 g were each weighed and homogeneously mixed at 50° C. The resin composition had a yield of 103.4 g and a viscosity of 2 Pa·s (resin composition for Examples 2-2 and 2-7).

Synthesis Example 2-5

YX-8000/SiO$_2$(MEK-ST)=80/20 (% by Weight)

The resin composition for Example 2-4, 83.2 g and YX-8000, 20 g, were each weighed and homogenously mixed at 50° C. The resin composition had a yield of 103.2 g and a viscosity of 4 Pa·s (resin composition for Example 2-3).

Synthesis Example 2-6

YX-8000/YL-7170/SiO$_2$(MEK-ST)=65/25/10 (% by Weight)

The resin composition for Example 2-4, 34.7 g and a hydrogenated bisphenol (product of Japan Epoxy Resins Co., Ltd., YL-7170, the epoxy equivalent: 1000, a solid hydrogenated epoxy resin) 25 g, and YX-8000, 41.6 g were each weighed and homogeneously mixed at 80° C. The resin composition had a yield of 101.3 g and a viscosity of 130 Pa·s (resin composition for Example 2-6).

Synthesis Example 2-7

YX-8000/SiO$_2$ (Methanol Silica Sol)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 20.2 g and an organosilica sol (product of NISSAN CHEMICAL INDUSTRIES., LTD., a methanol silica sol, the particle diameter: 10 to 15 nm, the solid content: 30%) 28.8 g were homogeneously mixed. The solvent was subjected to vacuum distillation at 80° C. using an evaporator. The resin composition had a yield of 37.5 g and a viscosity of 0.3 Pa·s (resin composition for Example 2-8).

Synthesis Example 2-8

YX-8000/SiO$_2$(Silicone Oligomer PPSQ-E)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 22.8 g and silicon (product of KONISHI CHEMICAL IND CO., LTD., PPSQ-E, the number average molecular weight: 850) 9.8 g were homogeneously mixed. The resin composition had a yield of 32.6 g and a viscosity of 3 Pa·s. The unsaturated bond amount measured by NMR was 18% by weight (resin composition for Example 2-13).

Synthesis Example 2-9

828EL/SiO$_2$(MEK-ST)=70/30 (% by Weight)

A bisphenol A (product of Japan Epoxy Resins Co., Ltd., EPICOAT 828EL, the epoxy equivalent: 184 to 194) 42.1 g and an organosilica sol (product of NISSAN CHEMICAL INDUSTRIES., LTD., MEK-ST, the particle diameter: 10 to 15 nm, the solid content of 30%) 60.1 g were homogeneously mixed. The solvent was subjected to vacuum distillation at 80° C. using an evaporator. The resin composition had a yield of 70.9 and a viscosity of 30 Pa·s. The unsaturated bond amount measured by NMR was 28% by weight (resin composition for Comparative Example 2-3).

Synthesis Example 2-10

YX-8000/SiO$_2$(Vapor Phase Synthesis Silica Fine Particles AEROSIL300)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 42.5 g, dry silica fine particles (product of Japan Aerogil Co., Ltd., AEROSIL 300, the primary particle diameter: 7 nm) 7.5 g, and isopropanol 70 g were homogeneously mixed. The solvent was subjected to vacuum distillation at 80° C. using an evaporator. The resin composition had a yield of 57.1 g and a viscosity of 0.5 Pa·s (resin composition for Example 2-12).

Synthesis Example 2-11

YL-7170=100 (% by Weight)

A hydrogenated bisphenol (product of Japan Epoxy Resins Co., Ltd., YL-7170, the epoxy equivalent: 1000, a solid hydrogenated epoxy resin) 53.7 g and isopropanol 36.7 g were mixed at 80° C. to obtain a rein composition (resin composition for Comparative Example 2-4).

Synthesis Example 2-12

A hydrogenated bisphenol A (product of Japan Epoxy Resins Co., Ltd., EPICOAT YX-8000, the epoxy equivalent: 205, a liquid hydrogenated epoxy resin) 33.7 g, a bisphenol A (product of Japan Epoxy Resins Co., Ltd., EPICOAT 828EL, the epoxy equivalent: 184 to 194) 8.4 g, and an organosilica sol (product of NISSAN CHEMICAL INDUSTRIES., LTD., MEK-ST, the particle diameter: 10 to 15 nm, the solid content: 30%) 60.1 g were homogeneously mixed. The solvent was subjected to vacuum distillation at 80° C. using an evaporator. The resin composition had a yield of 64.0 g and a viscosity of 4 Pa·s. The unsaturated bond amount measured by NMR was 6% by weight (resin composition for Example 2-9).

Synthesis Example 2-13

A hydrogenated bisphenol A (product of Japan Epoxy Resins Co., Ltd., EPICOAT YX-8000, the epoxy equivalent: 205, a liquid hydrogenated epoxy resin) 16.1 g, a bisphenol A (product of Japan Epoxy Resins Co., Ltd., EPICOAT 828EL, the epoxy equivalent: 184 to 194) 5.6 g, and an organosilica sol (product of NISSAN CHEMICAL INDUSTRIES., LTD., MEK-ST, the particle diameter: 10 to 15 nm, the solid content: 30%) 31.0 g were homogeneously mixed. The solvent was subjected to vacuum distillation at 80° C. using an evaporator. The resin composition had a yield of 32.8 g and a viscosity of 60 Pa·s. The unsaturated bond amount measured by NMR was 8% by weight (resin composition for Example 2-10).

Synthesis Example 2-14

A hydrogenated bisphenol A (product of Japan Epoxy Resins Co., Ltd., EPICOAT YX-8000, the epoxy equivalent: 205, a liquid hydrogenated epoxy resin) 18.4 g, a bisphenol A (product of Japan Epoxy Resins Co., Ltd., EPICOAT 828EL, the epoxy equivalent: 184 to 194) 9.6 g, and an organosilica sol (product of NISSAN CHEMICAL INDUSTRIES., LTD., MEK-ST, the particle diameter: 10 to 15 nm, the solid content: 30%) 40.0 g were homogeneously mixed. The solvent was subjected to vacuum distillation at 80° C. using an evaporator. The resin composition had a yield of 42.2 g and a viscosity of 220 Pa·s. The unsaturated bond amount measured by NMR was 11% by weight (resin composition for Example 2-14).

Synthesis Example 2-15

YX-8000=100 (% by Weight)

A hydrogenated bisphenol A (product of Japan Epoxy Resins Co., Ltd., EPICOAT YX-8000, the epoxy equivalent: 205, a liquid hydrogenated epoxy resin) was used as a resin composition (resin composition for Comparative Example 2-1).

Synthesis Example 2-16

828EL=100 (% by Weight)

A bisphenol A (product of Japan Epoxy Resins Co., Ltd., EPICOAT 828EL, the epoxy equivalent: 184 to 194) was used as a resin composition (resin composition for Comparative Example 2-2).

Synthesis Example 2-17

YX-8000/828EL=80/20 (% by Weight)

A hydrogenated bisphenol A (product of Japan Epoxy Resins Co., Ltd., EPICOAT YX-8000, the epoxy equivalent: 205, a liquid hydrogenated epoxy resin) 80 g and a bisphenol A (product of Japan Epoxy Resins Co., Ltd., EPICOAT 828EL, the epoxy equivalent: 184 to 194) 20 g were homogeneously mixed (resin composition for Comparative Example 2-5).

Synthesis Example 2-18

YX-8000/828EL=74/26 (% by Weight)

A hydrogenated bisphenol A (product of Japan Epoxy Resins Co., Ltd., EPICOAT YX-8000, the epoxy equivalent: 205, a liquid hydrogenated epoxy resin) 74 g and a bisphenol A (product of Japan Epoxy Resins Co., Ltd., EPICOAT 828EL, the epoxy equivalent: 184 to 194) 26 g were homogeneously mixed (resin composition for Comparative Example 2-6).

Synthesis Example 2-19

YX-8000/828EL=65/35 (% by Weight)

A hydrogenated bisphenol A (product of Japan Epoxy Resins Co., Ltd., EPICOAT YX-8000, the epoxy equivalent: 205, a liquid hydrogenated epoxy resin) 65 g and a bisphenol A (product of Japan Epoxy Resins Co., Ltd., EPICOAT 828EL, the epoxy equivalent: 184 to 194) 35 g were homogeneously mixed (resin composition for Comparative Example 2-7).

Synthesis Example 2-20

(ACRYPET MD/SiO$_2$) (MEK-ST)=70/30 (% by Weight)

A methacrylic resin (product of Mitsubishi Rayon Co., Ltd., ACRYPET MD) 45.9 g and an organosilica sol (product of NISSAN CHEMICAL INDUSTRIES., LTD., MEK-ST, the particle diameter: 10 to 15 nm, the solid content: 30%) 66.8 g were homogeneously mixed to obtain a resin composition (resin composition for Example 2-11).

Synthesis Example 2-21

ACRYPET MD=100 (% by Weight)

A methacrylic resin (product of Mitsubishi Rayon Co., Ltd., ACRYPET MD) 43.2 g and methyl ethyl ketone (MEK) 100.1 g were homogeneously mixed to obtain a resin composition (resin composition for Comparative Example 2-8).
Preparation of Curable Resin Composition To the above-mentioned resin compositions in Synthesis Examples 2-1 to 2-21, stearic acid as a demolding agent was added to account for 0.5% by weight relative to the total weight. The mixture was homogeneously mixed at 80° C. The mixture was cooled to 50° C., and then thereto a cationic polymerization initiator (product of SANSHIN CHEMICAL INDUSTRY CO., LTD., San-Aid SI-80L, the solid content: 50%) was added to account for 1% by weight (0.5% by weight on the solid content equivalent basis) relative to the total weight, and the mixture was homogeneously mixed.
(Molded Product)

The resin composition was subjected to vacuum degassing treatment, if necessary, by heating (at 50° C. and the like). Then, a film of the resin composition was formed by a squeegee method and cured at 110° C. for 5 hour, while vacuum treatment was performed if the existence of the solvent caused bubbles. As a result, a cast plate with a thickness of 1 mm was obtained.

The resin composition was subjected to vacuum degassing treatment, if necessary, by heating (at 50° C. and the like). Then, the composition was cured at 150° C. for 4 hours while vacuum treatment was performed if the existence of the solvent caused bubbles. A film with a thickness of 40 micrometers was obtained in Example 2-7. A film with a thickness of 80 micrometers was obtained in Example 2-8. A film with a thickness of 35 micrometers was obtained in Example 2-11. A film with a thickness of 260 micrometers was obtained in Example 2-12. A film with a thickness of 70 micrometers was obtained in Comparative Example 2-4. A film with a thickness of 30 micrometers was obtained in Comparative Example 2-8.

The obtained resin compositions and molded products were measured for the following physical properties. Tables 4 and 5 show the results.
"Evaluation of Transparency (Haze and Transmittance"
Haze: The haze was evaluated using a turbidimeter (product of Nippon Denshoku, NDH 2000).
(Cured product): The above-mentioned molded products and films were evaluated for haze.
Transmittance: The cured products were evaluated for transmittance at a wavelength of 500 nm using an absorption spectrometer (product of Shimazu Corporation, spectrophotometer UV-3100).
(Cured product): The above-mentioned molded products and films were evaluated for transmittance.
"Viscosity"

The resin compositions before addition of the demolding agent and the curing agent were evaluated for viscosity at 40° C. and at a rotation speed D of 1/s using an R/S Rheometer (product of Brookfield). A measuring jig RC 25-1 was used for measuring the viscosity of 20 Pa·s or more and a measuring jig RC 50-1 was used for measuring the viscosity of less than 20 Pa·s. The resin composition whose viscosity at D of 1/s could not be measured was evaluated by extrapolating a value at D of 5 to 100/s.
"Evaluation of Refractive Index and Abbe Number"

The refractive index and Abbe number were evaluated at 20° C. using a refractometer (product of ATAGO CO., LTD., DR-M2). (Cured product): The above-mentioned molded products and films were evaluated for refractive index and Abbe number.

TABLE 4

| Sample | Molded state | YX8000 content (% by weight) | YL7170 content (% by weight) | 828EL content (% by weight) | ACRYPET MD content (% by weight) | Starting material silica | Silica content (% by weight) | Refractive index (486 nm) |
|---|---|---|---|---|---|---|---|---|
| Example 2-1 | 1 mm plate | 90 | 0 | 0 | 0 | MEK-ST | 10 | 1.5170 |
| Example 2-2 | 1 mm plate | 85 | 0 | 0 | 0 | MEK-ST | 15 | 1.5151 |
| Example 2-3 | 1 mm plate | 80 | 0 | 0 | 0 | MEK-ST | 20 | 1.5121 |
| Example 2-4 | 1 mm plate | 70 | 0 | 0 | 0 | MEK-ST | 30 | 1.5091 |
| Example 2-5 | 1 mm plate | 60 | 0 | 0 | 0 | MEK-ST | 40 | 1.5049 |
| Example 2-6 | 1 mm plate | 65 | 25 | 0 | 0 | MEK-ST | 10 | 1.5164 |
| Example 2-7 | 40 μm film | 85 | 0 | 0 | 0 | MEK-ST | 15 | 1.5160 |
| Example 2-8 | 80 μm film | 70 | 0 | 0 | 0 | Methanol silica sol | 30 | 1.5155 |
| Example 2-9 | 1 mm plate | 56 | 0 | 14 | 0 | MEK-ST | 30 | 1.5156 |
| Example 2-10 | 1 mm plate | 52 | 0 | 18 | 0 | MEK-ST | 30 | 1.5158 |
| Example 2-11 | 35 mm film | 0 | 0 | 0 | 70 | MEK-ST | 30 | 1.4954 |

TABLE 4-continued

| Sample | Refractive index (589 nm) | Refractive index (656 nm) | Abbe number Organic resin component | Abbe number Organic-inorganic composite resin composition | Viscosity (Pa·s at 1D (1/s)) | Transmittance (%) (500 nm) | Haze (%) |
|---|---|---|---|---|---|---|---|
| Example 2-1 | 1.5106 | 1.5082 | 53.4 | 58.0 | 1 | 88.7 | 0.9 |
| Example 2-2 | 1.5089 | 1.5064 | 53.4 | 58.5 | 2 | 89.1 | 1.1 |
| Example 2-3 | 1.5060 | 1.5035 | 53.4 | 58.8 | 4 | 89.2 | 1.2 |
| Example 2-4 | 1.5030 | 1.5006 | 53.4 | 59.2 | 40 | 82.0 | 1.5 |
| Example 2-5 | 1.4991 | 1.4966 | 53.4 | 60.1 | 880 | 71.1 | 3.0 |
| Example 2-6 | 1.5101 | 1.5077 | 53.1 | 58.6 | 130 | 83.8 | 1.3 |
| Example 2-7 | 1.5092 | 1.5076 | 53.4 | 60.6 | 2 | 92.6 | 0.3 |
| Example 2-8 | 1.5093 | 1.5072 | 53.4 | 61.4 | 0.3 | 86.2 | 0.4 |
| Example 2-9 | 1.5092 | 1.5068 | 49.0 | 57.9 | 4 | 86.1 | 1.1 |
| Example 2-10 | 1.5083 | 1.5064 | 46.8 | 54.1 | 60 | 84.9 | 1.2 |
| Example 2-11 | 1.4886 | 1.4868 | 52.5 | 56.8 | — | 85.7 | 1.3 |

TABLE 5

| Sample | Molded state | YX8000 content (% by weight) | YL7170 content (% by weight) | 828EL content (% by weight) | ACRYPET MD content (% by weight) | Starting material silica | Silica content (% by weight) | Refractive index (486 nm) |
|---|---|---|---|---|---|---|---|---|
| Comparative Example 2-1 | 1 mm plate | 100 | 0 | 0 | 0 | — | 0 | 1.5201 |
| Comparative Example 2-2 | 1 mm plate | 0 | 0 | 100 | 0 | — | 0 | 1.6022 |
| Comparative Example 2-3 | 1 mm plate | 0 | 0 | 70 | 0 | MEK-ST | 30 | 1.5743 |
| Example 2-12 | 260 μm film | 85 | 0 | 0 | 0 | Japan Aerogil | 15 | 1.5131 |
| Comparative Example 2-4 | 70 μm film | 0 | 100 | 0 | 0 | — | 0 | 1.5200 |
| Comparative Example 2-5 | 1 mm plate | 80 | 0 | 20 | 0 | — | 0 | 1.5375 |
| Comparative Example 2-6 | 1 mm plate | 74 | 0 | 26 | 0 | — | 0 | 1.5415 |
| Comparative Example 2-7 | 1 mm plate | 65 | 0 | 35 | 0 | — | 0 | 1.5471 |
| Comparative Example 2-8 | 30 mm film | 0 | 0 | 0 | 100 | — | 0 | 1.5010 |
| Example 2-13 | 1 mm plate | 70 | 0 | 0 | 0 | Phenyl silica PPSQ-E | 30 | 1.5393 |
| Example 2-14 | 1 mm plate | 46 | 0 | 24 | 0 | MEK-ST | 30 | 1.5160 |

| Sample | Refractive index (589 nm) | Refractive index (656 nm) | Abbe number Organic resin component | Abbe number Organic-inorganic composite resin composition | Viscosity (Pa·s at 1D (1/s)) | Transmittance (%) (500 nm) | Haze (%) |
|---|---|---|---|---|---|---|---|
| Comparative Example 2-1 | 1.5127 | 1.5105 | 53.4 | 53.4 | 0.5 | 89.1 | 0.8 |
| Comparative Example 2-2 | 1.5890 | 1.5839 | 32.2 | 32.2 | 2 | 88.9 | 0.9 |
| Comparative Example 2-3 | 1.5626 | 1.5588 | 32.2 | 36.3 | 30 | 68.9 | 7.8 |
| Example 2-12 | 1.5064 | 1.5047 | 53.4 | 60.3 | 0.5 | 3.5 | 80.0 |
| Comparative Example 2-4 | 1.5174 | 1.5101 | 52.3 | 52.3 | 2 | 92.5 | 0.2 |
| Comparative Example 2-5 | 1.5296 | 1.5267 | 49.0 | 49.0 | 0.5 | 89.1 | 0.8 |
| Comparative Example 2-6 | 1.5331 | 1.5301 | 46.8 | 46.8 | 0.6 | 89.0 | 0.8 |

TABLE 5-continued

| | | | | | | | |
|---|---|---|---|---|---|---|---|
| Comparative Example 2-7 | 1.5386 | 1.5351 | 44.9 | 44.9 | 0.7 | 89.0 | 0.9 |
| Comparative Example 2-8 | 1.4931 | 1.4916 | 52.5 | 52.5 | — | 91.3 | 0.3 |
| Example 2-13 | 1.5310 | 1.5274 | 53.4 | 44.6 | 3 | 90.3 | 1.1 |
| Example 2-14 | 1.5074 | 1.5056 | 44.9 | 48.8 | 220 | 82.5 | 1.4 |

In Table 3, the MEK-ST corresponds to the starting material silica and the methanolsilica sol corresponds to the wet metal oxide fine particles of the present invention.

The silicone oligomer PPSQ-E is particles synthesized by a liquid phase synthesis method, and the particles are pulverized in the post step. The silicone oligomer PPSQ-E corresponds to the wet metal oxide fine particles of the present invention. The silicone oligomer PPSQ-E is also called phenyl silica and is powdered polymer silica having abenzene ring in the structure. In addition, such a silicone oligomer PPSQ-E has a cord-shape structure, and therefore PPSQ-E is easily dispersed in a solution without aggregation.

The above-mentioned Examples 2-1 to 2-14 and Comparative Examples 2-1 to 2-8 show that the organic resin component having an Abbe number of 45 or more and the wet metal oxide fine particles as the metalloxane component are preferably used in order to obtain a curable resin composition having a large Abbe number and a low refractive index. Specifically, those Examples show that an organic-inorganic composite resin composition including an organic resin component and a metal oxide fine particle component, in which the metal oxide fine particle component essentially includes inorganic fine particles obtained by a wet method, and the organic resin component has an Abbe number of 45 or more, is preferable. The critical significance of the value range of the Abbe number in the organic resin component can be mentioned as follows. That is, it is shown that due to the organic resin component having an Abbe number of 45 or more, the degree of increase in the Abbe number of the organic-inorganic composite resin composition relative to the Abbe number of the organic resin compound becomes larger and the advantageous effects are remarkably exhibited.

The low limit is 46.8 in Example 2-10 in which the resin composition includes the organic resin component and the wet metal oxide fine particles (30% by weight). The technical meaning of such a low limit of the value range can be clearly shown by comparison with Example 2-14 in which the Abbe number is below the low limit. In Example 2-10, the Abbe number of the organic-inorganic composite resin composition is larger than that of the organic resin component by 7.3. In contrast, in Example 2-14, the Abbe number of the organic-inorganic composite resin composition is larger than that of the organic resin component just by 3.9. It is obvious that such an effect, that is, an effect of improving the Abbe number and providing a resin composition preferably used in an optical application, is remarkable.

With respect to comparison of Example 2-4 with Example 2-11, the alicyclic epoxy compound was used as the organic resin component in Example 2-4 and the Abbe number of the organic-inorganic composite resin composition was larger than the Abbe number of the organic resin component by 5.8. In contrast, a polymethacrylic acid resin was used as the organic resin component in Example 2-11, and the Abbe number of the organic-inorganic composite resin composition was larger than the Abbe number of the organic resin component by 4.3. The results in Examples 2-4 and 2-11 show that the embodiment in which the alicyclic epoxy compound is used as the organic resin component is preferable in order to improve the Abbe number.

In the above-mentioned Examples and Comparative Examples, the alicyclic epoxy compound and the polymethacrylic acid resin were used as the organic resin component, and MEK-ST, methanolsilica sol, and phenyl silica PPSQ-E were used as the wet metal oxide fine particles. The resin compositions which includes a resin component having an Abbe number of 45 or more as the organic resin component and wet metal oxide fine particles as the metal oxide fine particle component have the same mechanism in which the Abbe number of the organic-inorganic resin composition, which is larger than that of the organic resin component, can be obtained. Therefore, it might be said that the resin composition which essentially includes the wet metal oxide fine particles can exhibit advantage effects of the present invention. At least in the case where the alicyclic epoxy compound and the polymethacrylic acid resin are used as the organic resin component and the wet silica is used as the wet metal oxide fine particles, the above-mentioned Examples and Comparative Examples sufficiently prove the advantageous effects of the present invention and support the technical meanings of the present invention.

Synthesis Example 3-1

YX-8000/YL7170/$SiO_2$=65/25/10 (% by Weight)

A hydrogenated bisphenol A epoxy resin JER YX8000 (Japan Epoxy Resins Co., Ltd., the epoxy equivalent: 205) 168 g and an organosilica sol MEK-ST (product of NISSAN CHEMICAL INDUSTRIES., LTD., MEK-ST, the particle diameter: 10 to 15 nm, the solid content: 30%) 240 g were homogeneously mixed. The solvent was subjected to vacuum distillation at 80° C. using an evaporator. As a result, 249.7 g of a resin composition 1 was obtained. The resin composition 1, 34.7 g, a hydrogenated bisphenol A type epoxy resin JER YL7170 (product of Japan Epoxy Resins Co., Ltd., the epoxy equivalent: 1000) 25 g, and a JER YX 8000, 41.6 g were each weighed and homogeneously mixed at 140° C. The resin composition had a yield of 101.3 g and a viscosity of 80 Pa·s (resin composition for Example 3-1).

Synthesis Example 3-2

YX-8000/YL7170/$SiO_2$=45/45/10 (% by Weight)

The resin composition 1, 34.7 g, a hydrogenated bisphenol A type epoxy resin JER YL7170 (product of Japan Epoxy Resins Co., Ltd., the epoxy equivalent: 1000) 45.1 g, and a JER YX 8000, 21.6 g were each weighed and homogeneously mixed at 140° C. The resin composition had a yield of 100.2 g and a viscosity of 420 Pa·s (resin composition for Example 3-2).

Synthesis Example 3-3

YX-8034/SiO$_2$=90/10 (% by Weight)

A hydrogenated bisphenol A epoxy resin JER YX8034 (Japan Epoxy Resins Co., Ltd., the epoxy equivalent: 277) 168 g and an organosilica sol MEK-ST (product of NISSAN CHEMICAL INDUSTRIES., LTD., the particle diameter: 10 to 15 nm, the solid content: 30%) 240 g were homogeneously mixed. The solvent was subjected to vacuum distillation at 80° C. using an evaporator. The resin composition had a yield of 250.1 g and a viscosity of 65 Pa·s (resin composition for Reference Example 3-1).

Synthesis Example 3-4

YX-8000/SiO$_2$=90/10 (% by Weight)

A hydrogenated bisphenol A epoxy resin JER YX8000 (product of Japan Epoxy Resins Co., Ltd., the epoxy equivalent: 205) 168 g and an organosilica sol MEK-ST (product of NISSAN CHEMICAL INDUSTRIES., LTD., the particle diameter: 10 to 15 nm, the solid content: 30%) 62.0 g were homogeneously mixed. The solvent was subjected to vacuum distillation at 80° C. using an evaporator. The resin composition had a yield of 187.0 g and a viscosity of 65 Pa·s (resin composition for Example 3-3).

"Preparation of Curable Resin Composition"

To each of the above-mentioned resin compositions in Synthesis Examples 3-1 to 3-4, stearic acid as a demolding agent was added to account for 0.5% by weight relative to the total amount. Then, the mixture was homogeneously mixed at 80° C.

The mixture was cooled to 50° C., and then thereto a cationic polymerization initiator (product of SANSHIN CHEMICAL INDUSTRY CO., LTD., San-Aid SI-80L, the solid content: 50%) was added to account for 1% by weight (0.5% by weight on the solid content equivalent basis) relative to the total weight, and the mixture was homogeneously mixed.

The obtained resin composition and molded product were evaluated for the following physical properties. Table 6 shows the results.

"Viscosity"

The resin compositions obtained in the above-mentioned Synthesis Examples 3-1 to 3-4 were evaluated for viscosity at 40° C. and at a rotation speed D of 1/s using an R/S Rheometer (product of Brookfield).

A measuring jig RC 25-1 was used for measuring the viscosity of 20 Pa·s or more and a measuring jig RC 50-1 was used for measuring the viscosity of less than 20% Pa·s. The resin composition whose viscosity at D of 1/s could not be measured was evaluated by extrapolating a value at D of 5 to 100/s.

"Measurement of Molecular Weight"

Under the above-mentioned GPC measurement conditions, the resin compositions obtained in Synthesis Examples 3-1 to 3-4 were measured for molecular weight. Then, the proportion of the organic resin component having a molecular weight of 700 or more was calculated.

"Evaluation of Strength (Bending Strength and Coefficient of Elasticity)"

(Cured plate): The resin composition was subjected to vacuum degassing treatment, if necessary, by heating (at 45° C. and the like). Then, the composition was charged into a mold and cured at 150° C. for 10 minutes in an oven. As a result, a resin cured plate with a thickness of 3 mm was obtained.

(Strength measurement): The resin cured plate was measured for thermal properties and mechanical properties (bending strength and coefficient of elasticity) according to JIS K6911.

TABLE 6

| Sample | Resin composition | | | | Organic resin component | | Bending strength (MPa) | Coefficient of elasticity (MPa) |
| --- | --- | --- | --- | --- | --- | --- | --- | --- |
| | YX8000 content (% by weight) | YL7170 content (% by weight) | YX8034 content (% by weight) | inorganic component content (% by weight) | 700 or more of molecular weight (%) | Less than 700 of molecular weight (%) | | |
| Example 3-1 | 65 | 25 | 0 | 10 | 43.9 | 56.1 | 90.9 | 2590 |
| Example 3-2 | 45 | 45 | 0 | 10 | 53.7 | 46.3 | 110 | 2200 |
| Reference Example 3-1 | 0 | 0 | 90 | 10 | 35.6 | 64.4 | 80.2 | 2305 |
| Example 3-3 | 90 | 0 | 0 | 10 | 6.0 | 94.0 | 47.3 | 1052 |

The above-mentioned Examples 3-1 to 3-3 and Reference Example 3-1 prove the following result: it is preferable that the resin composition includes a specific amount or more of the organic resin component having a molecular weight of 700 or more, in order to provide a cured product of the curable resin composition in the present invention, which can be unified, and exhibit a sufficient strength and an improved peel strength without cracks when being peeled, and has a preferable material hardness. Specifically, it is shown that an organic-inorganic composite resin compound including an organic resin component and a metal oxide fine particle component, in which the organic resin component includes 30 to 90% by weight of an organic resin component having a molecular weight of 700 or more relative to the total amount of the organic resin component, is preferable.

(828EL/SiO$_2$(Silicone Oligomer PPSQ-E)=65/35 (% by Weight))

A bisphenol A (product of Japan Epoxy Resins Co., Ltd., JER 828EL, the epoxy equivalent: 184 to 194) 32.5 g and a silicone oligomer (product of KONISHI CHEMICAL IND CO., LTD., PPSQ-E, the number average molecular weight: 850) 17.5 g were homogeneously mixed. The resin composition had a yield of 50 g and a viscosity of 7 Pa·s (resin composition for Comparative Example 4-1).

(828EL/SiO$_2$(Silicone Oligomer PPSQ-H)=87/13 (% by Weight))

A bisphenol A (product of Japan Epoxy Resins Co., Ltd., JER 828EL, the epoxy equivalent: 184 to 194) 136.5 g, a silicone oligomer (product of KONISHI CHEMICAL IND CO., LTD., PPSQ-H, the number average molecular weight: 2200) 20.6 g, and ethyl acetate 150.0 were homogeneously mixed. The solvent was subjected to vacuum distillation at 90° C. using an evaporator. The resin composition had a yield of 157.2 g and a viscosity of 3.3 Pa·s (resin composition for Comparative Example 4-2).

(828EL/JER1003/SiO$_2$ (Silicone Oligomer PSQ-E)/2021P=60/20/10/10 (% by Weight))

A bisphenol A (product of Japan Epoxy Resins Co., Ltd., JER 828EL, the epoxy equivalent: 184 to 194) 240.0 g, a bisphenol A (product of Japan Epoxy Resins Co., Ltd., JER 1003, the epoxy equivalent: 670 to 770) 80.0 g and methyl ethyl ketone 100.0 g were homogeneously mixed. The solvent was subjected to vacuum distillation at 90° C. using an evaporator. The yield was 320.3 g. Thereto, CELLOXIDE (product of DAICEL CHEMICAL INDUSTRIES., LTD., 2021P) 40.0 g was mixed at 80° C., and further a silicone oligomer (product of KONISHI CHEMICAL IND CO., LTD., PPSQ-E, the number average molecular weight: 850) 40.0 g was homogeneously mixed. The resin composition had a yield of 400.3 g and a viscosity of 22 Pa·s (resin composition for Reference Example 4-1).

(828EL/JER1256/SiO$_2$ (Silicone Oligomer PPSQ-E)/2021P=70/10/10/10 (% by Weight))

A bisphenol A (product of Japan Epoxy Resins Co., Ltd., JER 828EL, the epoxy equivalent: 184 to 194) 70.0 g, a bisphenol A (product of Japan Epoxy Resins Co., Ltd., JER 1256, the epoxy equivalent: 7000 to 8500) 10.0 g and toluene 40.0 g were homogeneously mixed. The solvent was subjected to vacuum distillation at 120° C. using an evaporator. The yield was 81.3 g. Thereto, CELLOXIDE (product of DAICEL CHEMICAL INDUSTRIES., LTD., 2021P) 10.0 g was mixed at 80° C., and further a silicone oligomer (product of KONISHI CHEMICAL IND CO., LTD., PPSQ-E, the number average molecular weight: 850) 10.0 g was homogeneously mixed. The resin composition had a yield of 101.3 g and a viscosity of 22 Pa·s (resin composition for Reference Example 4-2).

(828EL/JER1007/SiO$_2$ (Silicone Oligomer PPSQ-E) 2021P=60/20/10/10 (% by Weight))

A bisphenol A (product of Japan Epoxy Resins Co., Ltd., JER 828EL, the epoxy equivalent: 184 to 194) 240.0 g and a bisphenol A (product of Japan Epoxy Resins Co., Ltd., JER 1007, the epoxy equivalent: 1750 to 2200) 80.0 g and methyl ethyl ketone 100.0 g were homogeneously mixed. The solvent was subjected to vacuum distillation at 90° C. using an evaporator. The yield was 322.6 g. Thereto, CELLOXIDE (product of DAICEL CHEMICAL INDUSTRIES., LTD., 2021P) 40.0 g was mixed at 80° C., and further a silicone oligomer (product of KONISHI CHEMICAL IND CO., LTD., PPSQ-E, the number average molecular weight: 850) 40.0 g was homogeneously mixed. The resin composition had a yield of 402.6 g and a viscosity of 50 Pa·s (resin composition for Reference Example 4-3).

(828EL/SiO$_2$(Phenyl Silicone Oligomer)=70/30 (% by Weight))

A bisphenol A (product of Japan Epoxy Resins Co., Ltd., JER 828EL, the epoxy equivalent: 184 to 194) 161.2 g, a phenyltrimethoxysilane (product of (product of Shin-Etsu Chemical Co., Ltd., KBM-103) 99.1 g, and butanol 161.2 g, and water 27.0 g were homogeneously mixed. Then, dibutyltin (IV) dilaurate 1.6 g was homogeneously mixed. Under stirring, the mixture was heated to 80° C. and the reaction was allowed to proceed for 2 hours. The solvent was subjected to vacuum distillation at 120° C. using an evaporator. The resin composition had a yield of 241.7 g and a viscosity of 3.3 Pa·s (resin composition for Comparative Example 4-3).

(828EL/EX-1020/SiO$_2$ (Silicone Oligomer PPSQ-H)/2021P=47.5/25/17.5/10 (% by Weight))

A bisphenol A (product of Japan Epoxy Resins Co., Ltd., JER 828EL, the epoxy equivalent: 184 to 194) 30.0 g, a fluorene epoxy (product of Osaka Gas Chemicals Co., Ltd., ONCOAT EX-1020, the epoxy equivalent: 296) 50.0 g, and the CELLOXIDE (product of DAICEL CHEMICAL INDUSTRIES., LTD. 2021P) 20.0 g were homogeneously mixed (starting material resin A). A bisphenol A (product of Japan Epoxy Resins Co., Ltd., JER 828EL, the epoxy equivalent: 184 to 194) 65.0 g, a silicone oligomer (product of KONISHI CHEMICAL IND CO., LTD., PPSQ-H, the number average molecular weight: 2200) 35.0 g, and methyl ethyl ketone 50.0 g were homogeneously mixed. The solvent was subjected to vacuum distillation at 90° C. using an evaporator (starting material resin B-1, the yield: 100.0 g). Then, the starting material resin A and the starting material resin B-1 were homogeneously mixed. The resin composition had a yield of 200.0 g and a viscosity of 15.5 Pa·s (resin composition for Reference Example 4-4).

(828 EL/EX-1020/SiO$_2$(Silicone Oligomer PPSQ-E)/2021P=47.5/25/17.5/10 (% by Weight))

A bisphenol A (product of Japan Epoxy Resins Co., Ltd., JER 828EL, the epoxy equivalent: 184 to 194) 30.0 g, a fluorene epoxy (product of Osaka Gas Chemicals Co., Ltd., ONCOAT EX-1020, the epoxy equivalent: 296) 50 g, and CELLOXIDE (product of DAICEL CHEMICAL INDUSTRIES., LTD. 2021P) 20.0 g were homogeneously mixed (starting material resin A). A bisphenol A (product of Japan Epoxy Resins Co., Ltd., JER 828EL, the epoxy equivalent: 184 to 194) 65.0 g, a silicone oligomer (product of KONISHI CHEMICAL IND CO., LTD., PPSQ-E, the number average molecular weight: 850) 35.0 g, and methyl ethyl ketone 50.0 g were homogeneously mixed (starting material resin B-2). Then, the starting material resin A and the starting material resin B-2 were homogeneously mixed. The resin composition had a yield of 200.0 g and a viscosity of 9.8 Pa·s (resin composition for Reference Example 4-5).

(YX-8000/SiO$_2$(MEK-ST)=70/30 (% by Weight))

A hydrogenated bisphenol A (product of Japan Epoxy Resins Co., Ltd., JER YX-8000, the epoxy equivalent: 205) 168 g and an organosilica sol (product of NISSAN CHEMICAL INDUSTRIES., LTD., MEK-ST, the particle diameter: 10 to 15 nm, the solid content: 30%) 240 g were homogeneously mixed. The solvent was subjected to vacuum distillation at 80° C. using an evaporator. The resin composition had a yield of 249.7 g and a viscosity of 40 Pa·s (resin composition for Example 4-1).

(YX-8000/SiO$_2$(Silicone Oligomer PPSQ-E)=70/30 (% by Weight))

A hydrogenated bisphenol A (product of Japan Epoxy Resins Co., Ltd., JER YX-8000, the epoxy equivalent: 205) 22.8 g and a silicone oligomer (product of KONISHI CHEMICAL IND CO., LTD., PPSQ-E the number average molecular weight: 850) 9.8 g were homogeneously mixed. The resin composition had a yield of 32.6 g and a viscosity of 3 Pa·s (resin composition for Example 4-2).

(828EL/SiO$_2$(MEK-ST)=70/30 (% by Weight))

A bisphenol A (product of Japan Epoxy Resins Co., Ltd., JER 828EL, the epoxy equivalent: 184 to 194) 42.1 g and an organosilica sol (product of NISSAN CHEMICAL INDUSTRIES., LTD., MEK-ST, the particle diameter: 10 to 15 nm, the solid content: 30%) 60.1 g were homogeneously mixed. The solvent was subjected to vacuum distillation at 80° C. using an evaporator. The resin composition had a yield of 70.9 g and a viscosity of 30 Pa·s (resin composition for Comparative Example 4-4).

"Preparation of Curable Resin Composition"

To each of the above-mentioned resin compositions, stearic acid as a demolding agent was added to account for 0.5% by weight relative to the total weight. The mixture was homogeneously mixed at 80° C. The mixture was cooled to 45° C., and then thereto a cationic polymerization initiator (product of SANSHIN CHEMICAL INDUSTRY CO., LTD., San-Aid SI-60L) was added to account for 1.5% by weight (0.5% by weight on the solid content equivalent basis) relative to the total weight, and the mixture was homogeneously mixed.

"Molded Product"

The resin composition was subjected to vacuum degassing treatment, if necessary, by heating (at 50° C. and the like). Then, the composition was cured at 140° C. for 5 hours while vacuum treatment was performed if the existence of the solvent caused bubbles. As a result, a cast plate with a thickness of 1 mm was obtained.

The resin composition was subjected to vacuum degassing treatment, if necessary, by heating (at 50° C. and the like). Then, a film of the resin composition was formed by a squeegee method and cured at 140° C. for 5 hour, while vacuum treatment was performed if the existence of the solvent caused bubbles. As a result, a film with a thickness of 250 micrometers was obtained.

"Quantitative Determination of Unsaturated Bond Amount"

The unsaturated bond amount contained in a cured product of the above-mentioned curable resin composition was measured by the above-mentioned method. Here is the outline.

The above-mentioned curable resin composition was heated at 150° C. for 1 hour to form a cured product. In Comparative Example 4-1, the cured product after heating had a weight which accounts for 98.1% relative to the weight of the curable resin composition before heating. The resin composition and the cured product were subjected to NMR and IR measurements, and thereby the existence of the unsaturated bond (aromatic ring) was identified. The carbon atom and the hydrogen atom which form the unsaturated bond were quantitated by 400 MHz $^1$H-NMR measurement. A peak was detected at 6.5 to 8 ppm using tetramethylene silane as a standard, and in Comparative Example 4-1, the unsaturated bond accounts for 45.4% in 100% by weight of the cured product.

"Evaluation of Transparency (Transmittance)"

Transmittance: The cured product was evaluated for transmittance at a wavelength of 500 nm using an absorption spectrometer (product of Shimazu Corporation, spectrophotometer UV-3100).

(Cured product): The above-mentioned molded products and films with a thickness of 1 mm were evaluated for transmittance.

"Viscosity"

The resin compositions were evaluated for viscosity at 40° C. and at a rotation speed D of 1/s using an R/S Rheometer (product of Brookfield). A measuring jig RC 25-1 was used for measuring the viscosity of 20 Pa·s or more and a measuring jig RC 50-1 was used for measuring the viscosity of less than 20 Pa·s. The resin composition whose viscosity at D of 1/s could not be measured was evaluated by extrapolating a value at D of 5 to 100/s.

"Evaluation of Refractive Index and Abbe Number"

The resin compositions were evaluated for refractive index at 20° C. using a refractometer (product of ATAGO CO., LTD., DR-M2). (Cured product): The above-mentioned molded products and films were evaluated for refractive index and Abbe number.

TABLE 7

| Sample | Molded state | Transmittance (%) (500 nm) | Refractive index (486 nm) | Refractive index (589 nm) | Refractive index (656 nm) | Abbe number | Unsaturated bond amount (%) |
|---|---|---|---|---|---|---|---|
| Comparative Example 4-1 | 250 μm film | 90.2 | 1.5977 | 1.5845 | 1.5791 | 31.4 | 45.4 |
| Comparative Example 4-2 | 250 μm film | 82.6 | 1.6022 | 1.5873 | 1.5824 | 29.7 | 46.3 |
| Reference Example 4-1 | 250 μm film | 90.1 | 1.5937 | 1.5811 | 1.5762 | 33.2 | 41.4 |
| Reference Example 4-2 | 1 mm plate | 90.4 | 1.5964 | 1.5837 | 1.5786 | 32.8 | 41.7 |
| Reference Example 4-3 | 1 mm plate | 90.2 | 1.5943 | 1.5816 | 1.5766 | 32.9 | 41.6 |
| Comparative Example 4-3 | 250 μm film | 86.2 | 1.5993 | 1.5859 | 1.5818 | 33.5 | 44.3 |
| Reference Example 4-4 | 250 μm film | 90.1 | 1.6006 | 1.5867 | 1.5817 | 31.0 | 43.6 |
| Reference Example 4-5 | 250 μm film | 87.3 | 1.5998 | 1.5856 | 1.5812 | 31.5 | 44.8 |
| Example 4-1 | 1 mm plate | 82.0 | 1.5091 | 1.5030 | 1.5006 | 59.2 | 0.0 |
| Example 4-2 | 1 mm plate | 90.3 | 1.5393 | 1.5310 | 1.5274 | 44.6 | 14.9 |
| Comparative Example 4-4 | 1 mm plate | 68.9 | 1.5743 | 1.5626 | 1.5588 | 36.3 | 30.9 |

The above-mentioned Examples 4-1 and 4-2, Comparative Examples 4-1 to 4-4, and Reference Examples 4-1 to 4-5 show that the use of an organic resin component having a large amount of the unsaturated bonds is preferable in order to produce a curable resin composition having a small Abbe number and a high refractive index. Specifically, it is shown that a curable resin composition including an organic component and a metalloxane component, in which an unsaturated bond accounts for 40% by weight or more relative to 100% by weight of a cured product of the composition is preferable. The critical significance of the value range can be mentioned as follows. That is, it is shown that if the resin composition includes the unsaturated bonds which accounts for 40% by weight or more relative to 100% by weight of a cured product of the composition, advantageous effects, that is, optical characteristics such as high transparency and refractive index, and small Abbe number, can be remarkably exhibited.

The low limit is 41.4% by weight in Reference Example 4-1. The technical meaning of such a low limit of the value range can be clearly shown by comparison with Comparative Example 4-4 in which the unsaturated bond amount is below the low limit. In Reference Example 4-1, the transmittance at 500 nm is 90.1%, and in Comparative Example 4-4, the transmittance at 500 nm is 68.9. In Reference Example 4-1, the resin composition can be preferably applied in an optical application or other various applications. However, in Comparative Example 4-4, the resin composition can not be preferably used especially in an optical application such as a lens, an opto device application, and the like. It is obvious that such an effect, that is, an effect of providing a resin composition preferably used in an optical application and other various applications, is remarkable. Also in the resin compositions having an unsaturated bond amount of 40% by weight or more, in addition to the resin composition in Reference Example 4-1, the same effects of the present invention can be remarkably exhibited.

The resin compositions including an epoxy resin and a silica polymer are used in the Examples and Comparative Examples. High transparency and refractive index and a small Abbe number can be obtained through the same mechanism as long as the resin composition is an organic-inorganic composite resin composition which includes an unsaturated bond amount of 40% by weight or more. Therefore, it can be assured that the organic-inorganic composite resin composition which has an unsaturated bond amount of 40% by weight or more and includes the organic component and the metalloxane component can exhibit the advantageous effects of the present invention. At least in the case where the resin composition includes a thermoplastic resin composition and a silica polymer as the organic component, and especially mainly includes an epoxy resin having an aromatic ring and a silica polymer having an aromatic ring, the above-mentioned Examples and Comparative Examples sufficiently prove the advantageous effects of the present invention and support the technical meanings of the present invention.

Example 5-1

YX-8000/SiO$_2$(MEK-ST)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 203.5 g and an organosilica sol (product of NISSAN CHEMICAL INDUSTRIES., LTD., MEK-ST, the particle diameter: 10 to 15 nm, the solid content: 30%) 290.7 g, and 1-butanol 5.8 g were homogeneously mixed. The solvent was subjected to vacuum distillation at 65° C. for 5.5 hours. The resin composition had a yield of 299.1 g and a viscosity of 37 Pa·s. The MEK-ST used as the starting material silica corresponds to the wet metal oxide fine particles of the present invention.

Example 5-2

YX-8000/SiO$_2$(MEK-ST)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 203.5 g, an organosilica sol (product of NISSAN CHEMICAL INDUSTRIES., LTD., MEK-ST, the particle diameter: 10 to 15 nm, the solid content: 30%) 290.7 g, and 2-ethyl-1-hexanol 5.8 g were homogeneously mixed. The solvent was subjected to vacuum distillation at 65° C. for 5.5 hours. The resin composition had a yield of 300.6 g and a viscosity of 30 Pa·s.

Example 5-3

YX-8000/SiO$_2$(MEK-ST)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 203.5 g, an organosilica sol (product of NISSAN CHEMICAL INDUSTRIES., LTD., MEK-ST, the particle diameter: 10 to 15 nm, the solid content: 30%) 290.7 g, and 2-ethyl-1-hexanol 5.8 g were homogeneously mixed. The solvent was subjected to vacuum distillation at 90° C. for 1 hour. The resin composition had a yield of 300.0 g and a viscosity of 68 Pa·s.

Example 5-4

YX-8000/SiO$_2$(MEK-ST)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 203.5 g, an organosilica sol (product of NISSAN CHEMICAL INDUSTRIES., LTD., MEK-ST, the particle diameter: 10 to 15 nm, the solid content: 30%) 290.7 g, and 1-dodecanol 5.8 g were homogeneously mixed. The solvent was subjected to vacuum distillation at 65° C. for 5.5 hours. The resin composition had a yield of 301.1 g and a viscosity of 18 Pa·s.

Example 5-5

YX-8000/SiO$_2$(MEK-ST)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 203.5 g, an organosilica sol (product of NISSAN CHEMICAL INDUSTRIES., LTD., MEK-ST, the particle diameter: 10 to 15 nm, the solid content: 30%) 290.7 g, and 1-hexadecanol 5.8 g were homogeneously mixed. The solvent was subjected to vacuum distillation at 65° C. for 5.5 hours. The resin composition had a yield of 301.9 g and a viscosity of 17 Pa·s.

Example 5-6

YX-8000/SiO$_2$(MEK-ST)=80/20 (% by Weight)

A hydrogenated bisphenol A (product of Japan Epoxy Resins Co., Ltd., EPICOAT YX-8000, the epoxy equivalent: 205, a liquid hydrogenated epoxy resin) 269.1 g, an organosilica sol (product of NISSAN CHEMICAL INDUSTRIES., LTD., MEK-ST, the particle diameter: 10 to 15 nm, the solid content: 30%) 224.2 g, and 1-hexadecanol 6.7 g were homogeneously mixed. The solvent was subjected to vacuum distillation at 65° C. for 5.5 hours. The resin composition had a yield of 350.5 g and a viscosity of 1.6 Pa·s.

Example 5-7

YX-8000/SiO$_2$(MEK-ST)=60/40 (% by Weight)

A hydrogenated bisphenol A (product of Japan Epoxy Resins Co., Ltd., EPICOAT YX-8000, the epoxy equivalent: 205, a liquid hydrogenated epoxy resin) 153.6 g, an organosilica sol (product of NISSAN CHEMICAL INDUSTRIES., LTD., MEK-ST, the particle diameter: 10 to 15 nm, the solid content: 30%) 341.3 g, and 1-hexadecanol 5.1 g were homogeneously mixed. The solvent was subjected to vacuum distillation at 65° C. for 5.5 hours. The resin composition had a yield of 269.6 g and a viscosity of 1099 Pa·s.

Comparative Example 5-1

828EL/SiO$_2$(MEK-ST)=70/30 (% by Weight)

A bisphenol A (product of Japan Epoxy Resins Co., Ltd., EPICOAT 828EL, the epoxy equivalent: 184 to 194) 203.5 g, an organosilica sol (product of NISSAN CHEMICAL INDUSTRIES., LTD., MEK-ST, the particle diameter: 10 to 15 nm, the solid content: 30%) 290.7 g, and 1-hexadecanol 5.8 g were homogeneously mixed. The solvent was subjected to vacuum distillation at 65° C. for 5.5 hours. The resin composition had a yield of 299.9 g and a viscosity of 27 Pa·s.

Example 5-8

Each starting material was mixed in the same manner as in Example 5-2, except that 2-ethyl-1-hexanol 50 g was used instead of the 2-ethyl-1-hexanol 5.8 g. Then, the solvent was subjected to vacuum distillation at 65° C. for 5.5 hours. The yield was 344 g. The resin composition contained about 10% by weight or more of the added 2-ethyl-1-hexanol. Then, the solvent was further subjected to vacuum distillation at 70° C. for 20 hours. As a result, a resin composition which had a yield of 302 g and a viscosity of 500 Pa·s was obtained.

Example 5-9

YX-8000/SiO$_2$(MEK-ST)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 203.5 g and an organosilica sol (product of NISSAN CHEMICAL INDUSTRIES., LTD., MEK-ST, the particle diameter: 10 to 15 nm, the solid content: 30%) 290.7 g were homogeneously mixed. The solvent was subjected to vacuum distillation at 65° C. for 5.5 hours. The resin composition had a yield of 297.1 g and a viscosity of 118 Pa·s.

Example 5-10

YX-8000/SiO$_2$(MEK-ST)=70/30 (% by Weight)

A hydrogenated bisphenol A (product of Japan Epoxy Resins Co., Ltd., EPICOAT YX-8000, the epoxy equivalent: 205, a liquid hydrogenated epoxy resin) 203.5 g and an organosilica sol (product of NISSAN CHEMICAL INDUSTRIES., LTD., MEK-ST, the particle diameter: 10 to 15 nm, the solid content: 30%) 290.7 g were homogeneously mixed. The solvent was subjected to vacuum distillation at 90° C. for 1 hour. The resin composition had a yield of 295.9 g and a viscosity of 144 Pa·s.

Example 5-11

YX-8000/SiO$_2$(MEK-ST)=80/20 (% by Weight)

A hydrogenated bisphenol A (product of Japan Epoxy Resins Co., Ltd., EPICOAT YX-8000, the epoxy equivalent: 205, a liquid hydrogenated epoxy resin) 272.7 g and an organosilica sol (product of NISSAN CHEMICAL INDUSTRIES., LTD., MEK-ST, the particle diameter: 10 to 15 nm, the solid content: 30%) 227.3 g were homogeneously mixed. The solvent was subjected to vacuum distillation at 65° C. for 5.5 hours. The resin composition had a yield of 351.4 g and a viscosity of 5 Pa·s.

Example 5-12

YX-8000/SiO$_2$(MEK-ST)=60/40 (% by Weight)

A hydrogenated bisphenol A (product of Japan Epoxy Resins Co., Ltd., EPICOAT YX-8000, the epoxy equivalent: 205, a liquid hydrogenated epoxy resin) 155.2 g and an organosilica sol (product of NISSAN CHEMICAL INDUSTRIES., LTD., MEK-ST, the particle diameter: 10 to 15 nm, the solid content: 30%) 344.8 g were homogeneously mixed. The solvent was subjected to vacuum distillation at 65° C. for 5.5 hours. The resin composition had a yield of 266.6 g and a viscosity of more than 15000 Pa·s.

Comparative Example 5-2

828EL/SiO$_2$(MEK-ST)=70/30 (% by Weight)

A bisphenol A (product of Japan Epoxy Resins Co., Ltd., EPICOAT 828EL, the epoxy equivalent: 184 to 194) 205.9 g and an organosilica sol (product of NISSAN CHEMICAL INDUSTRIES., LTD., MEK-ST, the particle diameter: 10 to 15 nm, the solid content: 30%) 294.1 g were homogeneously mixed. The solvent was subjected to vacuum distillation at 65° C. for 5.5 hours. The resin composition had a yield of 302.3 g and a viscosity of 146 Pa·s.

Comparative example 5-3

YX-8000=100 (% by Weight)

A hydrogenated bisphenol A (product of Japan Epoxy Resins Co., Ltd., EPICOAT YX-8000, the epoxy equivalent: 205, a liquid hydrogenated epoxy resin) was used as the resin composition.

"Preparation of Curable Resin Composition"

To each of the above-mentioned resin compositions, stearic acid as a demolding agent was added to account for 0.5 parts relative to 100 parts of the resin composition. Then, the mixture was homogeneously mixed at 80° C.

The mixture was cooled to 50° C., and then thereto a cationic polymerization initiator (product of SANSHIN CHEMICAL INDUSTRY CO., LTD., San-Aid SI-80L, the solid content: 50%) was added to account for 1 part (0.5 parts on the solid content equivalent basis) relative to 100 parts by weight of the resin composition, and the mixture was homogeneously mixed.

"Molded Product"

The above-mentioned resin composition was subjected to vacuum degassing treatment, if necessary, by heating (at 50° C. and the like). Then, a film of the resin composition was formed. The resin composition was cured at 110° C. for 5 hours, while vacuum treatment was performed if the existence of the solvent caused bubbles. As a result, a cast plate with a thickness of 1 mm was obtained.

The obtained resin compositions and molded products were evaluated for the following physical properties.

Tables 8 and 9 show the results.

"Viscosity"

The resin compositions before addition of the demolding agent and the curing agent were evaluated for viscosity at 40° C. and at a rotation speed D of 1/s using an R/S Rheometer (product of Brookfield).

A measuring jig RC 25-1 was used for measuring the viscosity of 20 Pa·s or more and a measuring jig RC 50-1 was used for measuring the viscosity of less than 20 Pa·s.

The resin composition whose viscosity at D of 1/s could not be measured was evaluated by extrapolating a value at D of 5 to 100/s.

"Evaluation of Refractive Index and Abbe Number"

The resin compositions were evaluated for refractive index at 20° C. using a refractometer (product of ATAGO CO., LTD., DR-M2). (Cured product): The above-mentioned molded products with a thickness of 1 mm were evaluated for refractive index and Abbe number.

TABLE 8

| | Added solvent | Immediately after synthesis | 4° C., one day preservation | 4° C., six days preservation |
|---|---|---|---|---|
| Example 5-1 | 1-butanol | 37 | 42 | 56 |
| Example 5-2 | 2-ethyl hexanol | 30 | 38 | 49 |
| Example 5-3 | 2-ethyl hexanol | 65 | 78 | 84 |
| Example 5-4 | 1-dodecanol | 18 | 24 | 31 |
| Example 5-5 | 1-hexadecanol | 17 | 19 | 24 |
| Example 5-9 | None | 118 | 173 | 312 |
| Example 5-10 | None | 144 | 206 | 357 | bisphenol A was singly used, and the resin composition contains no metal oxide fine particles.

The above-mentioned Examples 5-1 to 5-12 and Comparative Examples 5-1 to 5-3 show that it is preferable that the degassing step in the coexistence of the high-boiling component is performed in the production method in which increase in viscosity at the time of synthesis of the resin composition is suppressed and the resin composition can be continuously produced without gelling during production. Specifically, it is shown that a method for producing an organic-inorganic composite resin composition including an organic resin component and a metal oxide fine particle component, in which the method includes the steps of: preparing a mixture containing metal oxide fine particles, an organic resin, and a solvent; and degassing the solvent from the mixture, and the degassing step is performed in the coexistence of a high-boiling component.

In the above-mentioned Examples and Comparative Examples, 1-dodecanol, 1-butanol, 1-hexadecanol, and 2-ethyl-1-hexanol are used as the high-boiling component, and the alicyclic epoxy compound (YX-8000) and the epoxy compound (828EL) are used as the organic resin component, and the wet metal oxide fine particles (MEK-ST) are used as the metal oxide fine particles. Increase in viscosity of the organic-inorganic composite resin composition can be suppressed through the same mechanism as long as the production methods which include the steps of: preparing a mixture containing metal oxide fine particles, an organic resin, and a solvent, and degassing the solvent from the mixture. Therefore, it can be assured that the advantageous effects of the present invention are exhibited if the production method essentially includes these steps. At least in the case where the curable resin composition includes an alcohol having a boiling point of 100° C. or more as the high-boiling component,

TABLE 9

| | Molded state | Added solvent | YX8000 content (% by weight) | 828EL content (% by weight) | Silica content (% by weight) | Refractive index (486 nm) | Refractive index (589 nm) | Refractive index (656 nm) | Abbe number | Haze |
|---|---|---|---|---|---|---|---|---|---|---|
| Example 5-1 | 1 mm plate | 1-butanol | 70 | 0 | 30 | 1.5089 | 1.5030 | 1.5005 | 59.9 | 1.3 |
| Example 5-2 | 1 mm plate | 2-ethyl hexanol | 70 | 0 | 30 | 1.5090 | 1.5029 | 1.5005 | 59.2 | 1.2 |
| Example 5-3 | 1 mm plate | 2-ethyl hexanol | 70 | 0 | 30 | 1.5091 | 1.5031 | 1.5006 | 59.2 | 1.1 |
| Example 5-4 | 1 mm plate | 1-dodecanol | 70 | 0 | 30 | 1.5089 | 1.5029 | 1.5004 | 59.2 | 1.4 |
| Example 5-5 | 1 mm plate | 1-hexadecanol | 70 | 0 | 30 | 1.5092 | 1.5031 | 1.5006 | 58.5 | 0.9 |
| Example 5-6 | 1 mm plate | 1-hexadecanol | 80 | 0 | 20 | 1.5123 | 1.5062 | 1.5036 | 58.2 | 1.0 |
| Example 5-7 | 1 mm plate | 1-hexadecanol | 60 | 0 | 40 | 1.5051 | 1.4995 | 1.4968 | 60.2 | 2.9 |
| Comparative Example 5-1 | 1 mm plate | 1-hexadecanol | 0 | 70 | 30 | 1.5740 | 1.5622 | 1.5586 | 36.5 | 7.5 |
| Example 5-9 | 1 mm plate | None | 70 | 0 | 30 | 1.5090 | 1.5029 | 1.5004 | 58.5 | 1.0 |
| Example 5-10 | 1 mm plate | None | 70 | 0 | 30 | 1.5090 | 1.5031 | 1.5005 | 59.2 | 1.5 |
| Example 5-11 | 1 mm plate | None | 80 | 0 | 20 | 1.5121 | 1.5060 | 1.5035 | 58.8 | 1.2 |
| Example 5-12 | 1 mm plate | None | 60 | 0 | 40 | 1.5049 | 1.4991 | 1.4966 | 60.1 | 3.0 |
| Comparative Example 5-2 | 1 mm plate | None | 0 | 70 | 30 | 1.5743 | 1.5626 | 1.5588 | 36.3 | 7.8 |
| Comparative Example 5-3 | 1 mm plate | None | 100 | 0 | 0 | 1.5201 | 1.5127 | 1.5105 | 53.4 | 0.8 |

The results in Table 8 show that the addition of the solvent (high-boiling component) permits suppression of increase in viscosity of the resin composition during production, and also can suppress increase in viscosity in the storage stability over time of the resin composition.

The results in Table 9 show that the addition of the solvent (high-boiling component) hardly have influences on optical characteristics of the resin composition, and therefore the resin composition has a large Abbe number and can be preferably used in various applications such as an optical application. In Comparative Example 5-3, the hydrogenated an alicyclic epoxy compound as the organic resin component and wet silica as the wet metal oxide fine particles, the above-mentioned Examples and Comparative Examples sufficiently prove the advantageous effects of the present invention and support the technical meanings of the present invention.

"pH of Metal Oxide Fine Particles"

An organic solvent and an ion exchange water were added to methanolsilica sol, MEK-ST, IPA-ST, G502-30, HZ-307M6, PPSQ-E in such a way that the metal oxide fine particles account for 15% by weight, the organic solvent accounts for 35% by weight, and the water accounts for 50% by weight. The mixture was measured for pH at 25° C. using a pH meter produced by HORIBA Ltd. Table 10 shows the measurement results. The metal oxide fine particles used in the measurement are the same as those used in the following Synthesis Examples.

"pH Measurement"

The pH measurement was performed at 25° C. using a pH meter F-22 (product of HORIBA Ltd.). Ion exchange water with a pH of 7 was used as the water.

TABLE 10

| | Proportion of measured sample | | | | |
|---|---|---|---|---|---|
| | Inorganic fine particles | Organic solvent | | Water | pH |
| Starting material | (g) | | (g) | (g) | value |
| MEK-ST | Silica | 6 | MEK | 14 | 20 | 4.4 |
| G502-30 | Silica | 6 | IPA | 14 | 20 | 3.5 |
| HZ-307M6 | Zilconia | — | IPA | 14 | 20 | 7.9 |
| PPSQ-E | Phenyl silica | — | IPA | 14 | 20 | 7.6 |
| Methanol silica sol | Silica | 6 | Methanol | 14 | 20 | 3.1 |
| IPA-ST | Silica | 6 | IPA | 14 | 20 | 3.2 |

In Table 10, MEK-ST, methanolsilica sol, G502-30, HZ-307m6, and IPA-ST each correspond to the wet metal oxide fine particles.

The silicone oligomer PPSQ-E is particles synthesized by a liquid phase synthesis method, and the particles are pulverized in the post step. The silicone oligomer PPSQ-E corresponds to wet metal oxide fine particles of the present invention. The silicone oligomer PPSQ-E is also called phenyl silica and is powdered polymer silica having a benzene ring in the structure. In addition, such a silicone oligomer PPSQ-E has a cord structure and therefore easily dispersed in a solution without aggregation.

Synthesis of Resin Composition

Synthesis Example 6-1

A hydrogenated bisphenol A (product of Japan Epoxy Resins Co., Ltd., EPICOAT YX-8000, the epoxy equivalent: 205, a liquid hydrogenated epoxy resin) 168 g and an organosilica sol (product of NISSAN CHEMICAL INDUSTRIES., LTD., MEK-ST, the particle diameter: 10 to 15 nm, the solid content: 30%) 240 g were homogeneously mixed. The solvent was subjected to vacuum distillation at 90° C. and 2 kPa for 1 hour using an evaporator. As a result, an organic-inorganic composite resin composition was obtained. (Example 6-1)

Synthesis Example 6-2

A hydrogenated bisphenol A (product of Japan Epoxy Resins Co., Ltd., EPICOAT YX-8000, the epoxy equivalent: 205, a liquid hydrogenated epoxy resin) 240 g and nanosilica-dispersed IPA (product of Clariant in Japan, G502-30, the particle diameter: 9 nm, the solid content: 30%) 240 g were homogeneously mixed. The solvent was subjected to vacuum distillation at 90° C. and 2 kPa for 1 hour using an evaporator. As a result, an organic-inorganic composite resin composition was obtained. (Example 6-2)

Synthesis Example 6-3

A hydrogenated bisphenol A (product of Japan Epoxy Resins Co., Ltd., EPICOAT YX-8000, the epoxy equivalent: 205, a liquid hydrogenated epoxy resin) 168 g and SANCOLLOID (product of NISSAN CHEMICAL INDUSTRIES, LTD., HZ-307M6, the particle diameter: 10 to 12 nm, the solid content: 30%) 240 g were homogeneously mixed. The solvent was subjected to vacuum distillation at 90° C. and 2 kPa for 1 hour using an evaporator. As a result, an organic-inorganic composite resin composition was obtained. (Example 6-3)

Synthesis Example 6-4

A hydrogenated bisphenol A (product of Japan Epoxy Resins Co., Ltd., EPICOAT YX-8000, the epoxy equivalent: 205, a liquid hydrogenated epoxy resin) 168 g and a polyphenylsiloxane (product of KONISHI CHEMICAL IND CO., LTD., PPSQ-E, the average molecular weight: 850, the solid content: 100%) 72 g, and IPA 168 g were homogeneously mixed. The solvent was vacuum distillation at 90° C. and 2 kPa for 1 hour using an evaporator. As a result, an organic-inorganic composite resin composition was obtained. (Example 6-4)

Synthesis Example 6-5

A hydrogenated bisphenol A (product of Japan Epoxy Resins Co., Ltd., EPICOAT YX-8000, the epoxy equivalent: 205, a liquid hydrogenated epoxy resin) 168 g and an organosilica sol (product of NISSAN CHEMICAL INDUSTRIES., LTD., methanolsilica sol, the particle diameter: 10 to 15 nm, the solid content: 30%) 240 g were homogeneously mixed. The solvent was subjected to vacuum distillation at 90° C. and 2 kPa for 1 hour using an evaporator. As a result, the mixture turned into a gel. (Example 6-5)

Synthesis Example 6-6

A hydrogenated bisphenol A (product of Japan Epoxy Resins Co., Ltd., EPICOAT YX-8000, the epoxy equivalent: 205, a liquid hydrogenated epoxy resin) 168 g and an organosilica sol (product of NISSAN CHEMICAL INDUSTRIES., LTD., IPA-ST, the particle diameter of 10 to 15 nm, the solid content: 30%) 240 g were homogeneously mixed. The solvent was subjected to vacuum distillation at 90° C. and 2 kPa for 1 hour using an evaporator. As a result, the mixture turned into a gel. (Example 6-6)

Synthesis Example 6-7

A bisphenol A (product of Japan Epoxy Resins Co., Ltd., EPICOAT 828EL, the epoxy equivalent: 184 to 194, a liquid epoxy resin) 168 g and an organosilica sol (product of NISSAN CHEMICAL INDUSTRIES., LTD., MEK-ST, the particle diameter of 10 to 15 nm, the solid content of 30%) 240 g were homogeneously mixed. The solvent was subjected to vacuum distillation at 90° C. and 2 kPa for 1 hour using an evaporator. As a result, an organic-inorganic composite resin composition was obtained. (Comparative Example 6-1)

Synthesis Example 6-8

A bisphenol A (product of Japan Epoxy Resins Co., Ltd., EPICOAT 828EL, the epoxy equivalent: 184 to 194, a liquid epoxy resin) 168 g and an organosilica sol (product of NISSAN CHEMICAL INDUSTRIES., LTD., a methanolsilica sol, the particle diameter: 10 to 15 nm, the solid content: 30%) 240 g were homogeneously mixed. The solvent was subjected to vacuum distillation at 90° C. and 2 kPa for 1 hour using an evaporator. As a result, the mixture turned into a gel. (Comparative Example 6-2)

Synthesis Example 6-9

A bisphenol A (product of Japan Epoxy Resins Co., Ltd., EPICOAT 828EL, the epoxy equivalent: 184 to 194, a liquid epoxy resin) 168 g and an organosilica sol (product of NISSAN CHEMICAL INDUSTRIES., LTD., IPA-ST, the particle diameter: 10 to 15 nm, the solid content: 30%) 240 g were homogeneously mixed. The solvent was subjected to vacuum distillation at 90° C. and 2 kPa for 1 hour using an evaporator. As a result, the mixture turned into a gel. (Comparative Example 6-3)

The compositions obtained in Synthesis Examples 6-1 to 6-9 were measured for viscosity and residual solvent amount by the following methods. Table 11 shows the results. In Synthesis Examples in which the mixture turned into a gel due to the vacuum distillation, the viscosity and the residual solvent amount could not be measured.

"Viscosity"

The compositions obtained in Synthesis Examples 6-1 to 6-9 were evaluated for viscosity at 40° C. and at a rotation speed D of 1/s, using an R/S Rheometer (product of Brookfield). A measuring jig RC 25-1 was used.

"Residual Solvent Amount"

The residual solvent was quantitated under the following measurement conditions using GC2014 (product of Shimazu Corporation).
Measurement Conditions
Column: DB-17 (product of GL Sciences Inc.)
Carrier gas: Helium
Flow rate: 1.44 mL/min
Measurement temperature: 40° C. to 270° C.

"Preparation of Cured Plate"

To each of the resin compositions (in Examples 6-1 to 6-4 and Comparative Example 6-1), stearic acid as a demolding agent was added to account for 0.5 parts relative to 100 parts by weight of the resin composition. The mixture was homogeneously mixed at 80° C. The mixture was cooled to 50° C., and then thereto a cationic polymerization initiator (product of SANSHIN CHEMICAL INDUSTRY CO., LTD., San-Aid SI-80L, the solid content: 50%) was added to account for 1 part (0.5 parts on the solid content equivalent basis) relative to 100 parts by weight of the resin composition, and the mixture was homogeneously mixed.

The obtained mixture was subjected to vacuum degassing treatment, if necessary, by heating (at 50° C. and the like). Then, the resin composition was charged into a mold and cured at 110° C. for 5 hours. As a result, a cast plate with a thickness of 1 mm was obtained.

Table 11 shows the measurement results of the Abbe number of the cast plate at 20° C.

TABLE 11

| Sample | Organic resin component | | Inorganic fine particles | | | Residual solvent amount (% by weight) | Viscosity (Pa·s) (at D = 1/s) | Abbe number |
|---|---|---|---|---|---|---|---|---|
| | Epoxy resin | content (% by weight) | Starting material | | content (% by weight) | | | |
| Example 6-1 | YX8000 | 70 | MEK-ST | Silica | 30 | 0.2 | 144 | 59.2 |
| Example 6-2 | YX8000 | 70 | G502-30 | Silica | 30 | 1.0 | 3200 | 57.0 |
| Example 6-3 | YX8000 | 70 | HZ-307M6 | Zilconia | 30 | 0.7 | 270 | 48.1 |
| Example 6-4 | YX8000 | 70 | PPSQ-E | Phenylsilica | 30 | 0.6 | 112 | 44.6 |
| Comparative Example 6-1 | 828EL | 70 | MEK-ST | Silica | 30 | 0.9 | 210 | 34.1 |
| Example 6-5 | YX8000 | 70 | Methanol silica sol | Silica | 30 | Incapable measurement | Incapable measurement | — |
| Example 6-6 | YX8000 | 70 | IPA-ST | Silica | 30 | Incapable measurement | Incapable measurement | — |
| Comparative Example 6-2 | 828EL | 70 | Methanol silica sol | Silica | 30 | Incapable measurement | Incapable measurement | — |
| Comparative Example 6-3 | 828EL | 70 | IPA-ST | Silica | 30 | Incapable measurement | Incapable measurement | — |

The results in Tables 10 and 11 show that gelling is caused during production of the composition, if the metal oxide fine particles with a pH of less than 3.5 were used. However, if the metal oxide fine particles with a pH of 3.5 or more are used, no gelling is caused and an organic-inorganic composite resin composition could be obtained.

The above-mentioned Examples 6-1 to 6-6 and Comparative Examples 6-1 to 6-3 show that the use of the metal oxide fine particles with a specific pH as the metalloxane component is preferable in order to provide a curable resin composition which is excellent in demoldability and can be produced without gelling. Specifically, it is shown that an organic-inorganic composite resin composition including an organic resin component and a metal oxide fine particle component, in which the metal oxide fine particle component is inorganic fine particles with a pH of 3.4 to 11 at 25° C. when being dispersed into a solution. The critical significance of the value range can be mentioned as follows. That is, it is shown that if the metal oxide fine particle component is inorganic fine particles with a pH of 3.4 to 11 at 25° C. when being dispersed into a solution, no gelling is caused when the resin is produced and advantageous effects are remarkably exhibited when an organic-inorganic composite resin composition is produced.

The low limit of the pH is 3.5 in G502-30 used in Example 6-2. The technical meaning of such a low limit of the value range can be clearly shown by comparison with Examples 6-5 and 6-6 in which the pH is below the low limit. In Example 6-2, the organic-inorganic composite resin composition which has a viscosity of 3200 Pa·s and a residual solvent amount of 1.0% by weight can be obtained. However, in Examples 6-5 and 6-6, gelling is caused. In Example 6-2, the organic-inorganic composite resin composition satisfies the viscosity and the residual solvent amount which are enough for continuous production. However, the compositions in Examples 6-5 and 6-6 can not be continuously produced. It is obvious that such an effect, that is, an effect of industrially producing an organic-inorganic composite resin composition which is useful in an optical application, an opto device application, a display device application, or useful as a mechanical component material, an electrical and electronic component material, is remarkable. In Examples other than Example 6-2, the metal oxide fine particle component or the organic resin component is different from that in Example 6-2. In these Examples, the effects of the present invention are more remarkably exhibited.

With respect to comparison of Example 6-1 with Comparative Example 6-1, the alicyclic epoxy compound is used as the organic resin component in Example 6-1. In this case, the resin composition had a viscosity of 114 Pa·s and a residual solvent amount of 0.2% by weight. In Comparative Example 6-1, the epoxy compound was used as the organic resin component. In this case, the resin composition had a viscosity of 210 Pa·s and a residual solvent amount of 0.9% by weight. The results in Example 6-1 and Comparative Example 6-1 show that the alicyclic epoxy compound is preferably used as the organic resin component in terms of improvement in the viscosity and the residual solvent amount.

The epoxy resin was used as the organic resin component in the above-mentioned Examples and Comparative Examples. The viscosity and the residual solvent amount of the organic-inorganic composite resin composition can be adjusted within preferable ranges through the same mechanism as the Examples and Comparative Examples, if the organic resin components are excellent in compatibility with the metal oxide fine particle component and can homogeneously disperse the metal oxide fine particle component into the organic resin, as long as the organic resin components can exhibit the operation and effects of the present invention. Therefore, it is obvious that the advantageous effects of the present invention can be exhibited if the metal oxide fine particle component is inorganic fine particles with a pH of 3.4 to 11 at 25° C. when being dispersed into a solution. At least in the case where the alicyclic compound, especially the epoxy compound is used as the organic resin component, the above-mentioned Examples and Comparative Examples sufficiently prove the advantageous effects of the present invention and support the technical meanings of the present invention.

Synthesis Example 7-1

YX-8000/SiO$_2$(MEK-ST)=70/30 (% by Weight)

A hydrogenated bisphenol A epoxy resin (product of Japan Epoxy Resins Co., Ltd., JER YX-8000, the epoxy equivalent: 205, a liquid hydrogenated epoxy resin) 168 g and organosilica sol (product of NISSAN CHEMICAL INDUSTRIES., LTD., MEK-ST, the particle diameter: 10 to 15 nm, the solid content: 30%) 240 g were homogeneously mixed. The solvent was subjected to vacuum distillation at 80° C. using an evaporator. The resin composition had a yield of 249.7 g and a viscosity of 20 Pa·s (resin composition in Example 7-6).

Synthesis Example 7-2

YX-8000/YL-7170/SiO$_2$(MEK-ST)=65/25/10 (% by Weight)

The resin composition for Example 7-6, 34.7 g, a hydrogenated bisphenol A epoxy resin (product of Japan Epoxy Resins Co., Ltd., YL-7170, the epoxy equivalent: 1000, a solid hydrogenated epoxy resin) 25 g, and the YX-8000, 41.6 g were each weighed and homogeneously mixed at 140° C. The resin composition had a yield of 101.3 g and a viscosity of 80 Pa·s (resin composition for Example 7-1).

Synthesis Example 7-3

YX-8000/SiO$_2$(MEK-ST)/YL-7217=69/30/1 (% by Weight)

The resin composition for Example 7-6, 99 g, the epoxy resin (product of Japan Epoxy Resins Co., Ltd., YL-7217, the epoxy equivalent: 437, a liquid epoxy resin (10° C. or more) 1 g were each weighed and homogeneously mixed at 50° C. The resin composition had a yield of 100 g and a viscosity of 20 Pa·s (resin composition for Example 7-2).

Synthesis Example 7-4

YX-8000/SiO$_2$(MEK-ST)/YL-7217=65/25/10 (% by Weight)

The resin composition for Example 7-6, 90 g, the epoxy resin (product of Japan Epoxy Resins Co., Ltd., YL-7217, the epoxy equivalent: 437, a liquid epoxy resin (10° C. or more) 10 g were each weighed and homogeneously mixed at 50° C. The resin composition had a yield of 100 g and a viscosity of 11 Pa·s (resin composition for Example 7-3).

Synthesis Example 7-5

YX-8000/YL-7170/SiO$_2$(MEK-ST)/YL-7217=64/25/10/1 (% by Weight)

The resin composition for Example 7-1, 99 g, the epoxy resin (product of Japan Epoxy Resins Co., Ltd., YL-7217, the epoxy equivalent: 437, a liquid epoxy resin (10° C. or more) 1 g were each weighed and homogeneously mixed at 50° C. The resin composition had a yield of 100 g and a viscosity of 78 Pa·s (resin composition for Example 7-4).

Synthesis Example 7-6

YX-8000/YL-7170/SiO$_2$(MEK-ST)/YL-7217=61/22/7/10 (% by Weight)

The resin composition for Example 7-1, 90 g, the epoxy resin (product of Japan Epoxy Resins Co., Ltd., YL-7217, the epoxy equivalent: 437, a liquid epoxy resin (10° C. or more) 10 g were each weighed and homogeneously mixed at 50° C. The resin composition had a yield of 100 g and a viscosity of 40 Pa·s (resin composition for Example 7-5).

Synthesis Example 7-7

YX-8000=100 (% by Weight)

A hydrogenated bisphenol A epoxy resin (product of Japan Epoxy Resins Co., Ltd., JER YX-8000, the epoxy equivalent: 205, a liquid hydrogenated epoxy resin) was used as the resin composition (resin composition for Comparative Example 7-1).

Synthesis Example 7-8

828EL/SiO$_2$(Silicone Oligomer PPSQ-E)=70/30 (% by Weight)

A bisphenol A epoxy resin (product of Japan Epoxy Resins Co., Ltd., JER 828EL, the epoxy equivalent: 184 to 194) 22.8 g and a silicone (product of KONISHI CHEMICAL IND CO., LTD., PPSQ-E, the number average molecular weight: 850) 9.8 g were homogeneously mixed. The resin composition had a yield of 32.6 g and a viscosity of 25 Pa·s. The unsaturated bond amount measured by NMR was 18% by weight (resin composition for Comparative Example 7-2).

Synthesis Example 7-9

828EL/JER1007/SiO$_2$(Silicone Oligomer PPSQ-E)/2021P=60/20/10/10 (% by Weight)

A bisphenol A epoxy resin (product of Japan Epoxy Resins Co., Ltd., JER 828EL, the epoxy equivalent: 184 to 194) 240.0 g, a bisphenol A epoxy resin (product of Japan Epoxy Resins Co., Ltd., JER 1007, the epoxy equivalent: 1750 to 2200) 80.0 g, and methyl ethyl ketone 100.0 g were homogeneously mixed. The solvent was subjected to vacuum distillation at 90° C. using an evaporator. The yield was 322.6 g. Thereto, CELLOXIDE (product of DAICEL CHEMICAL INDUSTRIES., LTD., 2021P) 40.0 g was mixed at 80° C., and further a silicone oligomer (product of KONISHI CHEMICAL IND CO., LTD., PPSQ-E, the number average molecular weight: 850) 4.0 g was homogeneously mixed. The resin composition had a yield of 402.6 g and a viscosity of 50 Pa·s (resin composition for Reference Example 7-1).

Synthesis Example 7-10

828 EL/SiO$_2$ (Silicone Oligomer PPSQ-E)/YL-7217=69/30/1 (% by Weight)

The resin composition for Comparative Example 7-2, 99 g, the epoxy resin (product of Japan Epoxy Resins Co., Ltd., YL-7217, the epoxy equivalent: 437, a liquid epoxy resin (10° C. or more) 1 g were each weighed and homogeneously mixed at 50° C. The resin composition had a yield of 100 g and a viscosity of 24 Pa·s (resin composition for Reference Example 7-2).

Synthesis Example 7-11

828 EL/SiO$_2$ (Silicone Oligomer PPSQ-E)/YL-7217=65/25/10 (% by Weight)

The resin composition for Comparative Example 7-2, 90 g, the epoxy resin (product of Japan Epoxy Resins Co., Ltd., YL-7217, the epoxy equivalent: 437, a liquid epoxy resin (10° C. or more) 10 g were each weighed and homogeneously mixed at 50° C. The resin composition had a yield of 100 g and a viscosity of 11 Pa·s (resin composition for Reference Example 7-3).

Synthesis Example 7-12

828 EL/JER1007/SiO$_2$ (Silicone Oligomer PPSQ-E)/2021 P/YL-7217=59/20/10/10/1 (% by Weight)

The resin composition for Reference Example 7-1, 99 g, the epoxy resin (product of Japan Epoxy Resins Co., Ltd., YL-7217, the epoxy equivalent: 437, a liquid epoxy resin (10° C. or more) 1 g were each weighed and homogeneously mixed at 50° C. The resin composition had a yield of 100 g and a viscosity of 48 Pa·s (resin composition for Reference Example 7-4).

Synthesis Example 7-13

828 EL/JER1007/SiO$_2$ (Silicone Oligomer PPSQ-E)/2021 P/YL-7217=57/18/8/7/10 (% by Weight)

The resin composition for Reference Example 7-1, 90 g, the epoxy resin(product of Japan Epoxy Resins Co., Ltd., YL-7217, the epoxy equivalent: 437, a liquid epoxy resin (10° C. or more) 10 g were each weighed and homogeneously mixed at 50° C. The resin composition had a yield of 100 g and a viscosity of 34 Pa·s (resin composition for Reference Example 7-5).

Synthesis Example 7-14

828EL=100 (% by Weight)

A bisphenol A epoxy resin (product of Japan Epoxy Resins Co., Ltd., JER 828EL, the epoxy equivalent: 184 to 194) was used as the resin composition (resin composition for Comparative Example 7-3).

(Preparation of Curable Resin Composition)

To each of the above-mentioned resin compositions, stearic acid as a demolding agent was added to account for 1 part relative to 100 parts of the resin composition. Then, the mixture was homogeneously mixed at 80° C.

The mixture was cooled to 50° C., and then thereto a cationic polymerization initiator (product of SANSHIN CHEMICAL INDUSTRY CO., LTD., San-Aid SI-80L, the solid content: 50%) was added to account for 1 part (0.5 parts on the solid content equivalent basis) relative to 100 parts of the resin composition. Then, the mixture was homogeneously mixed.

(Molded Product)

The above-mentioned curable resin composition was subjected to vacuum degassing treatment, if necessary, by heating (at 50° C. and the like). Then, a film of the curable resin composition was formed. The curable resin composition was cured at 110° C. for 5 hours, while the vacuum treatment was performed if the existence of the solvent caused bubbles. As a result, a cast plate with a thickness of 1 mm was obtained.

The obtained resin compositions and molded products were evaluated for the following physical properties.

Table 12 shows the results.

"Viscosity"

The resin compositions before addition of the demolding agent and the curing agent were evaluated for viscosity at 40° C. and at a rotation speed D of 1/s using an R/S Rheometer (product of Brookfield).

A measuring jig RC 25-1 was used for measuring the viscosity of 20 Pa·s or more and a measuring jig RC 50-1 was used for measuring the viscosity of less than 20 Pa·s.

The resin composition whose viscosity at D of 1/s could not be measured was evaluated by extrapolating a value at D of 5 to 100/s.

"Evaluation of Refractive Index and Abbe Number"

The resin compositions were evaluated for refractive index at 20° C. using a refractometer (product of ATAGO CO., LTD., DR-M2).

(Cured product): The above-mentioned molded products with a thickness of 1 mm were evaluated for refractive index and Abbe number.

"Evaluation of Transparency (Transmittance)"

Transmittance: The cured products were evaluated for transmittance at a wavelength of 500 nm using an absorption spectrometer (product of Shimazu Corporation, spectrophotometer UV-3100).

(Cured product): The above-mentioned molded products with a thickness of 1 mm were evaluated for transmittance.

"Evaluation of Strength (Bending Strength)"

(Cured plate): The resin composition was subjected to vacuum degassing treatment, if necessary, by heating (at 45° C. and the like). Then, the composition was charged into a mold and cured at 150° C. for 10 minutes in an oven. As a result, a resin cured plate with a thickness of 3 mm was obtained.

(Strength measurement): The resin cured plate was measured for thermal properties and mechanical properties (bending strength) according to JIS K6911.

TABLE 12

| Sample | Molded state | YX-8000 content (% by weight) | YL-7170 content (% by weight) | 828EL content (% by weight) | JER1007 content (% by weight) | 2021P content (% by weight) | YL-7217 content (% by weight) | Starting material silica | Silica content (% by weight) |
|---|---|---|---|---|---|---|---|---|---|
| Example 7-1 | 3 mm plate | 65 | 25 | 0 | 0 | 0 | 0 | MEK-ST | 10 |
| Example 7-2 | 3 mm plate | 69 | 0 | 0 | 0 | 0 | 1 | MEK-ST | 30 |
| Example 7-3 | 3 mm plate | 65 | 0 | 0 | 0 | 0 | 10 | MEK-ST | 25 |
| Example 7-4 | 3 mm plate | 64 | 25 | 0 | 0 | 0 | 1 | MEK-ST | 10 |
| Example 7-5 | 3 mm plate | 61 | 22 | 0 | 0 | 0 | 10 | MEK-ST | 7 |
| Reference Example 7-1 | 3 mm plate | 0 | 0 | 60 | 20 | 10 | 0 | PPSQ-E | 10 |
| Reference Example 7-2 | 3 mm plate | 0 | 0 | 69 | 0 | 0 | 1 | PPSQ-E | 30 |
| Reference Example 7-3 | 3 mm plate | 0 | 0 | 65 | 0 | 0 | 10 | PPSQ-E | 25 |
| Reference Example 7-4 | 3 mm plate | 0 | 0 | 59 | 20 | 10 | 1 | PPSQ-E | 10 |
| Reference Example 7-5 | 3 mm plate | 0 | 0 | 57 | 18 | 7 | 10 | PPSQ-E | 8 |
| Example 7-6 | 3 mm plate | 70 | 0 | 0 | 0 | 0 | 0 | MEK-ST | 30 |
| Comparative Example 7-1 | 3 mm plate | 100 | 0 | 0 | 0 | 0 | 0 | — | 0 |
| Comparative Example 7-2 | 3 mm plate | 0 | 0 | 70 | 0 | 0 | 0 | PPSQ-E | 30 |
| Comparative Example 7-3 | 3 mm plate | 0 | 0 | 100 | 0 | 0 | 0 | — | 0 |

| Sample | Refractive index (486 nm) | Refractive index (589 nm) | Refractive index (656 nm) | Abbe number | Viscosity (Pa·s at 1D(1/s)) | Transmittance (%) (500 nm) | Bending strength (MPa) |
|---|---|---|---|---|---|---|---|
| Example 7-1 | 1.5164 | 1.5101 | 1.5077 | 58.6 | 80 | 83.8 | 90.9 |
| Example 7-2 | 1.5109 | 1.5049 | 1.5023 | 58.7 | 20 | 83.4 | 42.2 |
| Example 7-3 | 1.5109 | 1.5048 | 1.5023 | 58.7 | 11 | 83.9 | 63.3 |
| Example 7-4 | 1.5108 | 1.5047 | 1.5023 | 59.4 | 78 | 82.9 | 86.3 |
| Example 7-5 | 1.5179 | 1.5116 | 1.5090 | 57.5 | 40 | 84.6 | 54.0 |
| Reference Example 7-1 | 1.5943 | 1.5816 | 1.5766 | 32.9 | 50 | 89.3 | 103.9 |
| Reference Example 7-2 | 1.5981 | 1.5850 | 1.5796 | 31.6 | 24 | 89.5 | 45.7 |
| Reference Example 7-3 | 1.5943 | 1.5808 | 1.5759 | 33.2 | 11 | 89.4 | 52.1 |
| Reference Example 7-4 | 1.5941 | 1.5814 | 1.5796 | 32.7 | 48 | 89.7 | 151.9 |
| Reference Example 7-5 | 1.5883 | 1.5772 | 1.5721 | 35.6 | 34 | 90.1 | 135.5 |
| Example 7-6 | 1.5091 | 1.5030 | 1.5006 | 59.2 | 20 | 82 | 26.4 |
| Comparative Example 7-1 | 1.5201 | 1.5127 | 1.5105 | 53.4 | 1 | 89.1 | 35.0 |
| Comparative Example 7-2 | 1.5984 | 1.5851 | 1.5798 | 31.5 | 25 | 89.9 | 29.6 |
| Comparative Example 7-3 | 1.6022 | 1.5890 | 1.5839 | 32.2 | 1 | 88.9 | 38.4 |

The above-mentioned Examples 7-1 to 7-6 and Comparative Examples 7-1 to 7-3, and Reference Examples 7-1 to 7-5 show that the mixing of the flexible component is preferable if a cured resin composition which can provide a cured product excellent in bending resistance strength. Specifically, it is shown that an organic-inorganic composite resin composition including a metal oxide fine particle component and an organic resin component, in which the organic-inorganic composite resin composition includes a flexible component, is preferable.

Synthesis Example 8-1

Synthesis of Nanocomposite A

Into a 3 L four-necked flask equipped with a gas inlet, a condenser, and a stirring bar, a liquid hydrogenated bisphenol A epoxy resin (trade name "EPICOAT YX 8000", product of Japan Epoxy Resins Co., Ltd.) 403 g, a solid hydrogenated bisphenol A epoxy resin (trade name "EPICOAT YL7170", product of Japan Epoxy Resins Co., Ltd.) 268.66 g, and butanol 671.66 g were charged. The mixture was homogeneously stirred at 80° C. Then, the mixture was cooled to 50° C., and thereto phenyltrimethoxysilane 167.45 g, 3-glycidoxypropyl-trimethoxysilane 133.06 g, and tetramethoxysilane 212.24 g were charged, and the mixture was homogeneously stirred. Thereto, water 133.15 g was charged and the mixture was homogeneously stirred. Then, trimethyl borate 13.71 g was charged and the mixture was homogeneously stirred and heated.

The mixture was stirred at 85 to 90° C. for 6 hours, and then, methanol, water, and butanol were removed as volatile components under reduced pressure, and the mixture was cooled. As a result, a nanocomposite A that is a transparent and color less viscous liquid was obtained. The nanocomposite A had a yield of 1020 g, and a viscosity of 203 Pa·s at 40° C.

Synthesis Example 8-2

Synthesis of Nanocomposite B

Into a 3 L four-necked flask equipped with a gas inlet, a condenser, and a stirring bar, a liquid hydrogenated bisphenol A epoxy resin (trade name "EPICOAT YX 8000", product of Japan Epoxy Resins Co., Ltd.) 425.92 g, a solid hydrogenated bisphenol A epoxy resin (trade name "EPICOAT YL7170", product of Japan Epoxy Resins Co., Ltd.) 283.95 g, and butanol 382.24 g were charged The mixture was homogeneously stirred at 80° C. Then, the mixture was cooled to 50° C., and thereto phenyltrimethoxysilane 103.24 g, 3-glycidoxypropyl-trimethoxysilane 82.03 g, and tetramethoxysilane 132.08 g were charged, and the mixture was homogeneously stirred. Thereto, water 82.09 g was charged and the mixture was homogeneously stirred. Then, trimethyl borate 8.45 g was charged and the mixture was homogeneously stirred and heated. The mixture was stirred at 85 to 90° C. for 6 hours, and then, methanol, water, and butanol were removed as volatile components under reduced pressure, and the mixture was cooled. As a result, a nanocomposite B that is a transparent and color less viscous liquid was obtained. The nanocomposite B had a yield of 962 g and a viscosity of 105 Pa·s at 40° C.

Synthesis Example 8-3

Sample C

A hydrogenated bisphenol A (product of Japan Epoxy Resins Co., Ltd., YX-8000, the epoxy equivalent: 205) 168 g and an organosilica sol (product of NISSAN CHEMICAL INDUSTRIES., LTD., MEK-ST, the particle diameter: 10 to 20 nm, the solid content: 30%) 240 g were evaporated at 80° C. (finally, at 30 torr or less for 30 minutes). The resin composition had a yield of 249.7 g and a viscosity of 38 Pa·s.

(Resin Composition)

A demolding agent (stearic acid and the like) was added to account for a specific proportion (0.5% and the like) to the total weight, if necessary, by heating (80° C. and the like). Then, the mixture was homogeneously mixed. The mixture was cooled to 50° C., and thereto a cationic polymerization initiator (product of SANSHIN CHEMICAL INDUSTRY CO., LTD., San-AidSI-80L, the solid content: 50% and the like) was added in such a way that the initiator has a solid content concentration of 0.5%. Then, the mixture was homogeneously mixed.

(Molded Product)

The resin composition was subjected to vacuum degassing treatment, if necessary, by heating (at 50° C. and the like), and then cured at 110° C. for 5 hours. As a result, a cast plate with a thickness of 1 mm was obtained.

"Transparency (Haze, Transmittance)"

Transparency (1): The transparency was evaluated using a turbidimeter (product of Nippon Denshoku, NDH 2000).

(Curable liquid): The resin solution was charged into a cell with an optical path length of 1 cm and evaluated for haze.

(Cured product): The molded product with a thickness of 1 mm was evaluated for haze.

(Evaluation): The curable liquid or cured product having a haze of 5 or more was evaluated as bad. The curable liquid or cured product having a haze of less than 5 and 2 or more was evaluated as average. The curable liquid or cured product having a haze of less than 2 was evaluated as good.

Transparency (2): The transparency was evaluated using an absorption spectrometer (product of Shimazu Corporation, spectrophotometer UV-3100).

(Curable liquid): The resin solution was charged into a cell with an optical path length of 1 cm and evaluated for transmittance.

(Cured product): The molded product with a thickness of 1 mm was irradiated with light at a wavelength of 500 nm to be evaluated for transmittance.

(Evaluation) The cured product having a transmittance of 75% or more was evaluated as good. The cured product having a transmittance of less than 75% was evaluated as bad.

"Viscosity Changing Rate"

The resin composition was evaluated for viscosity at 40° C. and at a rotation speed D of 1/s using an R/S Rheometer (product of Brookfield). A measuring jig RC 25-1 was used for measuring the viscosity of 20 Pa·s or more and a measuring jig RC 50-1 was used for measuring the viscosity of less than 20 Pa·s. The resin composition was evaluated for viscosity just after being produced. With respect to the storage stability, the change in viscosity of the resin composition after 3 days preservation at 20° C. was evaluated. What percentage the viscosity after the preservation accounts for, relative to 100% of the viscosity of the resin before addition of the initiator and the demolding agent, was evaluated.

"Hardness"

A certain level of material hardness is attained at a temperature of 150° C. or less, where a side reaction occurs, for a short time, as a necessary condition for continuous production of a transparent material. The resin composition was cured to have a thickness of 1 mm on a SUS304 substrate at 120° C. for 2.5 minutes and cooled to 30° C. within 30 seconds. Then, a load of 706.5 g was applied to a columnar glass bar with a diameter of 3 mm, and thereby the hardness was measured. If a load of 706.5 g is applied to a glass bar with a diameter of 3 mm, a pressure of 1 kgf/cm² is obtained.
Good: No change in shape (10% or less of shape change)
Average: Gel state and change in shape (10% or more of shape change)
Bad: Liquid state and no curing
<Adhesiveness>

A certain level of material hardness is attained at a temperature of 150° C. or less, where a side reaction occurs, for a short time, as a necessary condition for continuous production of a transparent material. Demolding easiness was evaluated in the following procedures. The resin composition was cured to have a thickness of 1 mm on a SUS304 substrate at 120° C. for 2.5 minutes and cooled to 30° C. within 30 seconds. Then, a pressure of 40 kgf/cm² was applied to the interface between the resin and the SUS304 using a cutter (product of NT Incorporated, the body model number: L-500, the edge model number: BL-150P). The peel strength of 40 kgf/cm² was calculated as a value obtained when a load of 1.5 kg was applied to the interface between the resin with a length of 2 cm and the SUS304 using the cutter. The area to which the load is applied by a cutter edge was 0.04 cm².

The strength was evaluated on a scale of 1 to 5. 5 (strong, difficulty in peeling) >4>3>2>1 (weak, easy in peeling)
"Residual on Substrate"

The cured resin which remained on the SUS 304 was determined by eye observation when the adhesiveness was evaluated.
Good: No residue was observed.
Bad: Residue was observed.

(Demolding Agent)
Moldwiz INT-1850HT (product of Axel Plastics Research Laboratories, Inc.) a mixture of a glyceride with a copolymer of an organophosphate ester and a fatty acid.
Moldwiz INT-1846N2 (product of Axel Plastics Research Laboratories, Inc.), a mixture of a derivative of an organic acid, a glyceride and a copolymer of a synthetic resin.
FTERGENT 100 (product of NEOS COMPANY LIMITED), a fluorine surfactant, an anionic surfactant, sodium sulfonate.
FTERGENT 212MH (product of NEOS COMPANY LIMITED), a fluorine surfactant, a nonionic surfactant, Rf group at one end/$CH_3$ at the other end type,
FTERGENT 310 (product of NEOS COMPANY LIMITED), a fluorine surfactant, a cationic surfactant, an ammonium salt.
FTERGENT 207S (product of NEOS COMPANY LIMITED), a nonionic surfactant, Rf group at one end/stearyl alcohol at the other end type.
Stearic acid
Magnesium stearate
Lauric acid (dodecanoic acid)
Octanoic acid
2-ethyl hexanoic acid
2-ethyl-1-hexanol The results in Table 13 show that the use of the curable resin composition containing a specific carboxylic acid is preferable in order to produce a curable resin composition excellent in demoldability after curing. Specifically, it is shown that a curable resin composition including an organic resin, in which the curable resin composition contains at least one compound selected from the group consisting of alcohols

TABLE 13

| | | | | | Evaluation of curable liquid | | Viscosity change rate 3 days later (%) | Curing characteristics (120° C. 2.5 min) | | | | Adhesiveness to glass (demolding property) |
|---|---|---|---|---|---|---|---|---|---|---|---|---|
| | | | | | Transparency (1) | | | Transparency (2) | | | Residue | |
| Base | Initiator | Solid content concentration (%) | Demolding agent | Concentration (%) | Curable liquid | Cured product | | Curable liquid | Cured product | Hardness | on substrate | |
| A | SI-80L | 0.5 | Stearic acid | 0.1 | Good | Good | 172 | Good | Good | Good | Good | 4 |
| A | SI-80L | 0.5 | Stearic acid | 0.5 | Good | Good | 165 | Good | Good | Good | Good | 3 |
| A | SI-80L | 0.5 | Stearic acid | 2 | Good | Good | 158 | Good | Good | Good | Good | 1 |
| A | SI-80L | 0.5 | Stearic acid | 10 | Bad | Bad | — | Bad | Bad | — | — | — |
| A | — | — | — | — | Good | Good | 165 | Good | Good | Bad | Bad | — |
| A | SI-80L | 0.5 | — | — | Good | Good | 175 | Good | Good | Average | Bad | — |
| A | SI-80L | 0.5 | INT-1850HT | 1 | Good | Good | 364 | Good | Good | Good | Good | 5 |
| A | SI-80L | 0.5 | FTERGENT 100 | 1 | Bad | Bad | — | Bad | Bad | Average | Bad | — |
| A | SI-80L | 0.5 | FTERGENT 310 | 1 | Good | Good | 182 | Good | Good | Bad | Bad | — |
| B | SI-60L | 0.5 | INT-1850HT | 1 | Good | Good | 435 | Good | Good | Good | Good | 5 |
| B | SI-60L | 0.5 | INT-1846N2 | 1 | Good | Good | 263 | Good | Good | Bad | Bad | — |
| B | SI-60L | 0.5 | Stearic acid | 1 | Good | Good | 160 | Good | Good | Good | Good | 2 |
| C | SI-80L | 0.5 | INT-1850HT | 1 | Good | Good | 170 | Good | Good | Good | Good | 4 |
| C | SI-80L | 0.5 | INT-1846N2 | 1 | Good | Good | — | Good | Good | Bad | — | — |
| C | SI-80L | 0.5 | Stearic acid | 1 | Good | Good | 142 | Good | Good | Good | Good | 1 |
| C | SI-80L | 0.5 | Stearic acid Mg | 1 | Good | Good | — | Good | Good | Good | Good | 2 |
| C | SI-80L | 0.5 | Lauric acid | 1 | Good | Good | 133 | Good | Good | Good | Good | 4 |
| C | SI-80L | 0.5 | Octanoic acid | 1 | Good | Good | — | Good | Good | Good | Good | 3 |
| C | SI-80L | 0.5 | 2-ethyl hexanoic acid | 1 | Good | Good | 130 | Good | Good | Good | Good | 3 |
| C | SI-80L | 0.5 | 2-ethyl hexanol | 1 | Good | Good | 125 | Good | Good | Good | Good | 2 |

The curing agents and demolding agents in Table 13 are as follows.
(Curing Agent)
Cationic polymerization initiator: San-Aid SI-60L (product of SANSHIN CHEMICAL INDUSTRY Co., Ltd.), an aromatic sulfonium salt. Cationic polymerization initiator: San-Aid SI-80L (product of SANSHIN CHEMICAL INDUSTRY Co., Ltd.), an aromatic sulfonium salt.

containing 8 to 36 carbon atoms, carboxylic acids, carboxylic acid esters, and carboxylic acid salts.

Synthesis Example 9-1

Into a 500 mL four-necked flask equipped with a gas inlet, a condenser, and a stirring bar, a liquid bisphenol A epoxy resin (trade name "EPICOAT 828EL", product of Japan Epoxy Resins Co., Ltd.) 168.41 g, propylene glycol methyl ether acetate 168.41 g, ion exchange water 14.31 g were charged. The mixture was sufficiently stirred at a room temperature. After the mixture became a homogeneous solution, thereinto phenyltrimethoxysilane 41.99 g, 3-glycidoxypropyl trimethoxysilane 33.36 g, and triethyl phosphate 0.38 g were added. The mixture was stirred at 90 to 95° C. for 8 hours under reflux. Then, this reaction liquid was cooled to 60° C. or less, and thereto ion exchange water 19.08 g was added to form a homogeneous solution. Thereto, tetramethoxysilane 53.72 g and triethyl phosphate 0.38 g were added. The mixture was stirred at 90 to 95° C. for 6 hours under reflux. Successively, methanol and propylene glycol methyl ether acetate which are volatile components were removed under reduced pressure, and after cooling, a nanocomposite A that is a transparent and color less viscous liquid was obtained. The nanocomposite A had a yield of 240 g, an epoxy equivalent of 232 g/mol, a metal oxide fine particle content of 20.3% by weight, and a viscosity at 40° C. of 45 Pa·s.

Synthesis Example 9-2

Into a 500 mL four-necked flask equipped with a gas inlet, a condenser, and a stirring bar, a fluorene epoxy resin (trade name "ONCOAT EX-1010", product of Osaka G as Chemicals Co., Ltd.) 126.31 g, a liquid bisphenol A epoxy resin (trade name "EPICOAT 828EL", product of Japan Epoxy Resins Co., Ltd.) 42.10 g, propylene glycol methyl ethyl acetate 168.41 g, and ion exchange water 14.31 g were charged. The mixture was sufficiently stirred at a room temperature. After the mixture became a homogeneous solution, thereinto phenyltrimethoxysilane 41.99 g, 3-glycidoxypropyl trimethoxysilane 33.36 g, and trimethoxyboron 0.38 g were added. The mixture was stirred at 90 to 95° C. for 8 hours under reflux. Then, this reaction liquid was cooled to 60° C. or less, and thereto ion exchange water 19.08 g was added to form a homogeneous solution. Thereto, tetramethoxysilane 53.72 g and trimethoxyboron 0.38 g were added. The mixture was stirred at 90 to 95° C. for 6 hours under reflux. Successively, methanol and propylene glycol methyl ether acetate which are volatile components were removed under reduced pressure, and after cooling, a nanocomposite B that is a transparent and color less viscous liquid was obtained. The nanocomposite B had a yield of 238 g, an epoxy equivalent of 257 g/mol, a metal oxide fine particle content of 20.1% by weight, and a viscosity at 40° C. of 120 Pa·s.

Synthesis Example 9-3

Into a 500 mL four-necked flask equipped with a gas inlet, a condenser, and a stirring bar, a fluorene epoxy resin (trade name "ONCOAT EX-1020", product of Osaka G as Chemicals Co., Ltd.) 101.20 g, a liquid bisphenol A epoxy resin (trade name "EPICOAT 828EL", product of Japan Epoxy Resins Co., Ltd.) 101.20 g, diglyme 202.4 g, and ion exchange water 12.26 g were charged. The mixture was sufficiently stirred at a room temperature. After the mixture became a homogeneous solution, thereinto n-hexyltrimethoxysilane 39.01 g, 2-(3,4-epoxycyclohexyl)ethyltrimethoxysilane 27.94 g, trimethoxyboron 0.31 g were added. The mixture was stirred at 90 to 95° C. for 8 hours under reflux. Then, this reaction liquid was cooled to 60° C. or less, and thereto ion exchange water 4.09 g was added to form a homogeneous solution. Thereto, tetramethoxysilane 11.51 g and trimethoxyboron 0.08 g were added. The mixture was stirred at 90 to 95° C. for 6 hours under reflux. Successively, methanol and diglyme which are volatile components were removed under reduced pressure, and after cooling, a nanocomposite C that is a transparent and color less viscous liquid was obtained. The nanocomposite C had a yield of 252 g, an epoxy equivalent of 229 g/mol, a metal oxide fine particle content of 19.8% by weight and a viscosity at 40° C. of 183 Pa·s.

Synthesis Example 9-4

Into a 500 mL four-necked flask equipped with a gas inlet, a condenser, and a stirring bar, a liquid hydrogenated bisphenol A epoxy resin (trade name "EPICOAT YX8000", product of Japan Epoxy Resins Co., Ltd.) 168.41 g, ethyl cellosolve 168.41 g, and ion exchange water 14.31 g were charged. The mixture was sufficiently stirred at a room temperature. After the mixture became a homogeneous solution, thereinto phenyltrimethoxysilane 41.99 g, 3-glycidoxypropyl trimethoxysilane 33.36 g, and trimethoxyboron 0.38 g were added. The mixture was stirred at 90 to 95° C. for 8 hours under reflux. Then, this reaction liquid was cooled to 60° C. or less, and thereto ion exchange water 19.08 g was added to form a homogeneous solution. Thereto, tetramethoxysilane 53.72 g and trimethoxyboron 0.38 g were added. The mixture was stirred at 90 to 95° C. for 6 hours under reflux. Successively, methanol and ethyl cellosolve which are volatile components were removed under reduced pressure, and after cooling, a nanocomposite D that is a transparent and color less viscous liquid was obtained. The nanocomposite D had a yield of 238 g, an epoxy equivalent of 257 g/mol, a metal oxide fine particle content of 20.1% by weight and a viscosity at 40° C. of 21 Pa·s.

Synthesis Example 9-5

Into a 500 mL four-necked flask equipped with a gas inlet, a condenser, and a stirring bar, a liquid bisphenol A epoxy resin (trade name "EPICOAT 828EL", product of Japan Epoxy Resins Co., Ltd.) 168.41 g, propylene glycol methyl ether acetate 168.41 g, and ion exchange water 33.39 g were charged. The mixture was sufficiently stirred at a room temperature. After the mixture became a homogeneous solution, thereinto tetramethoxysilane 53.72 g, phenyltrimethoxysilane 41.99 g, 3-glycidoxypropyl trimethoxysilane 33.36 g, triethyl phosphate 0.76 g were added. The mixture was stirred at 90 to 95° C. for 12 hours under reflux. Successively, methanol and propylene glycol methyl ether acetate which are volatile components were removed under reduced pressure, and after cooling, a nanocomposite E that is a transparent and color less viscous liquid was obtained. The nanocomposite E had a yield of 240 g, an epoxy equivalent of 231 g/mol, an inorganic particle content of 20.2% by weight and a viscosity at 40° C. of 42 Pa·s.

Figure 2:
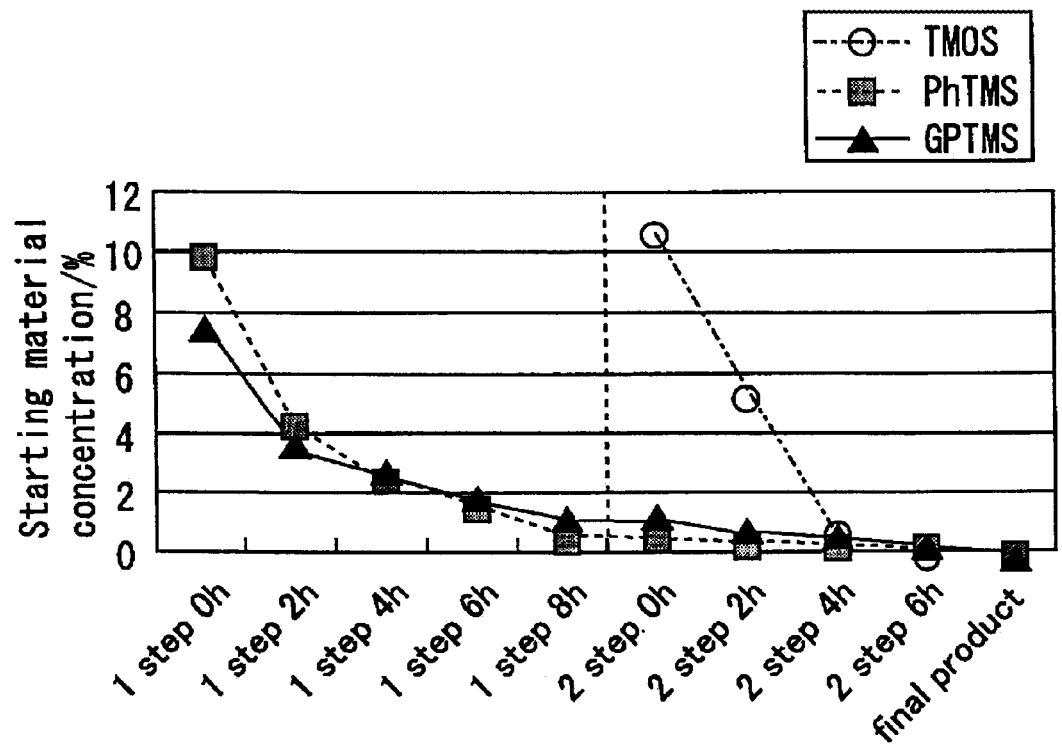
FIG. 2 is a diagram showing starting material concentrations as a function of reaction steps in Synthesis Example 9-1.
Figures 3, 4:
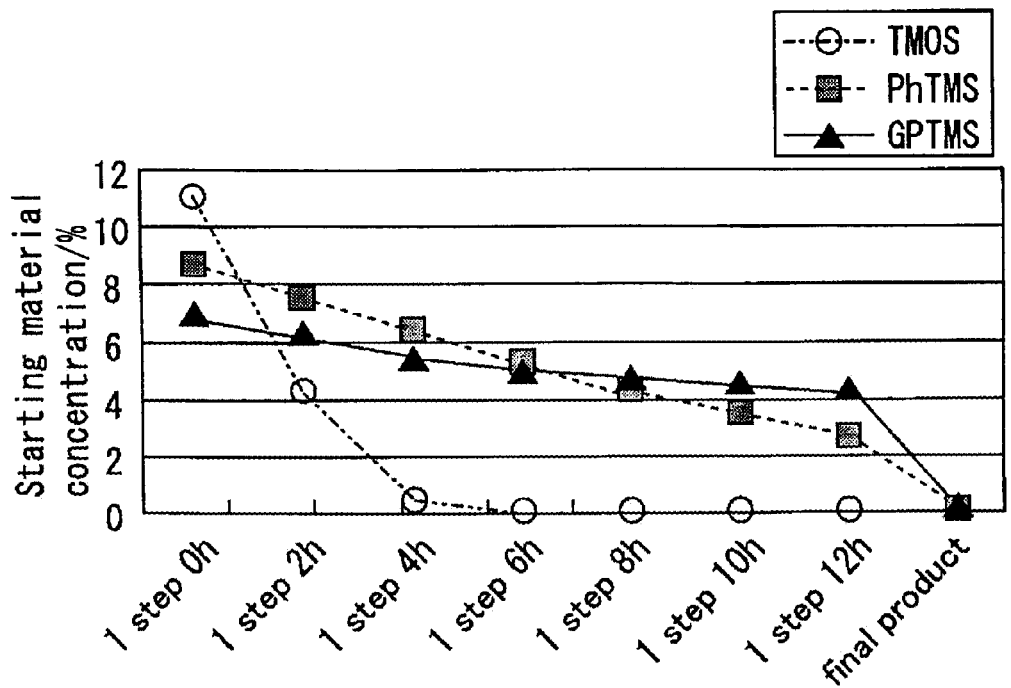
FIG. 3 is a diagram showing starting material concentrations as a function of reaction steps in Synthesis Examples 9-5.
FIG. 4 is a picture to show whether or not characters can be clearly observed through the resin cured plates obtained in Example 9-1, Comparative Examples 9-1 and 9-2 and placed on the paper with the characters.

FIGS. 2 and 3 show results obtained by tracking the progress of the reactions in Synthesis Examples 9-1 and 9-5, respectively. In Synthesis Example 9-1 (FIG. 2), a mixture of phenyl trimethoxysilane (PhTMS) with 3-glycidyloxypropyl trimethoxysilane (GPTMS), which has a low hydrolysis condensation rate, was hydrolyzed and condensed in the first step. Then, in the second step, tetramethoxysilane (TMOS) having a high hydrolysis condensation rate was added to successively perform the hydrolysis condensation reaction.

Every starting material could be hydrolyzed at a high reaction rate.

However, in Synthesis Example 9-5 (FIG. 3), all metal alkoxide compounds were charged in one portion regardless of rate of the hydrolysis condensation to be subjected to the reaction. Only TMOS having a high hydrolysis rate was hydrolyzed at a higher rate than that in Synthesis Example 9-1. The reaction rate of the metal alkoxide having a low hydrolysis rate, especially the reaction rate of the GPTMS was reduced.

Examples 9-1, Comparative Examples 9-1 to 9-4 and Reference Examples 9-1 and 9-2

Into a flask equipped with a gas inlet decompression device and a stirring bar, three different resin compositions mentioned in Synthesis Examples 9-1 to 9-5, methylhexahydrophthalic anhydride (trade name "MH700G", product of New Japan Chemical co., ltd.) as a curing agent, a compound represented by the following formula (1) and a polycondensation product of o-cresol, β-naphthol, and formalin (trade name "CBN", product of NIPPON KAYAKU CO., LTD.) as a curing agent, and triphenyl phosphine as a curing accelerator were charged at proportions shown in Table 14, respectively, and mixed at 60 to 80° C. Then, the mixture was subjected to vacuum degassing. As a result, a more homogeneous epoxy resin composition was obtained.

[Formula 8]

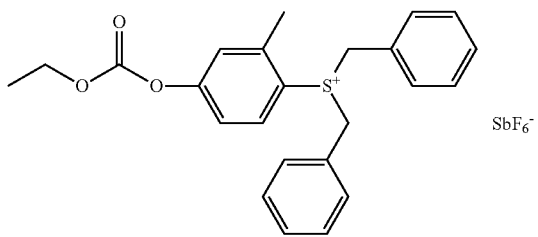

(1)

The compound represented by the above-mentioned formula (1) was prepared in accordance with Japanese Patent No. 2598704. Then, the above-mentioned composition was charged into a mold and cured in an oven at 100° C. for 1 hour and further cured at 140° C. for 3 hours to obtain a transparent and color less cured product with a thickness of 1 mm (also referred to as resin cured plate). The resin obtained in the above-mentioned manner was subjected to small angle X-ray scattering analysis to measure a particle size distribution of the metal oxide fine particles in the resin composition. The small angle X-ray scattering spectrum was measured using an X-ray diffraction equipment "RINT-2400," product of Rigaku Denki Co., Ltd. Incident X-ray was converted to monochrome through a multilayer mirror monochromator and further passed through three slits, and then it was irradiated to the resin cured plate. Then, scattered X-rays were detected with a scintillation counter installed at a camera length of 250 mm through a vacuum path. Detailed conditions of measurement are as follows.

X-ray used: CuKα
Tube voltage, tube current: 40 kV, 200 mA
Operation method: Fixed time method
Measurement method: Transmission method (2θ separate operation), a covered scanning angle of 2θ, a step interval of 0.1 to 5.0 degrees, 0.01 degrees
Counting time: 30 minutes Based on the scattering profile obtained by this measurement, a Guinier's plot was prepared by Fankuchen method to calculate a radius of inertia. The particle diameter distribution was calculated on the assumption that the geometrical shape of the particle is a sphere. Based on the area of the particle size distribution curve, the content of the particles with a diameter of 30 nm or less was measured.

As an evaluation for optical characteristics, the resin cured plate was measured for refractive index for the D-line at 20° C. ($n_D^{20}$) by Multi-wavelength Abbe refractometer "DR-M2" produced by ATAGO Co., LTD. Then, based on the measured refractive indexes at 486 nm, 589 nm and 656 nm, the Abbe number for the D-line at 20° C. ($v_D^{20}$) was calculated. The cured plate was measured for total light transmittance and turbidity using a calorimeter "Σ 90 system" produced by Nippon Denshoku Industries, Co., Ltd.

Further, the resin cured plate was evaluated for moisture resistance as follows: the resin cured plate was kept at 121° C. and 0.2 Mpa in a saturated water vapor environment for 24 hours using a pressure cooker. Based on the change in weight, the moisture absorptivity was measured. Then, the sample after the treatment was kept at 140° C. under inert gas atmosphere for 200 hours and checked for change in appearance and change rates of the total light transmittance and the turbidity. The cured plates in which change in appearance such as a crack was not observed and the change rates of the total light transmittance and the turbidity were each 10% or less were evaluated as good, and other plates were evaluated as bad.

TABLE 14

| | | Comparative Example 9-1 | Comparative Example 9-2 | Reference Example 9-1 | Reference Example 9-2 | Example 9-1 | Comparative Example 9-3 | Comparative Example 9-4 |
|---|---|---|---|---|---|---|---|---|
| Nanocomposite A | | — | 99.0 | — | — | — | 62.6 | 57.9 |
| Nanocomposite B | | — | — | 99.0 | — | — | — | — |
| Nanocomposite C | | — | — | — | 99.0 | — | — | — |
| Nanocomposite D | | — | — | — | — | 99.0 | — | — |
| Nanocomposite E | | 99.0 | — | — | — | — | — | — |
| Curing agent A | | 1.0 | 1.0 | 1.0 | 1.0 | 1.0 | — | — |
| Curing agent B | | — | — | — | — | — | 37.4 | 43.1 |
| Curing agent C | | — | — | — | — | — | — | — |
| Curing accelerator | | — | — | — | — | — | 1.0 | 1.0 |
| Particle size distribution | <30 nm content (%) | 75 | 95 | 85 | 88 | 93 | 95 | 95 |
| Optical physical properties | $n_D^{20}$ | 1.576 | 1.576 | 1.656 | 1.657 | 1.516 | 1.546 | 1.616 |
| | $v_D^{20}$ | 33.9 | 33.9 | 20.3 | 20.5 | 53.2 | 43.6 | 27.1 |
| | Total light transmittance (%) | 78.1 | 90.1 | 88.7 | 89.7 | 92.3 | 89.2 | 76.9 |
| | Turbidity (%) | 30.3 | 15.2 | 3.9 | 2.7 | 7.6 | 15.1 | 13.3 |

TABLE 14-continued

|  |  | Comparative Example 9-1 | Comparative Example 9-2 | Reference Example 9-1 | Reference Example 9-2 | Example 9-1 | Comparative Example 9-3 | Comparative Example 9-4 |
|---|---|---|---|---|---|---|---|---|
| Moisture resistance | PCT moisture absorptivity (%) | 0 | 0 | 0 | 0 | 0 | 2.9 | 1.5 |
|  | Heat resistance | Initial value Bad | Good | Good | Good | Good | Bad | Bad |

Curing agent A: the compound represented by the above formula (1)
Curing agent B: 3-methyl-hexahydrophthalic anhydride (trade name "NH700G", product of New Japan Chemical co., ltd.) Curing agent C: a polycondensation product of o-cresol, β-naphthol, and formalin (trade name "CBN", product of NIPPON KAYAKU CO., LTD.)
Curing accelerator: triphenylphosphine
Heat resistance: Whether or not the change rates of the total light transmittance and the turbidity after the sample is left at 140° C. for 1000 hours are each within ±10%.

The results in Table 14 show that in every resin composition in Examples, the content of particles with a diameter of 30 nm or less is 80% or more and the cured plates thereof each show a high total light transmittance and a low turbidity. In addition, in every resin composition in Examples, no moisture absorption was observed even after the moisture absorption test, and no change in appearance and optical characteristics was observed even after the heat exposure.

In Comparative Example 9-1, the content of particles with a diameter of 30 nm or less is 80% or less in the resin composition, and the total light transmittance and the turbidity of the cured plate were insufficient in an optical element application. Each of the resin compositions in Comparative Example 9-3 and 9-4 had a turbidity lower than that in Comparative Example 9-1. In addition, comparison of Comparative Examples 9-3 and 9-4 with Comparative Example 9-2 shows that no moisture absorption was observed even after the moisture resistance test in Comparative Example 9-2 and the appearance and the optical characteristics were not changed even after the heat exposure although the same nanocomposite A was used in Comparative Examples 9-2 to 9-4. Such a result shows that the curing agent, the thermal-latent cationic generator, used in Comparative Example 9-2, can form a cured product excellent in moisture resistance and can be more preferably used in an optical element application.

FIG. 4 is a picture to show whether or not characters can be clearly observed through the resin cured plates obtained in Example 9-1, Comparative Examples 9-1 and 9-2 and placed on the paper with the characters. In FIG. 4, the left cured plate is the cured plate in Example 9-1 (the turbidity is 7.6%) and the center cured plate is the cured plate in Comparative Example 9-2 (the turbidity is 15.2%) and the right cured plate is the cured plate in Comparative Example 9-1 (the turbidity is 30.3%). The images on which the left and center cured plates each having a turbidity of less than 20% are put are not different from those on which no cured plates are put. However, the image on which the cured plate in Example 9-1 (in FIG. 4, the right cured plate) having a turbidity of more than 20% is put obviously appears cloudy, which shows that the cured plate in Example 9-1 is insufficient in an optical element application.

The above-mentioned Examples 9-1, Comparative Examples 9-1 to 9-4 and Reference Examples 9-1 and 9-2 show the followings. In order to obtain a curable resin composition excellent in transparency, heat resistance, and moisture resistance, a resin composition including an organic resin and metal oxide fine particles, in which the metal oxide fine particles contain 80% by volume or more of particles with a diameter of 30 nm or less, is preferable. It is more preferable in such a resin composition that the organic resin includes at lest one epoxy and/or glycidyl group. It is still more preferable in such a resin composition that the organic resin is formed using a thermal-latent cation generator.

INDUSTRIAL APPLICABILITY

The resin composition of the present invention and the optical member thereof each include a specific organic resin component and a specific metalloxane component. Therefore, the resin composition and the optical member can be continuously produced without gelling when being produced and have excellent optical characteristics such as high transparency and exhibit excellent performances even in a harsh use environment. Therefore, the resin composition and the optical member can be applied to optical members and can be used in applications such as an optical application, an opto device application, a display device application, or as a mechanical component material, an electrical or electronic component material, and the like.

The present application claims priority under 35 U.S.C. §119 on Patent Application Nos. 2006-269341 filed in Japan on Sep. 29, 2006, entitled "RESIN COMPOSITION AND PRODUCTION METHOD THEREOF", 2006-296208 filed in Japan on Oct. 31, 2006, entitled "ORGANIC-INORGANIC COMPOSITE RESIN COMPOSITION AND OPTICAL MEMBER", and 2007-075167 filed in Japan on Mar. 22, 2007, entitled "TRANSPARENT RESIN COMPOSITION AND CURED PRODUCT THEREOF," the entire contents of which are hereby incorporated by reference.

What is claimed is:
1. A lens produced by curing a curable resin composition comprising an organic resin component and a metalloxane component, wherein the organic resin component includes a resin component having an Abbe number of 45 or more, and the metalloxane component has a metalloxane bond,
wherein the organic resin component includes an organic resin component having a molecular weight of less than 700, and wherein the organic resin component having a molecular weight of less than 700 is a cationic curable component,
and wherein the organic resin component having a molecular weight of less than 700 includes at least one compound of hydrogenated epoxy compounds and alicyclic epoxy compounds,
and wherein the metalloxane component includes an organosiloxane compound represented by the following average compositional formula:

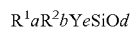

it the formula, $R^1$ represents an unsubstituted saturated aliphatic hydrocarbon group; $R^2$ represents at least one member selected from the group consisting of unsubstituted aryl groups and unsubstituted aralkyl groups;

Y represents at least one member selected from the group consisting of RO groups, hydroxyl groups, halogen atoms, and a hydrogen atom;

R represents at least one member selected from the group consisting of unsubstituted alkyl groups, unsubstituted cycloalkyl groups, unsubstituted aryl groups, and unsubstituted aralkyl groups; and a, b, c, and d satisfy $0 \leq a < 3$, $0 \leq b < 3$, $0 \leq c < 3$, $0 < a+b+c < 3$, $0 < a+b < 3$, and $a+b+c+2d = 4$, and wherein the metalloxane component comprises an organosiloxane compound having a ladder structure;

and wherein the resin composition contains a thermal-latent cationic curing catalyst in an amount of 0.01 to 10% by weigh on the solid content equivalent basis relative to 100% by weight of the resin composition;

and wherein the resin composition contains at least one compound selected from the group consisting of aliphatic alcohols, carboxylic acids, carboxylic acid esters, and carboxylic acid salts, each containing 8 to 20 carbon atoms, as a demolding agent, and the content of the demolding agent is 0.1 to 5% by weight relative to 100% by weight of the resin composition.

2. The lens according to claim 1, wherein the organosiloxane compound satisfies $c < (a+b+c) \times 0.4$ in the average compositional formula.

3. The lens according to claim 1, wherein an organosiloxane compound satisfying $a=0$ in the average compositional formula and an organosiloxane compound satisfying $b=0$ in the average compositional formula are used together as the metalloxane component.

4. The lens according to claim 1, wherein an average Abbe number of the entire organic resin component is 45 or more, and the organosiloxane compound satisfies $a > b$ in the average compositional formula.

5. The according to claim 1, wherein an average Abbe number of the entire organic resin component is less than 45, and the organosiloxane compound satisfies $b > a$ in the average compositional formula.

6. The lens according to claim 1, wherein the content of the organosiloxane compound in the resin composition is 0.1 to 50% by weight relative to the total weight of the organic resin composition and the organosiloxane compound.

7. The lens according to claim 1, wherein the curable resin composition contains an organic resin component having a molecular weight of 700 or more in an amount of 10% by weight or more and 90% by weight or less relative to 100% by weight of the total amount of the resin composition.

8. The lens according to claim 7, wherein a molecular weight of the organic resin component having a molecular weight of 700 or more is 700 to 10000, and a molecular weight of the organic resin component having a molecular weight of less than 700 is 150 or more and less than 700.

9. The lens according to claim 1, wherein the lens is selected from camera lens, a light beam condenser lens and a light diffusing lens.

10. A camera which comprises the lens according to claim 1.

11. A cellular phone which comprises the camera according to claim 10.

12. The lens according to claim 1, wherein the organic resin component includes an organic resin component having a molecular weight of 700 or more, and wherein the organic resin component having a molecular weight of 700 or more includes at least one compound of hydrogenated epoxy compounds and alicyclic epoxy compounds.

13. The lens according to claim 1, wherein $a+b+c$ is 0.5 or more and 2 or less, and $a+b$ is 0.4 or more and 2 or less in the average compositional formula of the organosiloxane compound.

14. The lens according to claim 1, wherein $a+b+c$ is 0.8 or more and 1.6 or less, and $a+b$ is 0.8 or more and 1.2 or less in the average compositional formula of the organosiloxane compound.

15. The lens according to claim 1, wherein the organosiloxane compound having the ladder structure is a ladder-shaped silsesquioxane compound.

* * * * *

UNITED STATES PATENT AND TRADEMARK OFFICE
CERTIFICATE OF CORRECTION

PATENT NO.         : 8,524,841 B2
APPLICATION NO.    : 11/863539
DATED              : September 3, 2013
INVENTOR(S)        : Junichi Nakamura et al.

Page 1 of 1

It is certified that error appears in the above-identified patent and that said Letters Patent is hereby corrected as shown below:

In the Claims

At column 124, line number 65, formula "$R^1aR^2bYeSiOd$" should read -- $R^1aR^2bYcSiOd$ --;

At column 125, claim 1, line number 16, "weigh" should read -- weight --; and

At column 125, claim 5, line number 37, after "The" insert -- lens --.

Signed and Sealed this
Twenty-fourth Day of December, 2013

Margaret A. Focarino
*Commissioner for Patents of the United States Patent and Trademark Office*